United States Patent [19]

Knudsen et al.

[11] Patent Number: 5,584,026
[45] Date of Patent: Dec. 10, 1996

[54] COMPUTER METHOD FOR IMPLEMENTING A GET INSTRUCTION

[75] Inventors: Helge Knudsen, Oakville; Daniel T. Chong, Woodbridge; John Yaffe, Mississauga; James E. Taugher, Mississauga; Michael Robertson, Mississauga; Zbigniew Plazak, Etobicoke, all of Canada

[73] Assignee: Amdahl Corporation, Sunnyvale, Calif.

[21] Appl. No.: 426,489

[22] Filed: Apr. 20, 1995

Related U.S. Application Data

[60] Continuation of Ser. No. 29,699, Mar. 11, 1993, abandoned, which is a division of Ser. No. 968,237, Oct. 29, 1992, abandoned, which is a continuation of Ser. No. 830,548, Jan. 31, 1992, abandoned, which is a continuation of Ser. No. 450,298, Dec. 13, 1989, abandoned, which is a continuation-in-part of Ser. No. 402,862, Sep. 1, 1989, abandoned.

[51] Int. Cl.$^6$ ............................................. G06F 17/30
[52] U.S. Cl. ......................... 395/601; 364/DIG. 2; 364/963; 364/963.1; 364/974; 364/974.4; 364/976.3; 364/972.3
[58] Field of Search ............................................. 395/600

[56] References Cited

U.S. PATENT DOCUMENTS 4,931,928   6/1990   Greenfeld ........................... 364/300

OTHER PUBLICATIONS

SQL/Data System Terminal User's Reference for VSE, IBM, 1984, pp. 3, 39, 74–75, 107–114, 128–129.
Data Structures and Algoriltrims, Alo et al., Addison–Wesley Publishing Co., 1987, pp. 361–363.
"An Overview of the IRIS Object–Oriented DBMS", D. H. Fishman, IEEE, 1988, pp. 177–180.
"Data Base Management for HP Precision Architecture Computers", Brown et al., Hewlett–Packard Journal, Dec., 1986, No. 12, pp. 33–48.
"Table Storage Architecture for the OS/2 Extended Edition Database Manager", IBM Technical Disclosure Bulletin, vol. 32, No. 5A, Oct., 1989, pp. 30–32.
M. Papazoglou, "An Extensible DBMS for Small and Medium Systems", IEEE Micro, vol. 9, No. 2, Apr., 1989, pp. 52–68.
A. Brown et al., "Data Base Management for HIP Precision Architecture Computers", Hewlett–Packard Journal, vol. 37, No. 12, Dec., 1986, pp. 33–48.
D. J. Haderle et al., "IBM Database 2 Overview", IBM Systems Journal, vol. 23, No. 2, 1984, pp. 112–125.

*Primary Examiner*—Kevin A. Kriess
*Assistant Examiner*—Kakali Chaki
*Attorney, Agent, or Firm*—Fliesler, Dubb, Meyer & Lovejoy

[57] ABSTRACT

A computer method for executing a GET instruction for retrieving the first record stored in a data base that meets the stated criteria and for issuing an exception when no such record is found.

2 Claims, 30 Drawing Sheets

TABLE DEFINITION FOR: TABLES

```
|-------------------- TABLES --------------------|
| SUMMARY    :                                   |
| UNIT       : DIC                               |
| KEYWORDS   :                                   |
|------------------------------------------------|

NAME           :
TYPE           :                    ORDERING= FIELD :           SEQ:
UNIT           :                              FIELD :           SEQ:
SOURCE TABLE   :
SELECTION      :                    APPENDAGE TABLE:

PARAMETERS OF TABLES :
|--PARAMETER NAME--|--TYPE--|--SYNTAX--|--LENGTH--|--DECIMAL--|--SOURCE PARM--|
```

FIELDS OF TABLES :

| FIELD NAME | TYPE | SYNTAX | LENGTH | DECIMAL | KEYTYPE | SOURCE |
|---|---|---|---|---|---|---|
| NAME | I | C | 16 | 0 | P | |
| TYPE | S | C | 3 | 0 | | |
| IDGEN | L | C | 1 | 0 | | |
| UNIT | S | C | 8 | 0 | | |
| FIX | L | C | 1 | 0 | | |
| SOURCE | I | C | 16 | 0 | | |
| APPENDAGE | I | C | 16 | 0 | | |
| CREATED | S | C | 6 | 0 | | |
| AUTHOR | S | C | 8 | 0 | | |
| MODIFIED | S | C | 6 | 0 | | |
| MODIFIER | S | V | 8 | 0 | | |
| SUMMARY | S | C | 62 | 0 | | |
| KEYWORDS | S | C | 45 | 0 | | |

FIG.-3

TABLE DEFINITION FOR: FIELDS

┌─────────────────────── FIELDS ───────────────────────┐
│ SUMMARY  :                                           │
│ UNIT     : DIC                                       │
│ KEYWORDS :                                           │
└──────────────────────────────────────────────────────┘

NAME         : FIELDS           ORDERING= FIELD :           SEQ:
TYPE         :                            FIELD :           SEQ:
UNIT         : DIC
SOURCE TABLE :                  APPENDAGE TABLE:
SELECTION    :

PARAMETERS OF FIELDS :
PARAMETER NAME      TYPE  SYNTAX  LENGTH  DECIMAL  SOURCE  PARM
TABLENAME            I      C       16       0

FIELDS OF FIELDS :
FIELD NAME     TYPE  SYNTAX  LENGTH  DECIMAL  KEYTYPE  SOURCE
NAME            I      C       16       0
TYPE            S      C        1       0
SYNTAX          S      C        1       0
LENGTH          C      B        2       0
DECIMAL         C      B        2       0
NUMBER          C      B        2       0
KEYTYPE         S      C        1       0
SOURCE          I      C       16       0
SOURCENAME      I      C       16       0
                S      C       18       0      P
DEFAULT         L      C        1       0
REQUIRED

FIG.-4

TABLE DEFINITION FOR: PARMS

```
 ------------------------------ PARMS ------------------------------
| SUMMARY  :                                                        |
| UNIT     : DIC                                                    |
| KEYWORDS :                                                        |
 -------------------------------------------------------------------

NAME            : PARMS                    ORDERING= FIELD :            SEQ:
TYPE            : TDS                                FIELD :            SEQ:
UNIT            : DIC
SOURCE TABLE    :
SELECTION       :                       APPENDAGE TABLE:
```

PARAMETERS OF PARMS :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF PARMS :

| FIELD NAME | TYPE | SYNTAX | LENGTH | DECIMAL | KEYTYPE | SOURCE |
|---|---|---|---|---|---|---|
| NUMBER | I | B | 2 | 0 | P | |
| NAME | I | C | 16 | 0 | | |
| TYPE | S | C | 1 | 0 | | |
| SYNTAX | S | C | 1 | 0 | | |
| LENGTH | C | B | 2 | 0 | | |
| DECIMAL | C | B | 2 | 0 | | |
| SOURCENAME | I | C | 16 | 0 | | |

FIG.-5

TABLE DEFINITION FOR:SELECTION

```
----------------SELECTION---------------
| SUMMARY  :                            |
| UNIT     : DIC                        |
| KEYWORDS :                            |
-----------------------------------------

NAME         : SELECTION    ORDERING= FIELD :           SEQ:
TYPE         : TDS                    FIELD :           SEQ:
UNIT         : DIC
SOURCE TABLE :
SELECTION                   APPENDAGE TABLE:
```

PARAMETERS OF SELECTION :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF SELECTION :

| FIELD NAME | TYPE | SYNTAX | LENGTH | DECIMAL | KEYTYPE | SOURCE |
|---|---|---|---|---|---|---|
| RECORD# | I | B | 2 | 0 | P | |
| DATA | S | C | 64 | 0 | | |

FIG.-6

TABLE DEFINITION FOR: ORDERING

```
SUMMARY   :                    ──── ORDERING ────
UNIT      : DIC
KEYWORDS  :
```

NAME          : ORDERING           ORDERING= FIELD :           SEQ:
TYPE          : TDS                         FIELD :           SEQ:
UNIT          : DIC
SOURCE TABLE  :                    APPENDAGE TABLE:
SELECTION     :

PARAMETERS OF ORDERING :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF ORDERING :

| FIELD NAME | TYPE | SYNTAX | LENGTH | DECIMAL | KEYTYPE | SOURCE |
|---|---|---|---|---|---|---|
| NUMBER | S | B | 2 | 0 | P | |
| SEQUENCE | S | C | 1 | 0 | | |
| FIELDNAME | S | C | 16 | 0 | | |

FIG.-7

TABLE DEFINITION FOR: EVENTRULES

```
-------------- EVENTRULES --------------
| SUMMARY  :                                    |
| UNIT     : DIC                                |
| KEYWORDS :                                    |
-----------------------------------------------

NAME           : EVENTRULES      ORDERING= FIELD :            SEQ:
TYPE           : TDS                       FIELD :            SEQ:
UNIT           : DIC
SOURCE TABLE   :                 APPENDAGE TABLE:
SELECTION      :
```

PARAMETERS OF EVENTRULES :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF EVENTRULES :

| FIELD NAME | TYPE | SYNTAX | LENGTH | DECIMAL | KEYTYPE | SOURCE |
|---|---|---|---|---|---|---|
| NUMBER | I | B | 2 | 0 | P | |
| TYPE | S | C | 1 | 0 | | |
| ACCESS | S | C | 1 | 0 | | |
| RULE | I | C | 16 | 0 | | |

FIG.-8

```
TABLE DEFINITION FOR: @RULESLIBRARY

---------------------------------------
|  SUMMARY  :                           |
|  UNIT     : DIC                       |
|  KEYWORDS :                           |
 ---------------------------------------

NAME          : @RULESLIBRARY       ORDERING= FIELD :            SEQ:
TYPE          : OBJ                          FIELD :            SEQ:
UNIT          : DIC
SOURCE TABLE :                      APPENDAGE TABLE:
SELECTION    :

PARAMETERS OF @RULESLIBRARY :
PARAMETER NAME       TYPE  SYNTAX  LENGTH  DECIMAL  SOURCE PARM
LIBRARY                S      C       8        0

FIELDS OF @RULESLIBRARY :
FIELD NAME           TYPE  SYNTAX  LENGTH  DECIMAL  KEYTYPE  SOURCE
RULENAME               S      C      16        0       P
DATE                   S      C       6        0
TIME                   S      C       4        0
RULEBODY               S      V    2200        0
```

FIG.-9

TABLE DEFINITION FOR: INSTABFIELDS

```
|-------------------------|
| SUMMARY  :              |
| UNIT     : DIC          |
| KEYWORDS :              |
|-------------------------|
```

NAME          : INSTABFIELDS             ORDERING= FIELD ;   SEQ: 
TYPE          : TDS                                FIELD ;   SEQ: 
UNIT          : DIC 
SOURCE TABLE  :                          APPENDAGE TABLE: 
SELECTION     :

PARAMETERS OF INSTABFIELDS :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF INSTABFIELDS :

| FIELD NAME | TYPE | SYNTAX | LENGTH | DECIMAL | KEYTYPE | SOURCE |
|---|---|---|---|---|---|---|
| FIELDNAME | I | C | 16 | 0 | P | |
| IMSEIFLONAME | S | C | 8 | 0 | | |
| SEGMENT | S | C | 8 | 0 | | |
| DBNAME | S | C | 8 | 0 | | |

FIG.-10

TABLE DEFINITION FOR: IMSSEGFIELDS

```
 ---------------------------------
|  SUMMARY :                      |
|  UNIT    : DIC                  |
|  KEYWORDS:                      |
 - - - - - - - - - - - - - - - - -
```

| NAME | : IMSSEGFIELDS | ORDERING= FIELD : | SEQ: |
|---|---|---|---|
| TYPE | : TDS | FIELD : | SEQ: |
| UNIT | : DIC | | |

SOURCE TABLE :
SELECTION     :                    APPENDAGE TABLE:

PARAMETERS OF IMSSEGFIELDS:

| PARAMETER NAME | TYPE | SYNTAX | LENGTH | DECIMAL | SOURCE PARM |
|---|---|---|---|---|---|
| DBNAME | I | C | 8 | 0 | |
| SEGNAME | I | C | 8 | 0 | |

FIELDS OF IMSSEGFIELDS:

| FIELD NAME | TYPE | SYNTAX | LENGTH | DECIMAL | KEYTYPE | SOURCE |
|---|---|---|---|---|---|---|
| NAME | S | C | 8 | 0 | P | |
| TYPE | S | C | 1 | 0 | | |
| SYNTAX | C | C | 1 | 0 | | |
| OFFSET | C | B | 2 | 0 | | |
| LENGTH | C | B | 2 | 0 | | |
| DECIMAL | C | B | 2 | 0 | | |

FIG.-11

TABLE DEFINITION FOR: IMSACCESS

```
 ---------------------------------
| SUMMARY :         IMSACCESS     |
| UNIT    : DIC                   |
| KEYWORDS:                       |
 ---------------------------------
```

NAME         : IMSACCESS        ORDERING= FIELD :              SEQ:
TYPE         : TDS                        FIELD :              SEQ:
UNIT         : DIC
SOURCE TABLE :                  APPENDAGE TABLE:
SELECTION    :

PARAMETERS OF IMSACCESS :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF IMSACCESS :

| FIELD NAME | TYPE | SYNTAX | LENGTH | DECIMAL | KEYTYPE | SOURCE |
|---|---|---|---|---|---|---|
| LEVEL | I | B | 2 | 0 | P | |
| DBNAME | S | C | 8 | 0 | | |
| SEGMENT | S | C | 8 | 0 | | |
| ACCESSTYPE | S | C | 1 | 0 | | |
| IAM_ACCESS_NAME | S | C | 16 | 0 | | |
| IMS_ACCESS_NAME | S | C | 8 | 0 | | |
| ACCESSVALUE | S | V | 255 | 0 | | |

FIG.-12

TABLE DEFINITION FOR: SCREENS

```
|------------------|
| SUMMARY :        |
| UNIT    : DIC    |
| KEYWORDS:        |
|------------------|
```

|----------- SCREENS -----------|

NAME          : SCREENS
TYPE          : TDS              ORDERING= FIELD ;      SEQ:
UNIT          : DIC                        FIELD ;      SEQ:
SOURCE TABLE  :                  APPENDAGE TABLE:
SELECTION     :

PARAMETERS OF SCREENS :

| PARAMETER NAME | TYPE | SYNTAX | LENGTH | DECIMAL | SOURCE | PARM |
|---|---|---|---|---|---|---|

FIELDS OF SCREENS :

| FIELD NAME | TYPE | SYNTAX | LENGTH | DECIMAL | KEYTYPE | SOURCE |
|---|---|---|---|---|---|---|
| NAME | I | C | 16 | 0 | P | |
| UNIT | S | C | 8 | 0 | | |
| LEFT_KEY | C | B | 2 | 0 | | |
| RIGHT_KEY | C | B | 2 | 0 | | |
| UP_KEY | C | B | 2 | 0 | | |
| DOWN_KEY | C | B | 2 | 0 | | |
| EXIT_KEY | C | B | 2 | 0 | | |
| SCROLL_TABLE | S | C | 16 | 0 | | |
| SCROLL_FIELD | S | C | 16 | 0 | | |
| CURSOR_TABLE | S | C | 16 | 0 | | |
| CURSOR_FIELD | S | C | 16 | 0 | | |
| CREATED | S | C | 6 | 0 | | |
| AUTHOR | S | C | 8 | 0 | | |
| MODIFIED | S | C | 6 | 0 | | |
| MODIFIER | S | C | 8 | 0 | | |
| SUMMARY | S | V | 62 | 0 | | |
| KEYWORDS | S | C | 45 | 0 | | |

FIG.-13

TABLE DEFINITION FOR: SCREENTABLES

```
|---------------- SCREENTABLES ----------------|
| SUMMARY :                                    |
| UNIT    : DIC                                |
| KEYWORDS:                                    |
|----------------------------------------------|

NAME          : SCREENTABLES      ORDERING= FIELD ,     SEQ:
TYPE          : TDS                         FIELD ,     SEQ:
UNIT          : DIC
SOURCE TABLE  :                   APPENDAGE TABLE:
SELECTION     :
```

PARAMETERS OF SCREENTABLES :

| PARAMETER NAME | TYPE | SYNTAX | LENGTH | DECIMAL | SOURCE PARM |
|---|---|---|---|---|---|
| SCREEN | I | C | 16 | 0 | |

FIELDS OF SCREENTABLES :

| FIELD NAME | TYPE | SYNTAX | LENGTH | DECIMAL | KEYTYPE | SOURCE |
|---|---|---|---|---|---|---|
| NAME | S | C | 16 | 0 | P | |
| SCROLL_TYPE | C | C | 1 | 0 | | |
| FIRST_ROW | C | B | 2 | 0 | | |
| FIRST_COL | C | B | 2 | 0 | | |
| MAX_OCCUR | S | C | 16 | 0 | | |
| VALIDATION | C | B | 2 | 0 | | |
| HEADINGS | C | B | 2 | 0 | | |
| FOOTNOTES | C | B | 2 | 0 | | |
| FIXED_COL | C | C | 2 | 0 | | |
| LAST_ROW | S | C | 1 | 0 | | |
| LAST_COL | S | C | 1 | 0 | | |
| BOUND_FROW | S | C | 1 | 0 | | |
| BOUND_FCOL | S | C | 1 | 0 | | |
| BOUND_LROW | S | C | 1 | 0 | | |
| BOUND_LCOL | S | C | 1 | 0 | | |

FIG.-14

TABLE DEFINITION FOR: SCREENFIELDS

```
 _____
|                   SCREENFIELDS         |
| SUMMARY   :                       SEQ: |
| UNIT      : DIC                   SEQ: |
| KEYWORDS  :                            |
 ----------------------------------------
```

NAME          : SCREENFIELDS              ORDERING= FIELD :
TYPE          : TDS                                FIELD :
UNIT          : DIC
SOURCE TABLE  :                           APPENDAGE TABLE:
SELECTION     :

PARAMETERS OF SCREENFIELDS :

| PARAMETER NAME | TYPE | SYNTAX | LENGTH | DECIMAL | SOURCE PARM |
|---|---|---|---|---|---|
| SCREENTABLES | I | C | 16 | 0 | |

FIELDS OF SCREENFIELDS :

| FIELD NAME | TYPE | SYNTAX | LENGTH | DECIMAL | KEYTYPE | SOURCE |
|---|---|---|---|---|---|---|
| NAME | I | C | 16 | 0 | P | |
| ROW | C | B | 2 | 0 | | |
| COL | C | B | 2 | 0 | | |
| LENGTH | C | B | 2 | 0 | | |
| JUST | S | C | 1 | 0 | | |
| FILL | S | C | 1 | 0 | | |
| LITERAL | L | C | 1 | 0 | | |
| INTENSITY | S | C | 1 | 0 | | |
| PROTECT | L | C | 1 | 0 | | |
| SKIP | L | C | 1 | 0 | | |
| NULLFILL | S | C | 1 | 0 | | |
| DETECT | L | C | 1 | 0 | | |
| REQUIRED | L | C | 1 | 0 | | |
| VALUE | S | V | 42 | 0 | | |

FIG.-15

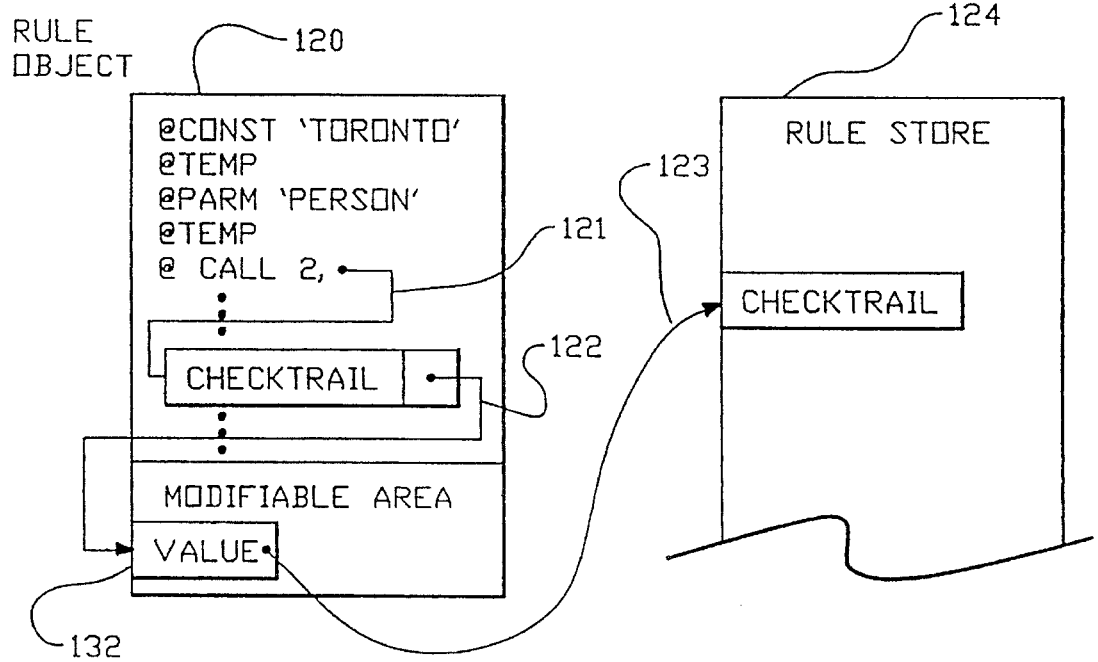
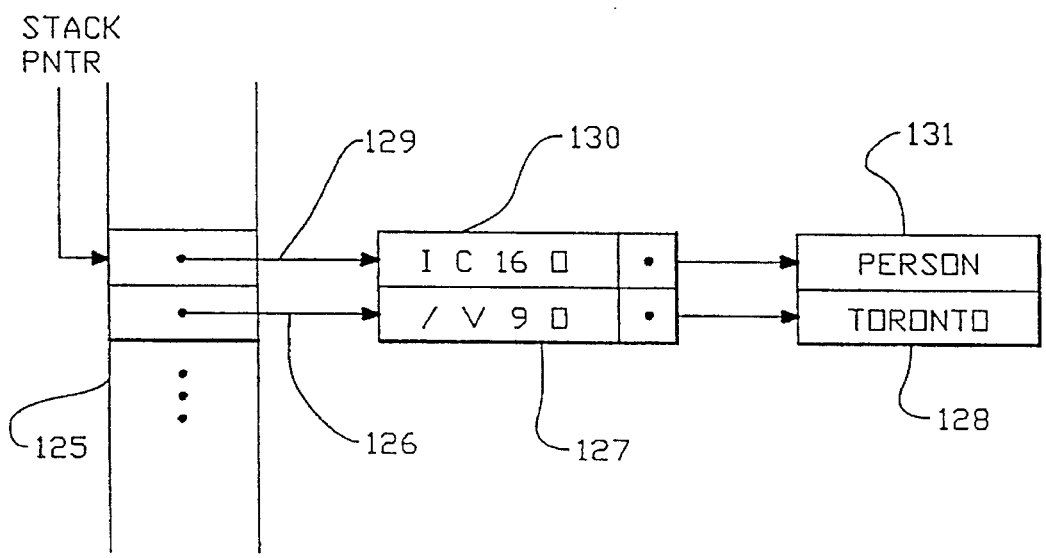
FIG.-17

TABLE TYPES VS. TABLE OPS

|     | F | G | I | R | D | SRC |
|-----|---|---|---|---|---|-----|
| TDS | ✓ | ✓ | ✓ | ✓ | ✓ | ① |
| OBJ |   | ✓ | ✓ | ✓ | ✓ |   |
| IMS | ✓ | ✓ | ✓ | ✓ | ✓ | ② |
| TEM | ✓ | ✓ | ✓ | ✓ | ✓ |   |
| SUB①/② | ✓ | ✓ |   |   |   |   |
| PRM | ✓ | ✓ |   |   |   |   |
| SCR | ✓ | ✓ | ✓ | ✓ | ✓ |   |
| IMP* | ✓ |   |   |   |   |   |
| EXP* |   |   | ✓ |   |   |   |
| HDS |   | ✓ | ✓ | ✓ | ✓ |   |

\* PARM1 = PDS MEMBER

FIG.-22

LONG STRINGS ~1002

| INDEX | STRING | TYPE | LEW | DEC |
|---|---|---|---|---|
| 1 | THIS IS A LONG STRING | Q | 21 | 0 |

CALL R ( 'THIS IS A LONG STRNG; 45, T,F);

~1000

TOKENS (—)

| INDEX | STRING | TYPE | LEN | DEC | TABLE F. MNK |
|---|---|---|---|---|---|
| 1 | CALL | R | 4 | 0 | N |
| 2 | R | I | 1 | 0 | N |
| 3 | ( | S | 1 | 0 | N |
| 4 | 'S' | L | 1 | 0 | N |
| 5 | , | S | 1 | 0 | N |
| 6 | 45 | N | 2 | 0 | N |
| 7 | , | S | 1 | 0 | N |
| 8 | T | I | 1 | 0 | Y |
| 9 | . | S | 1 | 0 | N |
| 10 | F | I | 1 | 0 | Y |
| 11 | ) | S | 1 | 0 | N |
| 12 | ; | S | 1 | 0 | N |

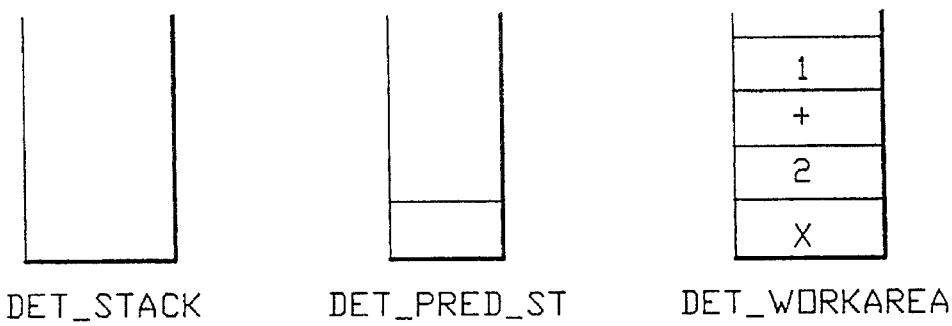
FIG.-33C
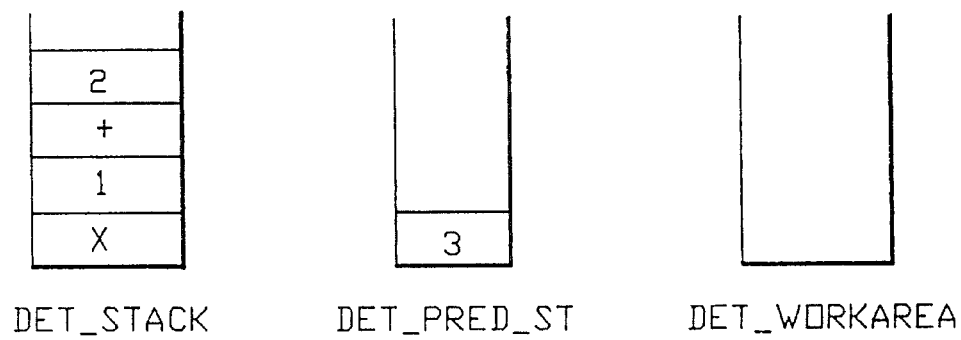
FIG.-34A
```
1  L  I  1  0  N
2  =  □  1  0  N
     TOKENS ( - )
```
FIG.-34B

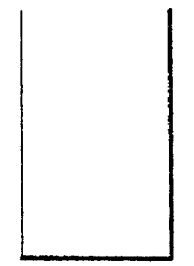
DET_STACK
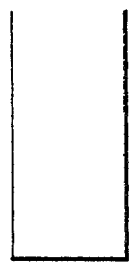
DET_PRED_ST
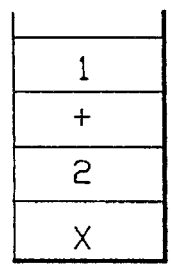
DET_WORKAREA
FIG.-34C
| 1 | L | I | 1 | 0 | N |
| 2 | = | □ | 1 | 0 | N |
| 3 | 1 | N | 1 | 0 | N |
| 4 | + | □ | 1 | 0 | N |
| 5 | 2 | N | 1 | 0 | N |
| 6 | J | S | 1 | 0 | N |
TOKENS ( - )
FIG.-34D
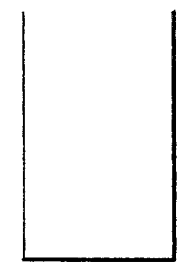
DET_STACK
DET_PRED_ST
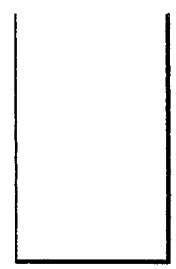
DET_WORKAREA
FIG.-34E

COMPUTER METHOD FOR IMPLEMENTING A GET INSTRUCTION

This application is a continuation of Ser. No. 08/029,699, filed Mar. 11, 1993, now abandoned, which is a divisional of Ser. No. 07/968,237, filed Oct. 29, 1992, now abandoned, which is a continuation of Ser. No. 07/830,548, filed Jan. 31, 1992, now abandoned, which is a continuation of Ser. No. 07/450,298, filed Dec. 13, 1989, now abandoned, which is a continuation-in-part of Ser. No. 07/402,862, filed Sep. 1, 1989, now abandoned.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to statement constructs and software including statement constructs.

DESCRIPTION OF RELATED ART

The development of applications programs by software engineers is a complicated task. This complication arises in part because of environmental parameters, like the variety of data types, hardware types, operating system types, program auditing techniques, and other details. Computer programming languages have developed to handle all of these environmental parameters, usually by requiring explicit recognition of the parameters in the code. Thus, the typical application programmer must contend with data definitions, editing and validation of input data, selection and ordering of data available to the program, looping constraints on the system for the program, output editing and validation conventions, error processing, program auditing, and other complicated tasks in addition to the basic algorithm for accomplishing the application in mind.

These environmental parameters also complicate the running of programs written with high level languages. These programs must be compiled or loaded prior to execution, during which time all the physical resources, data, and rules associated with the application must be bound together.

This binding of resources required for a given application at compile time or load time, makes it difficult to implement truly event driven, or data driven, programs.

Attempts have been made to make some programming languages interpretive. That is, to allow them to bind certain resources to the program while it is being run. However, these interpretive programs have very limited performance and have not gained widespread acceptance in the industry.

Accordingly, there is a need for an operating system, data base, and data access method which will allow application programmers to be free of complications caused by environmental parameters.

SUMMARY OF THE INVENTION

The present invention provides an operating system, data base, and access method which pushes data definitions, input editing and validation, selection and ordering, looping, output editing and validation, error processing, and auditing down into the data access method, thereby freeing the application programmer of explicit recognition in his program of these environmental parameters.

The system comprises a virtual stack machine, which operates based on a simple instruction set to execute programs of instructions. In addition, a data base having a unique access structure stores all the dictionary information required for binding during run time of objects stored in the data base to the program being executed. Finally, a data access method, optimized for the access structure, performs all the access functions on the dictionary, sub-routines, and data to be used by the program being executed. The system performs the binding during run time of objects retrieved through the access method during execution of a current program. In addition, the system includes servers for display screens, storage subsystems based on other data access structures, such as IMS, and other peripheral subsystems. These servers again are dynamically bound to a given program at run time.

The access structure consists of a plurality of tables, each table having a plurality of rows, and each row having a plurality of fields. Each row in the access structure is identified by a unique primary key in one of the fields of the row and by a table identifier. Objects that are retrievable through the access structure are stored as fields in the tables. Tables in the access structure can be further divides into subtables, where each subtable is identified by a table parameter. Tables are identified by a table name and any table parameters that have been assigned to the table.

The access method maintains indexes into the tables stored in the access structure. The indexes are first ordered on the table name, and then ordered on the parameter or parameters associated with a given table. Finally, the indexes are ordered on the primary key of each row within a table.

A subset of the tables stored in the access structure consists of dictionary data or metadata, which is utilized for binding objects stored in the data base with a program currently being executed. The dictionary data includes event rules which are executed in response to data access events, selection criteria by which access to objects within the data base can be controlled, ordering algorithms, by which objects within the access structure can be ordered during access events, and a plurality of peripheral device servers.

The implementation of servers within the access method allows the extended common view of objects available to the data processing system to be processed through a single interface. Thus, objects in the native store of the access method stored in other systems, such as IMS, DB2, or other data base management systems, are viewed according to a single access structure by the programmer.

Furthermore, the operating system, according to the present invention, operates based on an isomorphic programming representation. The high level language correlates one to one with internal representation of programs which are directly executed on the virtual stack machine. Thus, only one copy of a given program module is stored within the data base. According to this aspect, a translator/detranslator is utilized by application programmers who perform program development functions. Whenever the programming is being done, the internal representation is translated to a high level source. Whenever the resulting program is stored, the source is translated back to the internal representation. This provides for great mobility of programs from system to system, and eliminates many problems associated with maintaining a consistent view of a program which may be operated by a number of users.

Other aspects and advantages of the present invention can be seen upon review of the figures, the detailed description, and the claims which follow.

BRIEF DESCRIPTION OF THE FIGURES

FIG. 3 is a table definition for: TABLES.

FIG. 4 is a table definition for: FIELDS.

FIG. 5 is a table definition for: PARMS.

FIG. 6 is a table definition for: SELECTION.

FIG. 7 is a table definition for: ORDERING.

FIG. 8 is a table definition for: EVENTRULES.

FIG. 9 is a table definition for: @RULESLIBRARY.

FIG. 10 is a table definition for: IMSTABFIELDS.

FIG. 11 is a table definition for: IMSSEGFIELDS.

FIG. 12 is a table definition for: IMSACCESS.

FIG. 13 is a table definition for: SCREENS.

FIG. 14 is a table definition for: SCREENTABLES.

FIG. 15 is a table definition for: SCREENFIELDS.

FIG. 17 is a schematic diagram illustrating operation of the transaction processor for a rule call.

FIG. 22 is a table showing the table types and the table operands which work for a given table type.

FIG. 30 shows the TOKENS and the LONG_STRINGS tables used by the rule editor.

FIG. 31, 32, 33A–33C, and 34A–34E illustrate operation of the detranslator according to the present invention.

DETAILED DESCRIPTION

A detailed description of a preferred embodiment of the present invention is disclosed with reference to the figures. First, an overview of the data processing system according to the present invention is provided. Next, a description of the rule language used by application programmers in the system is described. Next, the specification of the manner in which data is stored in the system is provided.

After setting out the application programmer's view of the system, a specification of the object level representation of the rules is provided. From this specification, a description of the virtual machines which make up the data processing system are described. These systems include a virtual stack machine which executes the object level rules, a table access method which provides an interface between the virtual stack machine and the data storage systems. Finally, a description of the native data storage system, known as the table data store, is disclosed.

In addition, the mechanism for translating from the rule language to the internal object level representation of the rules, and for detranslating from the object representation of the rules to the rule language according to the present invention is described.

I. System Overview

Figure 1:
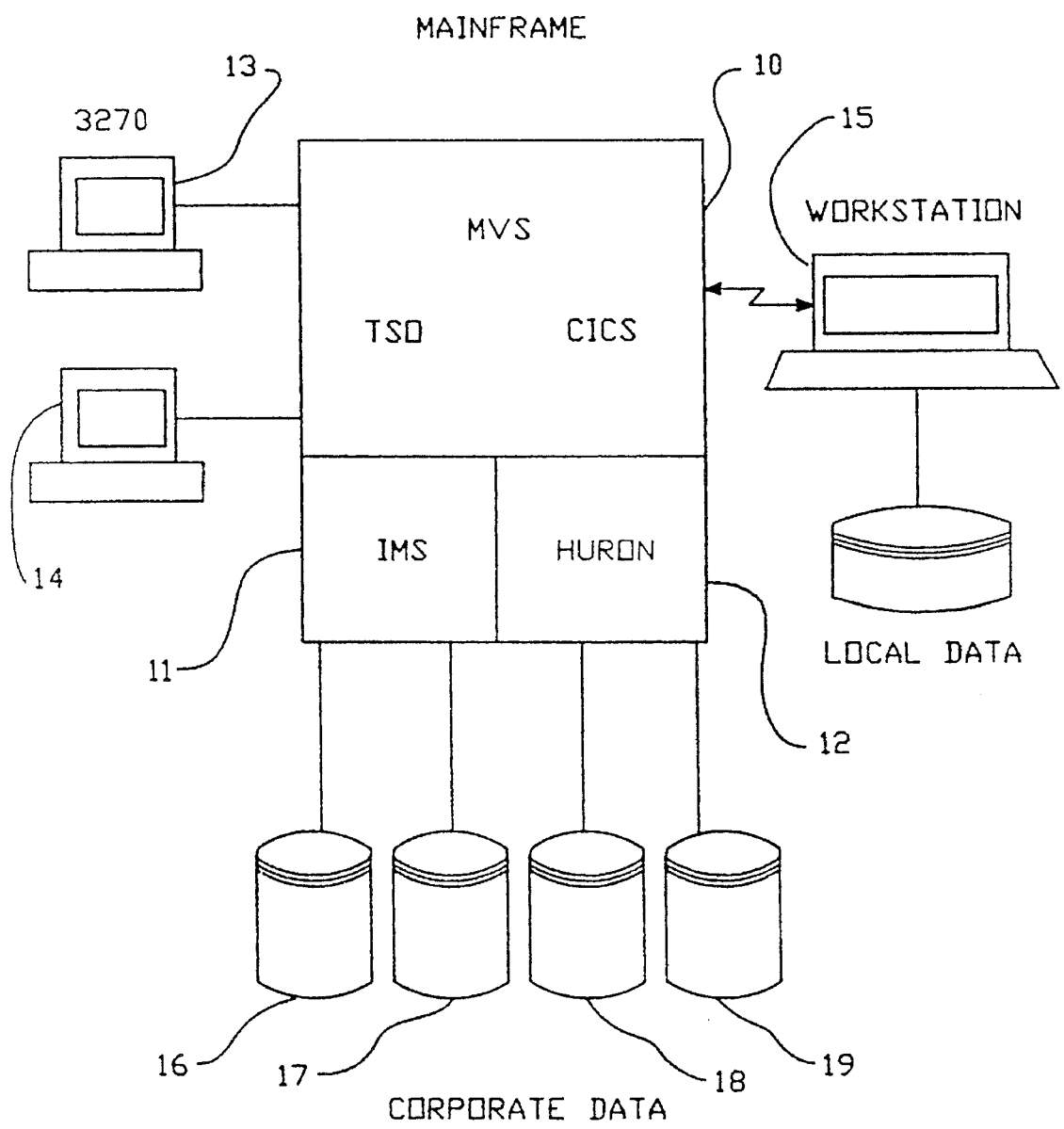
FIG. 1 is an overview block diagram of a data processing system implementing the present invention.

FIG. 1 illustrates the basic implementation of the data processing system according to the present invention. This system is implemented as a virtual machine on a main frame computer 10. The main frame computer runs a host operating system, MVS in the preferred system. Under the host operating system, a data base access system, such as IMS 11, can run. At the same time, the data processing system according to the present invention, known as HURON 12, runs under MVS. Coupled with the main frame are a plurality of user terminals 13, 14, such as the Model 3270's. Also, work stations 15 running other operating systems, such as UNIX, could be coupled to the main frame 10.

Connected with the main frame data server, such as IMS 11, are direct access storage devices 16 and 17 storing corporate data. Also, direct access storage devices 18 and 19 are coupled with the HURON system 12.

Figure 2:
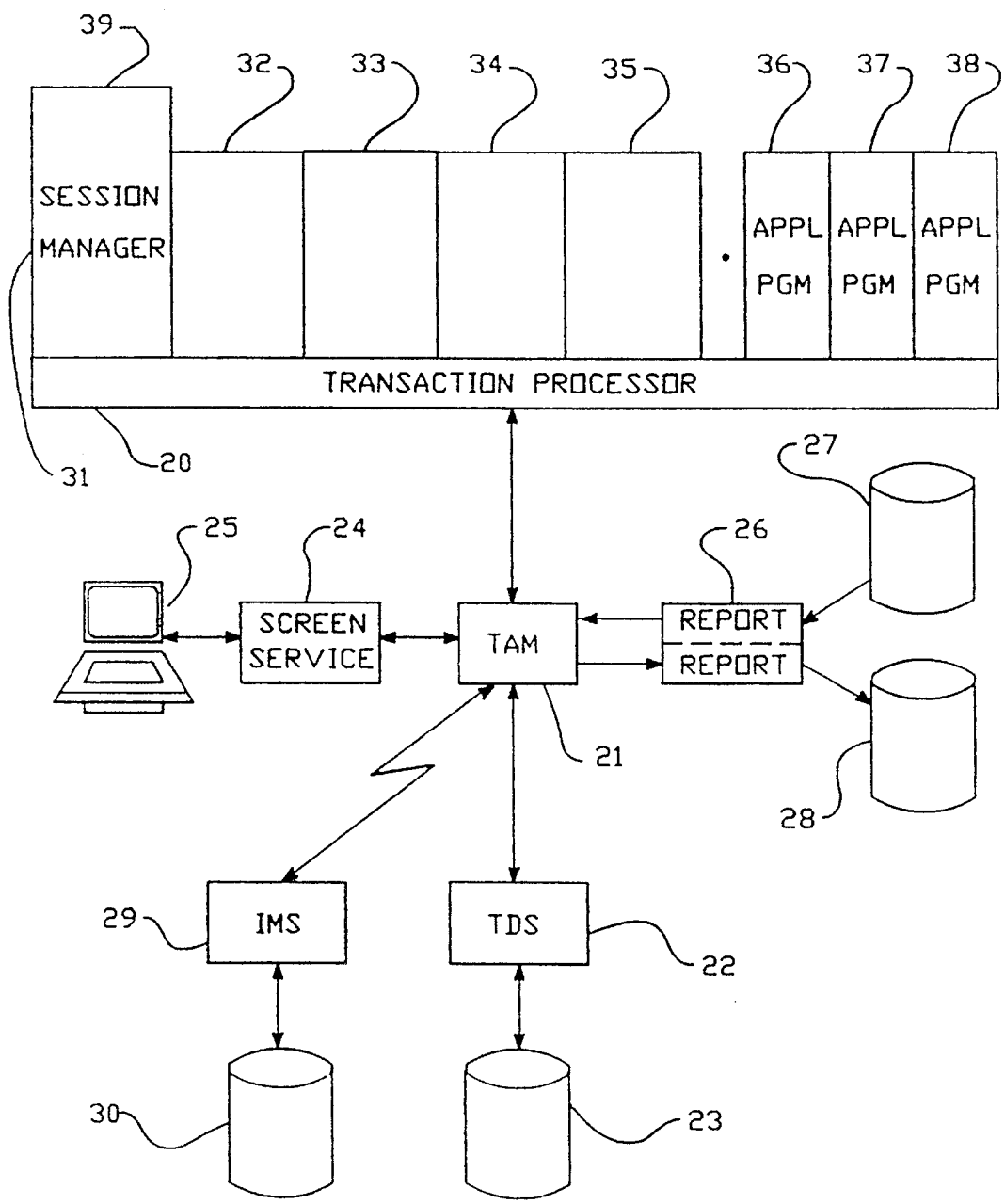
FIG. 2 is a schematic block diagrma of the virtual data processing machine according to the present invention.

FIG. 2 shows a conceptual block diagram of the HURON data processing system. The system includes a transaction processor 20, a table access machine 21, and a table data store server 22 which is coupled to direct access storage device 23. The table access machine 21 also drives a screen server 24 which is coupled to a user terminal 25, and an import/export server 26 coupled to other sources of data files 27 and 28.

In addition, the table access machine 21 provides an interface to a heterogenous data base system server, such as IMS server 29, which is coupled to direct storage access devices 30.

The transaction processor 20 is implemented as a virtual stack machine which executes the object code level representation of rules. Those rules are stored in a rule library 31 associated with each transaction. The rule library typically includes a session manager 39 which provides a screen menu and basic utilities to the programmer. Utilities include rule editor 32, a table editor browser 33, RPW and print utilities 34, query processors, if necessary, 35, and application programs 36, 37, 38 such as are called up for a given transaction.

Through the table access machine 21, physical data stored in direct access storage devices 23, 30, 27, 28 are presented to the transaction processor 20 as if it were stored in the table data store system.

The servers 22, 24, 26, 29, the table access machine 21, and the transaction processor 20 are all implemented as virtual machines on the host operating system. Thus, in the preferred system, these virtual machines are implemented with system 370 assembler language and perform the functions which are described in detail below.

A high level view of the system is best provided by understanding the rule language used by application programmers.

II. Rules Language

The rule language is the programming interface for the system. The language comprises an integrated set of database access commands, 4th-generation constructs, and conventional language statements which makes structured programming a natural consequence of developing an application.

The rules have four parts. These parts contain:
1. the rule definition
2. conditions
3. actions
4. exception handlers The rule definition contains the rule header "LEAPYEAR(YEAR);" and would contain local variable definitions, if there were any. The conditions determine the execution sequence. In this rule, there is only one condition, the comparison "REMAINDER(YEAR, 4)=0;" The actions are executable statements in the rule, only some of which will be executed on any particular invocation. The first action, "RETURN('Y');", is executed if the condition is satisfied, and the second action, "RETURN('N');", is executed if the condition is not satisfied. The rule in this example has no exception handlers, so there are no statements in the fourth part of the rule.

Table 2 shows a more complex rule. The two GET statements verify that the month referred to by the parameter MM occurs in the table MONTHS and that the day referred to by the parameter DD is less than or equal to the maximum for that month. Failure of a GET statement causes the exception GETFAIL, and the exception handler produces a message and returns the value 'N'.

TABLE 2

The rule VALID_DATE
VALID_DATE (YY, MM, DD);

| | | | |
|---|---|---|---|
| DD <= 0; | Y | N | N |
| LEAPYEAR (YY); | | Y | N |
| CALL MSGLOG ('INVALID DAY ENTERED'); | 1 | | |
| GET MONTHS WHERE MONTH=MM & LDAYS >=DD; | | 1 | |
| GET MONTHS WHERE MONTH=MM & DAYS >=DD; | | | 1 |
| RETURN ('N'); | 2 | | |
| RETURN ('Y'); | | 2 | 2 |

ON GETFAIL:
   CALL MSGLOG ('INVALID MONTH/DAY COMBINATION');
   RETURN ('N');

The rules are introduced by giving several short examples. Next, each of the four parts of a rule are described, in turn. Then, details concerning expressions, data types, and indirect references to tables and fields are set out. Finally, a formal specification of the rule language in Backus-Naur form is provided, and the standard routines are described.

GENERAL FORM OF RULES

Conceptually, a rule has four parts. When presented physically, the four parts are separated by horizontal lines. The examples that follow show the general form of Huron rules.

Table 1 shows a sample rule named LEAPYEAR, which has one argument names YEAR. LEAPYEAR is a function because it RETURNs a value—either 'Y' or 'N'—as a result of execution.

TABLE 1

The Rule LEAPYEAR
LEAPYEAR (YEAR);

| | | |
|---|---|---|
| REMAINDER (YEAR, 4) = 0' | Y | N |
| RETURN ('Y'); | 1 | |
| RETURN ('N'); | | 1 |

Table 3 shows the table MONTHS, which the rule VALID_DATE refers to. note the two columns for the numbers of days in a month for leap years and non-leap years.

Table 4 shows a rule containing a FORALL statement. The rule COUNT_CARS calculates the number of owners with cars of a given model and year and then prints the result (MODEL and YEAR are fields in the table CARS). The rule has no conditions. The standard routine MSLOG presents the result of the summation in the message log (the symbol ‖ is the concatenation operator).

Table 5 shows the table CARS, which the rule COUNT_CARS refers to.

TABLE 3

| | | The Table MONTHS | | |
|---|---|---|---|---|
| MONTH | ABBR | NAME | DAYS | LDAYS |
| 1 | JAN | JANUARY | 31 | 31 |
| 2 | FEB | FEBRUARY | 28 | 29 |
| 3 | MAR | MARCH | 31 | 31 |
| 4 | APR | APRIL | 30 | 30 |
| 5 | MAY | MAY | 31 | 31 |
| 6 | JUN | JUNE | 30 | 30 |
| 7 | JUL | JULY | 31 | 31 |
| 8 | AUG | AUGUST | 31 | 31 |
| 9 | SEP | SEPTEMBER | 30 | 30 |
| 10 | OCT | OCTOBER | 31 | 31 |

TABLE 3-continued

| 11 | NOV | NOVEMBER | 30 | 30 |
| 12 | DEC | DECEMBER | 31 | 31 |

TABLE 4

The Rule COUNT_CARS

```
COUNT_CARS (MDL, YY);
LOCAL COUNT;

FORALL CARS WHERE MODEL=MDL AND              1
YEAR=YY
    COUNT = COUNT + 1;
    END;
CALL MSGLOG ('RESULT:' || COUNT);            2
```

TABLE 5

The Table CARS

| LICENSE | MODEL | YEAR | PRICE |
|---|---|---|---|
| ASD102 | FIESTA | 86 | 7599 |
| BNM029 | ESCORT | 84 | 5559 |
| BXT524 | TAURUS | 88 | 12099 |
| FDS882 | TEMPO | 87 | 10099 |
| GET347 | THUNDERBIRD | 57 | 10999 |
| LLA498 | FIESTA | 87 | 85059 |
| PFF356 | MUSTANG | 84 | 10599 |
| RTY211 | TORINO | 85 | 9599 |
| SOT963 | LTD | 86 | 15159 |
| TDS412 | THUNDERBIRD | 88 | 35299 |

RULE DEFINITION

The rule definition, the first part of a Huron Rule, contains a rule header (obligatory) and a declaration of local variables (optional).

Rule Header

The rule header gives a name to the rule and defines its parameters (if any). Parameter passing between rules is by value: a called rule cannot alter the value of a parameter. The data representation of a parameter is dynamic: it conforms to the semantic data type and syntax of the value assigned to it. The scope of a parameter is the rule in which the parameter is defined. Table 6 gives an example of a rule header.

TABLE 6

Rule Header for the Rule LEAPYEAR
LEAPYEAR (YEAR);

Declaration of Local Variables

Local variables are declared below the rule header. The scope of a local variable is the rule in which it is defined and any descendant rules. A local variable can be assigned an arithmetic value or a string and can be used anywhere in an action. The data representation of a local variable is dynamic: it conforms to the semantic data type and syntax of the value assigned to it. Local variables are initialized to null (i.e., zero, the logical 'N', or the null string, depending on the usage). Table 7 gives an example of a local variable declaration.

TABLE 7

Declaration of the Local Varibales
SUM and RESULT
LOCAL SUM, RESULT;

CONDITIONS

Conditions, which are logical expressions evaluated for their truth value, determine the flow of control in a rule. Conditions are evaluated sequentially, and, if one of them is satisfied, the actions corresponding to it are executable, and no further conditions are evaluated. If there are no conditions (as in the rule in Table 4), then the rule's actions are executable.

Table 8 gives some examples of conditions. REMAINDER and SUPPLIER_LOC are functions which return values. Although one of them is a system supplied standard routine and one is a user routine, there is no distinction in the invocation.

TABLE 8

Conditions
```
CARS.PRICE > INPUT.MIN;
REMAINDER (YEAR, 4) = 0;
INVOICE.LOCATION = SUPPLIER_LOC(INPUT.SUPP#);
```

Note: the example rules in earlier tables show that the part of a rule that contains conditions also contains a Y/N Quadrant, which displays Y/N ("yes/no") values. The Y/N values coordinate conditions and actions. Huron supplies the Y/N values, however, not the user. The function of the Y/N Quadrant will become clear in the section on actions.

ACTIONS

An action is an executable statement. Action sequence numbers determine which actions will be executed for each particular condition. The same action can be executed for different condition.

A rule, in effect, is an extended case statement. The conditions and actions can be read as follows:

```
CASE:
    condition 1:      actions
    condition 2:      actions
    . . .
    condition n:      actions
    else:             actions
END CASE;
```

Consider the rule in Table 9, for example.

The conditions and actions in the rule VALID-DATE can be read as the case statement below:

```
CASE:
    DD <= 0;          CALL MSGLOG ('INVALID DAY ENTERED');
                      RETURN ('N');
```

```
            -continued
LEAPYEAR (YY):    GET MONTHS
                      WHERE MONTH = MM & LDAYS >= DD;
                  RETURN ('Y');
ELSE:             GET MONTHS
                      WHERE MONTH = MM & DAYS >= DD;
                  RETURN ('Y')
END CASE;
```

The actions available in the rule language are described below.

TABLE 9

|  | Action Sequence Numbers | | | |
|---|---|---|---|---|
| VALID_DATE (YY, DD); | | | | |
| DD <= 0; | | Y | N | N |
| LEAPYEAR (YY); | | | Y | N |
| CALL MSGLOG ('INVALID DAY ENTERED'); | | 1 | | |
| GET MONTHS WHERE MONTH=MM & LDAYS >= DD; | | | 1 | |
| GET MONTHS WHERE MONTH=MM & DAYS >= DD; | | | | 1 |
| RETURN ('N'); | | 2 | | |
| RETURN ('Y'); | | | 2 | 2 |

```
ON GETFAIL;
    CALL MSGLOG ('INVALID MONTH/DAY COMBINATION');
    RETURN ('N');
```

Assignment Statements

There are two kinds of assignment statement. In simple assignment, a single value is assigned to a field of a table or to a local variable. Table 10 shows simple assignment.

TABLE 10

Simple Assignment
CARS.PRICE = (PRICES.BASE + PRICES.SHIPPING)
    *TAXES.RETAIL;
AMOUNT = PRINCIPAL * (1 + INTEREST) ** YEARS;

In assignment-by-name, all the values of the fields of the table on the right are assigned to identically named fields of the table on the left. Table 11 shows an example. Assignment-by-name is a convenient way of assigning all the values of fields of a screen table to fields of a data table, or vice versa.

TABLE 11

Assignment-by-Name
ORDERS.* = ORDER_SCREEN.*;

Rule Invocation

A rule can invoke another rule implicitly through a logical or arithmetic expression that uses functional notation or explicitly with a CALL statement. Table 12 shows the implicit invocation of the function REMAINDER(YEAR, 4), which is a standard routine that returns an integer.

TABLE 12

Implicit Invocation of a Rule
R = REMAINDER (YEAR, 4);

RETURN Statement

A rule is a function if it contains a RETURN statement, which specifies the result. Table 13 shows examples of RETURN statements.

TABLE 13

RETURN Statement
RETURN ('Y');
RETURN (CARS.PRICE – REBATE);

CALL Statement

The CALL statement can invoke a rule directly by referring to the rule by its name or indirectly by referring to a field of a table or to a parameter which contains the name of the rule.

The first two examples in Table 14 invoke the rule SELECT_RENTAL directly. Note that arguments in CALL statements can be passed by an argument list or by a WHERE clause. A parameter keyword in a WHERE clause must be the name of a parameter in the rule header of the called rule. The calls in the first two examples have identical effects, but the calls use different parameter passing mechanisms. All parameters must be specified when a rule is called.

TABLE 14

CALL Statement
CALL SELECT_RENTAL (NEAREST_CAR(LOCATION));
CALL SELECT_RENTAL
    WHERE RENTAL_LOC = NEAREST_CAR(LOCATION);
CALL PFKEYS.ROUTINE;

The last example in Table 14 invokes a rule indirectly. The value of the field ROUTINE in the table PFKEYS is the name of the rule to be executed.

Table I/O

A Huron database is a collection of tables. Rules access tables on an occurrence basis. When a rule refers to a table, it creates a table template, which serves as a window to the table. Rules enter new information into the table by first placing the new data in the appropriate fields of a table template and then executing either a REPLACE or an INSERT statement. Rules retrieve information from the table into a table template with a GET statement or a FORALL statement. Rules delete information from the table by placing the information in a table template and then executing a DELETE statement (the table template is undefined after a DELETE statement).

Selection Criteria

For a GET, FORALL, or DELETE statement, selection criteria can be specified in a WHERE clause. The WHERE clause contains a predicate composed of one or more comparisons. The predicate is evaluated before data is placed in the table template.

Table parameters can be specified in list form or in a WHERE clause (the two forms correspond to the two methods of parameter passing in the CALL statement).

GET Statement

The GET statement retrieves the first occurrence in a table satisfying the specified selection criteria. Table 15 gives examples.

TABLE 15

GET Statement
GET STUDENTS;
GET STUDENTS WHERE STUDENT# = '810883';
GET MONTHS WHERE MONTH = MM and DAYS >= DD;
GET EMPLOYEES WHERE EMP# = INPUT.EMP;

In the first example of Table 15, the GET statement retrieves the first occurrence in the table STUDENTS. In the second example, the GET statement retrieves the first occurrence in the table STUDENTS whose field STUDENT# has a value equal to 810883. In the third example, the GET statement retrieves the first occurrence in the table MONTHS whose field MONTH has a value equal to the value of MM and whose field DAYS has a value greater than or equal to the value of DD. In the fourth example, the GET statement retrieves the first occurrence in the table EMPLOYEES whose field EMP# is equal to the value of the field EMP of the table INPUT.

If there are no occurrences that meet the selection criteria, the GETFAIL exception is signaled.

FORALL Statement

The FORALL statement, which is a looping construct, processes a set of occurrences. The body of the loop consists of the statements to be executed for each occurrence satisfying the selection criteria. Nesting of FORALL statements is allowed.

A FORALL statement contains a table name, an optional WHERE clause, optional ORDERED clauses, an optional UNTIL clause, and actions. A colon (:) comes after the optional clauses (or the table name, if there are no optional clauses). The actions, which comprise the body of the loop, come on separate lines after the colon. An "END;" clause, on a separate line, marks the end of the FORALL statement. Table 16 gives an example of a FORALL statement.

TABLE 16

FORALL Statement
FORALL CARS:
    CALL PRINT_CARS;
END;

As with all table access statements, parameters can be specified in an argument list or in a WHERE clause. Selection on fields is also specified in the WHERE clause, as in Table 17.

TABLE 17

Selection Criteria in FORALL
Statements
FORALL CARS WHERE MODEL = MDL AND YEAR = YY:
FORALL EMPLOYEES WHERE HIREDATE >*.BIRTHDATE+40:
FORALL EMPLOYEES WHERE LASTNAME LIKE '*SON':

A WHERE clause in a FORALL statement has the same effect as in a GET statement. In the first example of Table 17, the FORALL statement retrieves all occurrences in the table CARS whose field MODEL has a value equal to the value of MDL and whose field YEAR has a value equal to the value of YY.

A WHERE clause can refer to the current table with an asterisk (*). In the second example of Table 17, the FORALL statement retrieves all occurrences in the table EMPLOYEES for which the field HIREDATE has a value greater than the value of the field BIRTHDATE plus 40.

A WHERE clause can contain the "partial match" operator LIKE, which allows comparison of incompletely specified data strings. Incompletely specified data strings can refer to zero or more unspecified characters with an asterisk (*), and they can refer to one unknown character with a question mark (?). In the last example of Table 17, the FORALL statement retrieves all occurrences in the table EMPLOYEES in which the field LASTNAME ends in "SON".

When a FORALL statement is executed, table occurrences are retrieved in primary key order, unless a different order is specified by one or more ORDERED clauses. In the example of Table 18, the occurrences will be presented sorted by descending values of the field PRICE, then by ascending values of the field MODEL, and then by ascending values of the primary key LICENSE (the default for ordering is ASCENDING).

Execution of a FORALL statement will terminate under either of two circumstances: (1) all occurrences satisfying the FORALL selection criteria have been processed, or (2) an exception is detected during the execution of the statements comprising the loop.

The table template is undefined at the end of a FORALL statement. Accessing CARS.MODEL after the FORALL statement in the example of Table 18 would not provide the model of the last car, but would cause the UNASSIGNED exception.

TABLE 18

FORALL Statement with Ordering
FORALL CARS (INVOICE.CITY)
    ORDERED DESCENDING PRICE AND
    ORDERED ASCENDING MODEL:
    CALL $PRINTLINE ('CAR ID'||CARS.LICENSE#||
      'MODEL'||CARS.MODEL||'RETAIL PRICE:$||
    CARS.PRICE);
    END;

INSERT Statement

The INSERT statement adds a new occurrence to a table in the database. No field selection is possible: the WHERE clause can only specify parameter values.

Occurrences within a table must have unique primary keys. An attempt to insert an occurrence with a primary key that already exists will cause the INSERTFAIL exception.

Table 19 gives examples of the INSERT statement. Note that, in the second example, CITY is a parameter. The third example shows another way to specify the same parameter.

TABLE 19

INSERT Statement
INSERT STUDENT;
INSERT CARS WHERE CITY = INPUT.CITY;
INSERT CARS (INPUT.CITY);

REPLACE Statement

The REPLACE statement updates an occurrence in the database. No field selection is possible: the WHERE clause can only specify parameter values.

If the occurrence does not exist, the REPLACEFAIL exception is signaled. In order to alto the primary key value of the occurrence, it is necessary to DELETE the old occurrence and INSERT the new one.

Table 20 gives examples of the REPLACE statement. Note that, in the second example, CITY is a parameter. The third example shows another way of specifying the same parameter.

TABLE 20

REPLACE Statement
REPLACE STUDENTS;
REPLACE CARS WHERE CITY = INPUT.CITY;
REPLACE CARS (INPUT.CITY);

DELETE Statement

The DELETE statement removes an occurrence from a table in the database. A WHERE clause can specify field selection on the primary key field if the relation specified is equality. No other field selection is allowed. A WHERE clause can specify parameter values, as usual.

If the primary key is specified in a WHERE clause, then that occurrence is deleted. If no primary key is specified, then the occurrence referred to by the primary key in the table template is deleted. If the occurrence does not exist in the table, the DELETEFAIL exception is signaled.

Table 21 gives examples of the DELETE statement.

TABLE 21

DELETE Statement
DELETE STUDENT;
DELETE STUDENT WHERE ID = '810883';
DELETE CARS ('TORONTO');

User Interface

Screens are the standard user interface. They support input from a keyboard and produce output to a terminal.

DISPLAY Statement

The DISPLAY statement causes the specified screen to be displayed, and any input that is entered on the screen is available for processing. Table 22 gives an example of the DISPLAY statement.

TABLE 22

DISPLAY Statement
DISPLAY CAR_INPUT;

UNTIL . . . DISPLAY Statement

The UNTIL . . . DISPLAY statement, which is a looping construct, displays a screen repetitively. The body of the loop consists of statements which are executed each time the screen is displayed. Inside the body of the loop, any input is available for processing. Table 23 gives an example of an UNTIL . . . DISPLAY statement.

TABLE 23

UNTIL . . . DISPLAY Statement

UNTIL DONE DISPLAY QUERY_SCREEN:
    CALL PROCESS_QUERY;
    END;

Looping: UNTIL Clause

Two constructs allow looping, the FORALL statement, which can contain an UNTIL clause, and the UNTIL . . . DISPLAY statement. The statements between the FORALL part or the UNTIL . . . DISPLAY part, which is terminated with a colon (:), and the "ENDS;" clause comprise the body of the loop.

The UNTIL clause specifies one exception or two or more exceptions separated by the keyword OR. Looping terminates if an exception is detected. Table 24 gives an example of a FORALL statement with an UNTIL clause.

TABLE 24

FORALL . . . UNTIL Statement

FORALL SRC_TBL1 UNTIL GETFAIL:
    GET SRC_TBL2 WHERE LINE_NUM =
    SRC_TBL1.LINE_NUM;
    CALL CMP_LINES (SRC_TBL1.TEXT,
    SRC_TBL2.TEXT);
    END;

If a loop terminates because of an exception, control passes to new actions as follows:

If the exception is specified in an UNTIL clause for the loop, then the actions executed next will be those following the END clause of the loop (control passes to those actions even if there is an ON statement for that exception in the exception handler part of the rule). Upon completion of those actions, the rule is finished executing and control passes to the caller. Execution does NOT resume at the point where the exception was detected.

If the exception is not specified in an UNTIL clause for the loop but is specified in an ON statement in the exception handler part of the rule, then the exception will be handled in the usual way: the actions executed next will be those listed in the ON statement.

If the exception is not specified in an UNTIL clause for the loop or in an ON statement in the exception handler part of the rule, then the exception will be handled in the usual way: either the exception will be trapped by an exception handler in a rule higher in the calling hierarchy or the transaction will terminate.

Synchronization

Five statements control the synchronization of transaction, the COMMIT statement, the ROLLBACK statement, the SCHEDULE statement, the TRANSFERCALL statement, and the EXECUTE statement.

COMMIT and ROLLBACK Statements

The statements COMMIT and ROLLBACK establish transaction synchronization points. All or none of the changes between synchronization points will be applied to the database.

Normal termination of a transaction implies COMMIT, and abnormal termination implies ROLLBACK. Table 25 shows COMMIT and ROLLBACK statements.

TABLE 25

COMMIT and ROLLBACK Statements

COMMIT;
ROLLBACK;

SCHEDULE Statement

The SCHEDULE statement allows asynchronous processing by allowing a rule to be queued for execution independently of the current transaction. The rule to be executed must exist when the SCHEDULE statement is executed. The name of a queue can be specified by an optional TO clause. Definition of queues is handled by system parameters and is not done within the rule language.

Queuing depends on the normal completion of the current transaction, that is, completion in accordance with the transaction protocol. Table 26 shows examples of SCHEDULE statements.

TABLE 26

SCHEDULE Statement

SCHEDULE PRINT_INVOICE ( INPUT.INVOICE# );
SCHEDULE TO WEEKEND
    CLEANUP WHERE LOCATION = INPUT.CITY;

TRANSFERCALL Statement

The TRANSFERCALL statement terminates the current transaction and invokes a new one. Control does not pass back to the calling rule. When the called rule is finished executing, the transaction is complete.

Like the CALL statement, the TRANSFERCALL statement can invoke a rule directly by referring to the rule by its name or indirectly by referring to a field of a table or to a parameter which contains the name of the rule. The first two examples in Table 27 invoke the rule SELECT_RENTAL directly, and the last example invokes the rule whose name is the value of the field ROUTINE of the table PFKEYS.

TABLE 27

TRANSFERCALL Statement

TRANSFERCALL SELECT_RENTAL
    (NEAREST_CAR(LOCATION));
TRANSFERCALL SELECT_RENTAL
    WHERE RENTAL_LOC =
    NEAREST_CAR(LOCATION);
TRANSFERCALL PFKEYS.ROUTINE;

EXECUTE Statement

The EXECUTE statement invokes a descendant transaction. Control passes back to the original transaction on completion of the executed transaction. (Note that the CALL statement invokes a rule within the scope of the current transaction, but the EXECUTE statement invokes a rule that starts an independent transaction.)

Like the CALL statement, the EXECUTE statement can invoke a rule directly by referring to the rule by its name or indirectly by referring to a field of a table or to a parameter which contains the name of the rule. The first two examples in Table 27 invoke the rule SELECT_RENTAL directly, and the last example invokes the rule whose name is the value of the field ROUTINE of the table PFKEYS.

TABLE 28

EXECUTE Statement

EXECUTE SELECT_RENTAL
    (NEAREST_CAR(LOCATION));
EXECUTE SELECT_RENTAL
    WHERE RENTAL_LOC =
    NEAREST_CAR(LOCATION);
EXECUTE PFKEYS.ROUTINE;

Exceptions: SIGNAL Statement

The SIGNAL statement causes the exception specified within the statement. An ON statement or an UNTIL clause can subsequently detect and process an exception caused by the SIGNAL statement.

In Table 29, the SIGNAL statement causes a user-defined exception MISSING_INVOICE.

Note: the SIGNAL statement gives the user a way to signal exceptions. The system automatically signals system exceptions such as GETFAIL or ERROR when it detects an error.

TABLE 29

SIGNAL Statement

SIGNAL MISSING_INVOICE;

EXCEPTION HANDLINE

The fourth part of a rule contains exception handlers (if there are any).

ON Statement

An exception handler is an ON statement that contains the name of an exception followed by a sequence of actions to be executed in the event that the exception is detected.

The ON statement is in effect only during the execution of the actions of the rule in which it occurs. It will trap exceptions generated both in the rule and in any of the rule's descendants (rules which are below the rule in the calling hierarchy).

If ON statements in two or more rules at different levels in the calling hierarchy can handle the same exception, the ON statement in the lowest rule handles the exception.

System exceptions are hierarchically defined (the hierarchy is presented in the next section). If more than one handler within a rule can handle an exception, the most specific handler will handle it. For example, GETFAIL is lower than ACCESSFAIL in the exception hierarchy. If a rule has both a GETFAIL handler and an ACCESSFAIL handler, and a GETFAIL exception occurs, the GETFAIL handler will be invoked. If the rule has no GETFAIL handler but does have an ACCESSFAIL handler, the ACCESSFAIL handler will be invoked.

In Table 30, the exception DATE_INVALID caused by the SIGNAL statement, if it is trapped, is trapped higher in the calling hierarchy, because DATE_INVALID is not handled in the rule CUSTINFO. The rule that called CUSTINFO, for example, might trap this exception. If the exception DATE_INVALID is not trapped, the transaction terminates with an error condition, and the message log shows that the exception was signaled.

The GETFAIL handler (ON GETFAIL CUSTOMER) will handle a GETFAIL exception if it occurs on a GET access to the table CUSTOMER when the rule VALID_DATE is invoked (assuming VALID_DATE does not provide its own handler), or if it occurs in the GET CUSTOMER statement.

TABLE 30

| Exception Handling | | |
|---|---|---|
| CUSTINFO(DATE, ID) ; | | |
| VALID_DATE(DATE); | Y | N |
| GET CUSTOMER WHERE NAME = ID;<br>SIGNAL DATE_INVALID; | 1 | 1 |
| ON GETFAIL CUSTOMER :<br>CALL ENTER_CUSTOM; | | |

Data access exception handlers (handlers for GETFAIL, INSERTFAIL, DELETEFAIL, REPLACEFAIL, ACCESSFAIL, and DEFINITIONFAIL) can limit their scope by specifying a table name, as in Table 30. If a table name is specified, the handler will only trap the corresponding exception if it is detected while accessing that table. If no table is specified, the handler will trap the exception regardless of what table is being accessed.

The statements comprising an exception handler might cause the same exception. If this happens (and the second exception is not handled somewhere lower in the calling hierarchy), the currently executing handler will not handle the second exception. The rule executor will detect a possible "infinite loop" condition and abort the transaction.

Exception Hierarchy

The run time environment signals system exceptions to permit an application to recover from an error. System exceptions form a hierarchy of names. The ERROR exception will trap all detectable errors, but the GETFAIL exception will only trap a table occurrence not found on execution of a GET statement. The following diagram shows all of the system exception names with their relative position in the hierarchy.

```
                          ERROR
        ┌───────────┬──────────────┬──────────┬──────────┐
    ACESSFAIL   INTERGRITYFAIL   RULEFAIL       user
        │            │               │         defined
        │            │               │       exceptions
    DELETEFAIL   COMMITLIMIT      CONVERSION
    DISPLAYFAIL  DEFINITIONFAIL   DATAREFERENCE
    GETFAIL      LOCKFAIL         EXECUTEFAIL
    INSERTFAIL   SECURITYFAIL     OVERFLOW
    REPLACEFAIL  VALIDATEFAIL     STRINGSIZE
                                  UNASSIGNED
                                  UNDERFLOW
                                  ZERODIVIDE
```

Three levels of exceptions are defined, and an exception will trap any of the exception names that are below it in the hierarchy. The conditions under which each of these exceptions is signaled are described below. ACCESSFAIL table access error has been detected COMMITLIMIT—limit on number of updates for one transaction has been reached CONVERSION—value contains invalid data for syntax or cannot be converted to target syntax DATAREFERENCE—error in specification of selection criteria has been detected DEFINITIONFAIL—error in definition of a table has been detected DELETEFAIL—key for DELETE statement does not exist DISPLAYFAIL—error in displaying a screen has been detected ERROR—an error has been detected EXECUTEFAIL—an error in the child transaction has been detected GETFAIL—no occurrence satisfies the selection criteria INSERTFAIL—key for INSERT statement already exists LOCKFAIL—there is a lock on an occurrence or a table is unavailable or a deadlock has occurred OVERFLOW—value is too big to be assigned to target syntax REPLACEFAIL—key for REPLACE statement does not exist RULEFAIL—error results from arithmetic computation SECURITYFAIL—permission for requested action is denied STRINGSIZE—size error in assigning one string to another has been detected UNASSIGNED—a field of a table that has not been assigned a value has been referenced UNDERFLOW—value is too small to be represented in target syntax (mostly exponential errors)

VALIDATEFAIL—validation exit requested through validation exit key

ZERODIVIDE—attempt to divide by zero has been detected

EXPRESSIONS, OPERATORS, AND DATA TYPES

Conditions, actions, and exception handlers contain expressions. Expressions may contain arithmetic operators and/or a string-concatenation operator. These operators conform with conventional notation, and they obey the precedence given below (exponentiation has highest precedence):

| | |
|---|---|
| ** | exponentiation |
| *,/ | multiplication, division |
| +,− | unary +, unary − |
| +,−,\|\| | addition, subtraction, string-concatenation |

A sequence of arithmetic operators or string-concatenation operators of the same precedence is evaluated from left to right. Table 31 shows operators within expressions.

TABLE 31

Expressions (PRICES.BASE + PRICES.SHIPPING) * TAXES.RETAIL
PRINCIPAL * ( 1 + INTEREST) ** YEARS Each element of an expression has a syntax and a semantic data type. The syntax describes how the data is stored, and the semantic data type describes how the element can be used.

Syntax

The syntax for values of a field of a table is specified in the table definition. The maximum length of the field is also specified in the table definition.

Valid specifications for syntax are:

B (binary)
  valid lengths are 2 and 4 bytes
P (packed decimal)
  valid lengths range from 1 to 8 bytes, which can hold from 1 to 15 decimal digits
  the number of decimal digits is specified in the table definition
F (floating point)
  valid lengths are 4, 8, and 16 bytes, for a primary key field, or from 1 to 256 bytes for other fields
C (fixed length character string)
  valid lengths range from 1 to 128 bytes, for a primary key field, or from 1 to 256 bytes for other fields
V—variable length character string
  valid lengths range from 3 to 128 bytes, for a primary key field, or from 3 to 256 bytes for other fields
  storage is reserved for the length specified, but string operations use the current length

Semantic Data Types

The semantic data type for values of a field of a table is specified in the table definition. The semantic data type determines what operations can be performed on values of the field. Operators in the language are defined only for meaningful semantic data types. For example, negating a string or adding a number to an identifier are invalid operations (consider adding 3 to a license plate number)

Valid semantic data types and their permitted syntax are:

I (identifier)
  C (fixed length character string)
  V (variable length character string)
  B (binary)
  P (packed decimal)
S (string)
  C (fixed length character string)
  V (variable length character string)
L (logical)
  C (fixed length character string of length 1)
    Possible values:
      Y (yes)
      N (no)
C (count)
  C (fixed length character string)
  V (variable length character string)
  B (binary)
  P (packed decimal with no decimal digits)
Q (quantity)
  C (fixed length character string)
  V (variable length character string)
  B (binary)
  P (packed decimal)
  F (floating point)

Comparison Operators

The rule language contains the following operators for making comparisons:

=
¬=
<
<=
>
>=

Note the following points about semantic data types in expressions containing these operators:

The relational operators for equality and inequality (=, ¬=) allow any two operands of the same semantic data type. These operators allow two operands of different semantic data types if the types are identifier and string or identifier and count.

The relational operators for ordering (<, <=, >, >=) allow any two operands of the same semantic data type except logical. Values of type logical are not permitted in comparisons which involve ordering.

Trailing blanks are significant for variable length strings, but not for fixed length strings. For example, comparison of two fixed length strings X and Y with lengths 12 and 16 will have the same result as if the shorter string X had been padded with four blanks on the right.

If syntax differs, operands are converted to a common syntax.

The result of a comparison is always a logical value ('Y' or 'N').

The Assignment Operator

The rule language uses the equal sign (=) as the assignment operator. Note the following points about semantic data types in expressions containing this operator:

A value of any semantic data type can be assigned to a field of the same semantic data type.

A value of type identifier can be assigned to a field of type count (and vice versa).

A value of type identifier can be assigned to a field of type string (and vice versa).

A value of type string can be assigned to a field of type quantity (and vice versa).

A value of type string can be assigned to a field of type count (and vice versa).

Arithmetic Operators

The rule language contains the following operators for doing arithmetic:

The arithmetic operators allow two operands in these combinations:

\*\*

\*

/

+

−

The arithmetic operators allow two operands in these combinations:

count and count quantity and quantity count and quantity

The Concatenation Operator the rule language uses a double vertical bar (||) as the concatenation operator. The concatenation operator is valid between any two semantic data types, and the result is always a variable length string.

Indirect Table and Field References

To assist the coding of generic routines and utility functions, the rule language permits indirect references to table and field names.

The rule COUNT in Table 32 is a generic routine that determines the sum of a field over all occurrences. This rule generalizes the rule COUNT_CARS in Table 4 so that it sums any field of any table (more precisely, any table without parameters): it receives the name of the table in the parameter TABLEREF, an it receives the name of the field in the parameter FIELDREF. The parentheses around the names TABLEREF and FIELDKEF signify indirection.

The FORALL statement in the rule COUNT shows the two kinds of indirect reference. First, the FORALL statement loops over the table specified by the indirect table reference "(TABLEREF)". Second, the action in the body of the loop involves the field specified by the indirect field reference "(FIELDKEF)". Suppose that the rule is call in this way:

CALL COUNT('PARTS','PRICE')

The value of TABLEREF will be 'PARTS', the value of FIELDREF will be 'PRICE', and the call will find the sum of the prices of all parts.

TABLE 32

Indirect References. The example invocations and their results show how indirect references can generalize a rule.

TABLE 32-continued

COUNT(TABLEREF, FIELDREF);
LOCAL SUM;

| | |
|---|---|
| FORALL TABLEREF<br>SUM = SUM + (TABLEREF).(FIELDREF) ;<br>END; | 1 |
| CALL SPRINTLINE('THE SUM OF' \|\| TABLEREF<br>\|\| ' ' \|\| FIELDREF \|\| ' IS: ' \|\| SUM); | 2 |

Example Invocation:
  CALL COUNT('CARS', 'PRICE');
Resulting printline:
  THE SUM OF CARS PRICE IS: 5690230.19
Example Invocation:
  CALL COUNT('PARTS', 'QUANTITY');
Resulting printline:
  THE SUM OF PARTS QUANTITY IS: 6750

SYNTAX

A complete, formal syntax of the rule language in Backus-Naur Form (BNF) follows.

BNF Notation (a) Lower case words enclosed in angle brackets, <>, denote syntactic categories. For example:
  <start character>

(b) In a list of alternatives each alternative starts on a new line.

(c) A repeated item is enclosed in braces, {}. The item may appear zero or more times. For example:
  {<digit>}

(d) Optional categories are enclosed in square brackets, []. For example:
  [<exponent>]

Character Set

All rule language constructs are represented with a character set that is subdivided as follows:

(a) letters
A B C D E F G H I J K L M N O P Q R S T U V W X Y Z (b) digits
0 1 2 3 4 5 6 7 8 9

(c) special characters
@ # $ | ¬ & * ( ) − _ = + ; : ' , . / < >

Lexical Elements

A rule is a sequence of lexical elements. Lexical elements are identifiers (including reserved words), numeric literals, string literals and delimiters. A delimiter is one of the following special characters

| ¬ & * ( ) − + = : ; ' , / < > or one of the following compound symbols

** <= >= ¬= ||

Adjacent lexical elements may be separated by spaces or a new line. An identifier or numeric literal must be separated in this way from an adjacent identifier or numeric literal. The only lexical element which may contain a space is the string literal. String literals may span more than one line; all other lexical elements must fit on a single line.

Identifier

Rule language identifiers may not exceed 16 characters in length.

```
<identifier> ::=
<start character> { <follow character> }
<start character> ::=
    A B C D E F G H I J K L M N O P Q R S T U V W X Y Z @ # $
<follow character> ::=
    <start character>
    <digit>
<digit> ::=
    0 1 2 3 4 5 6 7 8 9
```

Numeric Literals

The rule language supports the following forms of numeric literals:

```
<numeric literal> ::=
    <digits> [ . <digits> ] [ <exponent>]
<digits> ::=
    digit { <digit> }
<digit> ::=
    0 1 2 3 4 5 6 7 8 9
<exponent> ::=
    E [ <sign> ] <digits>
<sign> ::=
    ±
```

String Literals

A string literal is zero or more characters enclosed in single quotes:

```
<string literal> ::=
    ' { <character> } '
```

Single quotes within a string literal are written twice. Thus the following string literal is a single quote ''''.

Reserved Words

The following list of names are reserved by the system as key words in the rule language.

```
AND         ASCENDING    CALL
COMMIT      DELETE       DESCENDING
DISPLAY     END          EXECUTE
FORALL      GET          INSERT
LOCAL       NOT          ON
OR          ORDERED      REPLACE
RETURN      ROLLBACK     SCHEDULE
SIGNAL      TO           TRANSFERCALL
UNTIL       WHERE        LIKE
```

Syntax of Rules

```
<rule> ::=
<rule declare > <cond list> <action list> <exception list>

<rule declare> ::=
    <rule header> [ <local name declaration> ]

<rule header> ::=
    <rule name> [ <rule header parm list> ] ;

<rule header parm list> ::=
    ( <rule parameter name> { , <rule parameter name> } )

<local name declaration> ::=
    LOCAL <local name> { , <local name> } ;

<cond list> ::=
    { <condition> ; }

<condition> ::=
    logical value>
    NOT <logical value>
    <expression> <relop> <expression>

<logical value> ::=
    <field of a table>
    <rule parameter name>
    <function call>

<action list> ::=
    <action> { <action> }

<exception list> ::=
    { <on exception> }
<on exception> ::=
    ON <exception designation> : { <action> }

<action> ::=
    <statement> ;

<statement> ::=
    <assignment>
    <rule call>
    <function return>
    <table access stmt>
    <sync processing>
    <display processing>
    <signal exception>
    <asynchronous call>
    <iterative display processing>

<assignment> ::=
    <assignment target> = <expression>
    <assign by name>

<assignment target> ::=
    <field of a table>
    <local name>

<assign by name> ::=
    <table ref> .* = <table ref> .*

<rule call> ::=
    CALL <call spec> [ <call arguments> ]

<call spec> ::=
    <rule name>
    <rule parameter name>
    <table name> . <field name>

<call arguments> ::=
    <arg list>
    WHERE <where arg lists>

<where arg lists> ::=
    <where arg istem> { <and> <where arg item> }

<where arg item> ::–
    <identifier> = <expression>

<function return> ::=
    RETURN ( <expression> )

<table access stmt> ::=
    <get stmt>
    <insert stmt>
    <replace stmt>
    <delete stmt>
    <forall stmt>

<get stmt> ::=
```

```
GET <occ spec>

<occ spec> ::=
    <table spec> [ WHERE <where predicate> ]

<table spec> ::=
    <table name> [ <arg list> ]
    <rule parameter name> [ <arg list> ]
    <table name> . <field name> [ <arg list> ]

<where predicate> ::=
    <where nexpr> { <logical op> <where nexpr> }

<where nexpr> ::=
    { <not> } <where expr>

<where expr> ::=
    <where relation>
    ( <where predicate> )

<where relation> ::=
    <fieldname> <relational op> <where expression>

<where expression> ::=
    [ <unary op> ] <where expr term>
            { <add op> <where expr term> }

<where expr term> ::=
    <where expr factor> { <mult op> <where expr factor> }

<where expr factor> ::=
    <where expr primary> [ <exp op> <where expr primary> ]

<where expr primary> ::=
    ( <where expression> )
    <where field of a table>
    <rule parameter name>
    <local name>
    <function call>
    <constant>

<where field of a table> ::=
    <where table ref> . <field ref>

<where table ref> ::=
    *
    <table name>
    ( <rule parameter name> )
    ( <table name> . <field name> )

Notice that the <where table ref> production
    allows a "*" to be specified as the table name.

<insert stmt> ::=
    INSERT <table spec> [ WHERE <where arg list> ]

<replace stmt> ::=
    REPLACE <table spec> [ WHERE <where arg list> ]

<delete stmt> ::=
    DELETE <table spec> [ WHERE <where arg list> ]

<forall stmt> ::=
    FORALL <occ spec> [ <table order> ] [ <until clause> ]
                    : <for alist> END <until clause> ::=
    UNTIL <exceptions>

<exceptions> ::=
    <exception designation> {<or> <exception designation>}

<exception designation> ::=
    <exeption name> [ <table name> ]

<exception name> ::=
    <identifier>

<for alist> ::=
    { <for action> ; }

<for action> ::=
    <assignment>
    <rule call>
    <table access stmt>
    <display processing>
    <asynchronous call>
    <iterative display processing>
    COMMIT <table order> ::=
    <table order item> { AND <table order item> }

<table order item> ::=
    ORDERED [ <ordering> ] <field name>

<ordering> ::=
    ASCENDING
    DESCENDING

<order clause> ::=
    ORDER <order item> {<and> <order item>}
<order item> ::=
    ORDERED <fieldname>
    ORDERED ASCENDING <fieldname>
    ORDERED DESCENDING <fieldname>

<sync processing> ::=
    COMMIT
    ROLLBACK

<display processing> ::=
    DISPLAY <screen ref>

<screen ref> ::=
    <screen name>
    <table name> . <field name>
    <rule parameter name>

<screen name> ::=
    <identifier>

<signal exception> ::=
    SIGNAL <exception name>

<asynchronous call> ::=
    SCHEDULE [<queue spec>] <rule name> [<call arguments>]

<queue spec> ::=
    TO <expression>

<iterative display processing> ::=
    UNTIL <exceptions> <display processing> : {<action>} END <field ref> ::=
    <field name>
    ( <rule parameter name> )
    ( <table name> . <field name> )

<function call> ::=
    <function name> [ <arg lists> ]

<arg list> ::=
    ( <expression> { , <expression> } )

<expression> ::=
    [ <unary op> ] <expr term> { <add op> <expr term> }

<expr term> ::=
    <expr factor> { <mult op> <expr factor> }

<expr factor> ::=
    <expr primary> [ <exp op> <exp primary> ]

<expr primary> ::=
    ( <expression> )
    <field of a table>
    <rule parameter name>
    <local name>
    <function call>
```

```
<constant>

<field of a table> ::=
    <table ref> . <field ref>

<table ref> ::=
    <table name>
    ( <rule parameter name> )
    ( <table name> . <field name> ) <rule name> ::=
    <identifier>

<function name> ::=
    <identifier>

<rule parameter name> ::=
    <identifier>

<table name> ::=
    <identifier>

<field name> ::=
    <identifier>

<local name> ::=
    <identifier>

<unary op> ::=
    -
    +

<add op> ::=
    +
    -
    ||

<mult op> ::=
    *
    /

<exp op> ::=
    **

<logical op> ::=
    <and>
    <or>

<and> ::=
    AND
    &

<or> ::=
    OR
    |

<not> ::=
    NOT
    ¬

<relational op> ::=
    <rel op>
    LIKE

<rel op> ::=
    =
    ¬=
    >
    >=
    <
    <=

<constant> ::=
```

```
<string literal>
<numeric literal>
```

III. Table Data Store

The table data store stores data in relational tables according to the unique table data structure. This structure can best be understood by understanding how tables are built through the table access machine.

- HURON's logical access method to retrieve and access tables is the Table Access Method (TAM)
- HURON provides access to other heterogeneous databases. This facility is transparent to the user once the data definition has been done. TAM acts as a traffic cop in conjunction with the transaction processor to access the correct server—resident in other regions
- The physical access method and data organization is the TDS (Table Data Store)
- Data Stores are in a B+ Tree relational data structure
- Since HURON is a transaction system, a user's access to a large amount of data will only affect their dependent region.

Defining a TDS Table

- Table Definer is invoked using a command DT <table name> from a work bench menu or a primary command line produced by a session manager routine. The screen layout of the Table Definer is set out in Table 33.
- Standard naming conventions can be followed for the table name.
- The default table type is TDS.
- Other table types are available such as IMS, IMPORT—EXPORT (sequential) etc.
- Each table type has its own table definition screen in the session manager.
- Tables are universal to a system.
- The Security system on individual tables prevents unauthorized access to the definition and/or data.
- The syntax specifications of parameters and fields describe how the data is stored.
- The semantic specifications describe how the data should be used in applications.
- Event processing can be invoked at data definition time, however the actual rules are coded using the generalized programming language. The event processing is invoked when the data is accessed.

TABLE 33

Define Table - Screen Layout

```
DT EMPLOYEE
COMMAND==>                              TABLE DEFINITION
TABLE:EMPLOYEE       TYPE:TDS        UNIT:educ              IDGEN:N
PARAMETER NAME   TYPE  SYNTAX  LENGTH  DECIMAL  EVENT RULE  TYPE  ACCESS USERID            I      C       16
FIELD NAME      TYPE   SYNTAX  LENGTH  DECIMAL  KEY    REQ       DEFAULT EMPNO             I      P        3       0      P
LNAME             S      C       22       0
POSITION          S      C       14       0
MGR#              I      P        3       0
DEPTNO            i      B        2       0
SALARY            Q      P        3       2
HIREDATE          S      C        9       0
ADDRESS           S      V       40       0
CITY              S      C       20       0
PROV              S      C        3       0
P_CODE            S      C        7       0
PFKEYS:3=SAVE 12=CANCEL 22=DELETE 13=PRINT 21=EDIT 2=DOC 6=RETRIEVE
```

General Discussion—TDS Options

The fields of the Define Table—Screen Layout are discussed below, except for obvious ones.

TYPE: The table type specifies the access method. Table Data Store ('TDS') is the default value and is used as the reference template. Each table type has an associated template for display. When the table type is changed, the corresponding template is displayed by pressing any of the function keys or the ENTER key. Valid table types include 'TEM' (temporary), 'IMP' (import), 'EXP' (export), 'PRM' (parameter), 'SUB' (subview) and 'IMS' (IMS) and others defined by a user.

UNIT: The user unit the table is associated with is entered in this field. Valid units are provided by the database administration.

IDGEN: This informs the system that it is responsible for providing unique primary keys for each occurrence.

PARAMETER: The parameter information component is a scrollable area for multiple entries. A maximum of four entries are allowed. This feature allows the system to partition its databases based on a unique field. This mimics a hierarchial structure of data which is more common in the real world than truly relational.

NAME The field name which should be unique within the table.

TYPE The semantic type—application design control.

SYNTAX The internal representation for storage.

LENGTH The length in bytes. The system stores its' data as variable length data to optimize storage.

DECIMAL If specified, it indicates the number of digits to the right of the decimal point.

KEY The valid entry is 'P' for primary, and blank (non-key field). A table must have one field defined as its primary key. The primary key specification effectively makes the field a required one. Each occurrence in the table is uniquely identified by its primary key value.

RQD The default value for this filed is blank (not required). Other valid entries are 'Y' for required or 'N' for not required. Inserting or editing an occurrence without proper values in the required fields is not allowed.

DEFAULT The default value of the field, this will be input if the filed is left blank when a new occurrence is being added.

Semantic Data Type and Syntax

All fields of a table are bound to a semantic data type and syntax. The syntax describes how the data is stored while the semantic type describes how a field may be used. Valid semantic data types and their permitted syntaxes are:

I—identifier
C fixed length character string
V variable length character string
P packed decimal
B binary
S—string
C fixed length character string
V variable length character string
L—logical
C fixed length character string of length 1
  value of "Y" for yes
  value of "N" for no
C—count
C fixed length character string
V variable length character string
B binary
P packed decimal with no decimal digits
Q—quantity
C fixed length character string
V variable length character string
B binary
P packed decimal
F floating point Valid Field Syntaxes Specifications B—binary
valid lengths are 2 and 4 bytes
P—packed decimal
length may range from 1 to 8 bytes which can hold 1 to 15 decimal digits
number of decimal digits may be specified
F—floating point
valid lengths are 4, 8, and 16 bytes corresponding to 24, 56, and 112 binary digits of precision
C—fixed length character string
valid lengths range from 1 to 128 bytes for a primary key field and 1 to 256 bytes for other fields.
results in uppercase characters V—variable length character string valid lengths range from 3 to 128 bytes for a primary key field and 2 to 256 bytes for other fields.

storage is reserved for the maximum length possible for the string, however string operations use the current length results in upper/lower case

Table Documentation

Documentation is associated with all objects including tables. Users can specify a short summary, keywords and a long description to document any tables defined, using a documentation screen as shown in TABLE 34 invoked from the table definer. The summary is limited to one line of information. The keywords specified can be made available for use by the keyword search facility. There is space available to provide a detailed table description. Script formatting commands can be included in the long description.

Documentation

TABLE 34

| DOCUMENTATION SCREEN FOR THE EMPLOYEE TABLE |
|---|
| DESCRIPTION OF TABLE:employee      UNIT: educ |
| MODIFIED ON:    BY:   CREATED ON:88.181    BY:educ |
| KEYWORDS:    EDUCATION,EMPLOYEE |
| SUMMARY:     Table of employees parameterized by USERID |
| DESCRIPTION: |
| - This table contains employee information |
| - The education department is responsible for its contents and has designed USERID as a parameter in order to provide each course participant with a copy of the table. |
| PFKEYS: 3=EDIT OBJECT 5=EDIT/VIEW DOCUMENT |

Subview Tables

Subviews provide windows on corporate data. Users can be given a subset of the fields of a table or a subset based on selection criteria.

The Table definer is invoked using a DT <subview table name> command from the workbench menu or the command line on the screen.

Standard naming conventions are followed for the subview table name.

The subview table definer screen is invoked by changing the default table type "TDS" to "SUB", resulting in a definer screen as shown in TABLE 35.

The Security system on individual subviews prevents unauthorized access to the definition and/or use.

There is no separate space allocated for a subview. All data maintenance is actually carried out on the associated source TDS table.

TABLE 35

Screen layout of a subview table

```
DT SUB_TABLE
COMMAND=>                                    TABLE DEFINITION
   TABLE:SUB_TABLE TYPE:SUB  UNIT:educ
   SOURCE:EMPLOYEE
      SELECT:USERID = 'EDUC' & DEPTNO = 10
PARAMETER NAME      TYPE  SYN  LEN  DEC    SOURCE PARM    ORDER FIELD    SEQ

FIELD NAME     TYP  SYN  LEN  DEC  KEY  REQ  DEFAULT    SRC  SOURCE NAME

EMPLOYEENO      I    P    3    0    P                    S    EMPNO
LNAME           S    C   22    0
POSITION        S    C   14    0 ·                       S    MGR#
MANAGERNO       I    P    3    0
DEPTNO          I    B    2    0
PFKEYS:   3=SAVE 12=CANCEL 13=PRINT 15=SAVEON 21=EDIT 22=DELETE
          6=RETRIEVE 2=DOC
          TABLE TYPE CHANGED (PF6 GETS BACK ORIGINAL DEFN).
```

General Discussion—SUBVIEWS

All fields are the same as described for the 'TDS' table. Fields unique to the subview are described below.

SOURCE: Name of the source table whose subview is defined by this table. The source table must exist before its subview can be defined.

SELECT: The scope of the selection criteria is to subgroup the number of occurrences selected. If not present, all occurrences will be selected.

PARAMETERS: New parameters can be specified in the subview if there is a corresponding field in the TDS table. Source table parameters can be renamed and the source name specified in the SOURCE PARM.

ORDERING: This is a scrollable area. Ordering can be specified on a field that is not defined in the subview. Ordering is only used for display purposes. SEQ—A(scending) or D(escending)

Field Definition—Subviews:

SRC: This is the source indicator field. Fieldnames can be the same, renamed or unique to the subview table. The source indicator field identifies the status of the field in relation to the source table.

Valid entries are:

Blank

Field definition in both source and subview are the same.
S=Source:

A renamed field is indicated with this entry followed by the field name in the source table D=Derived:

A field unique to the subview table is indicated by this entry as a derived field.

The source of a derived field ought to be a functional rule which returns a value for this field.

Applicational advantages of this feature allows for table manipulations and ad hoc reporting on a subview table level.

In ADHOC processing the derived fields receive values when the table is accessed. for example, when editing the table:

ED (table name)

Event Rules

Event Rules within data definition are commonly made up of a mixture of either validations or triggers.

Validations are rules such as, when information is entered into a table, that data must be validated against another table. For example, when maintaining the employee table, the department number has to be in the departments table. This could extend to a series of other tables or external files.

Triggers cause actions to happen rather than just verification, such as audit trails, updating of other tables or scheduling of other jobs.

With event rules, a user is provided a completely "open" environment, where rigorous checks and controls can be implemented on data.

Definition of Event Rules:
- The event rules section is a scrollable portion
- Event rules are coded in execution order
- Event rules can be defined for specific data access codes, such as insert or more generally- get and write
- Different event rules can be invoked on the same action -
    Example Write - event rule - Validation
        Write       - Trigger
- If a data maintenance action is invoked - such as insert or update then write will also be invoked.
- The event rule that should be executed can be tested from a local library, but would reside in the site library at production time.
- In the event that a test is required using for example the Table Editor then the workbench function cannot be used if the rule is in a local library.
To force the search path to access the local library execute the Table Editor as if it was a rule:
   EX ====> STE('table name(parameters)')
or
Command line ===> EX STE('tablename(parameters)')
- When coding the event rule remember that the occurrence of the table has already been obtained
  - no data access is required for that table.
- When coding the event rule the following has to be true:
TRIGGERS - subroutines
VALIDATIONS - functions returning 'Y', 'N' or a message if not 'Y'

Example of an Event Rule—Validation

In defining the Employee table there was the following constraint:

All employees had to have the department number validated.

The validation had to be done against the DEPARTMENTS table.

The department data consisted of a department number and a department name.

The definition of the EMPLOYEE table had to change to reflect that a validation rule DEPT_CHK was to be executed anytime any type of maintenance was performed.

The changed EMPLOYEE table with event rule DEPT_CHK is shown in TABLE 36:

TABLE 36

| COMMAND==> TABLE:EMPLOYEE PARAMETER NAME | TYPE | TYPE:TDS SYNTAX | LENGTH | TABLE DEFINITION UNIT:PER DECIMAL | EVENT RULE | IDGEN:N TYPE | ACCESS |
|---|---|---|---|---|---|---|---|
| USERID | I | C | 100 | | DEPT_CHK | V | W |
| FIELD NAME | TYPE | SYNTAX | LENGTH | DECIMAL | KEY REQ DEFAULT | | |
| EMPNO | I | P | 3 | 0 | P | | |
| LNAME | S | C | 22 | 0 | | | |
| POSITION | S | C | 20 | 0 | | | |
| MGR# | I | P | 3 | 0 | | | |
| DEPTNO | C | B | 2 | 0 | | | |
| SALARY | Q | P | 4 | 2 | | | |
| HIREDATE | S | C | 9 | 0 | | | |
| ADDRESS | S | V | 80 | 0 | | | |
| CITY | S | C | 20 | 0 | | | |
| PROV | S | C | 3 | 0 | | | |
| P_CODE | S | C | 7 | 0 | | | |
| PFKEYS:3=SAVE 12=CANCEL 22=DELETE 13=PRINT 21=EDIT 2=DOC 6=RETRIEVE | | | | | | | |

An example of the rule DEPT_CHK would appear as in TABLE 37.

TABLE 37

RULE EDITOR ==>

DEPT_CHK;

— GET DEPARTMENTS WHERE DEPTNO =
— EMPLOYEE.DEPTNO;

RETURN('Y');

— ON INSERTFAIL DEPARTMENTS:

RETURN('INVALID DEPARTMENT NUMBER:' ||
— EMPLOYEE.DEPTNO);

Example of an Event Rule—Trigger

The Employee table modified to include the trigger EMP_AUDIT is shown in TABLE 38.

To provide an audit trail of the people that update the employee table, an output table will be created.

This table EMP_AUDIT will contain information about the user and also the values of the important fields such as salary.

Change the definition to force an audit entry to be written every time the employee table is maintained.

TABLE 38

Additional Event Rule for the employee table

COMMAND=> TABLE DEFINITION
TABLE:EMPLOYEE    TYPE:TDS    UNIT:PER    IDGEN:N

| PARAMETER NAME | TYPE | SYNTAX | LENGTH | DECIMAL | EVENT RULE | TYPE | ACCESS |
|---|---|---|---|---|---|---|---|
| USERID | I | C | 100 | | DEPT_CHK | V | W |
| | | | | | EMP_AUDIT | T | W |

| FIELD NAME | TYPE | SYNTAX | LENGTH | DECIMAL | KEY | REQ | DEFAULT |
|---|---|---|---|---|---|---|---|
| EMPNO | I | P | 3 | 0 | P | | |
| LNAME | S | C | 22 | 0 | | | |
| POSITION | S | C | 20 | 0 | | | |
| MGR# | I | P | 3 | 0 | | | |
| DEPTNO | C | B | 2 | 0 | | | |
| SALARY | Q | P | 4 | 2 | | | |
| HIREDATE | S | C | 9 | 0 | | | |
| ADDRESS | S | V | 80 | 0 | | | |
| CITY | S | C | 20 | 0 | | | |
| PROV | S | C | 3 | 0 | | | |
| P_CODE | S | C | 7 | 0 | | | |

PFKEYS:3=SAVE   12=CANCEL   22=DELETE   13=PRINT   21=EDIT   2=DOC   6=RETRIEVE

The table to hold the audit trail information would have the definition shown in TABLE 39.

TABLE 39

COMMAND=> TABLE DEFINITION
TABLE:EMPLOYEE    TYPE:TDS    UNIT:PER    IDGEN:Y

| PARAMETER NAME | TYPE | SYNTAX | LENGTH | DECIMAL | EVENT RULE | TYPE | ACCESS |
|---|---|---|---|---|---|---|---|

| FIELD NAME | TYPE | SYNTAX | LENGTH | DECIMAL | KEY | REQ | DEFAULT |
|---|---|---|---|---|---|---|---|
| AUDIT_NO | I | B | 4 | 0 | P | | |
| USERID | S | C | 8 | 0 | | | |
| TRAN_DATE | S | C | 8 | 0 | | | |
| TRAN_TIME | S | C | 8 | 0 | | | |
| EMPNO | I | P | 3 | 0 | | | |

TABLE 39-continued

| | | | | |
|---|---|---|---|---|
| LNAME | S | C | 22 | 2 |
| DEPTNO | C | B | 2 | 0 |
| SALARY | Q | P | 4 | 2 |
| PFKEYS:3=SAVE 12=CANCEL 22=DELETE 13=PRINT 21=EDIT 2=DOC 6=RETRIEVE | | | | |

Note that this table will use an automatically generated key.

An example of the rule EMP_AUDIT would appear as shown in TABLE 40.

TABLE 40

```
            RULE EDITOR ==>
EMP_AUDIT;
 —  ————————————————————————————————————————————|———
 —  ————————————————————————————————————————————|———
 —
     EMP_AUDIT.* = EMPLOYEE                      |
 —
     EMP_AUDIT.USERID = USERID                   |
 —
     EMP_AUDIT.TRAN_DATE = CURRENT_DATE('Y/M#/D');  |
 —
     EMP_AUDIT.TRAN_TIME = REALTIME;             |
 —
     INSERT EMP_AUDIT;                           |
 —
 —  ————————————————————————————————————————————|———
```

SUBVIEWS—Derived Fields

SUBVIEWS can consist of a view of existing data. It can also consist of derived fields.

The definition of the subview template provides a space as mentioned before for defining the source and the source name.

The source can be 'S'
  To provide an alternate name for a field from the base table.
  The source name must be the name from the base table.

However, if the source is defined as 'D'
  To provide a derived field using information from the base table.
  The source name must be the rule to be executed whenever the subview is accessed.

When the subview provides source rules to be executed, these rules are functions returning one value.

These rules are unlimited in their function similar to event rules.

Similarly, these rules already know the current occurrence of the associated table—no data access against that table is required.

The information on derived fields is never stored and therefore cannot be updated.

Similar to the event rules—a search of the local library has to be forced in a testing environment. These rules would exist in the site library normally. (Please refer to event rules section).

The Event rules for the base table are still in effect for the subview.

Additional security can be placed on a subview over the base table.

The following example of an event rule validation illustrates used of Derived fields.

Request by manager of department 10
  Only his employees
  Only certain fields
  Interested in how his staff could benefit from the new Employee Savings program that the company had introduced.

With this in mind, a subview was created to satisfy the manager's request.

Two derived fields were added to calculate the employee's length of employment and the amount that the employee could save.

These fields are good choices for derived fields because the length of employment increases daily and the savings amount is a calculation based on that data and the salary. Therefore if the salary changes and the length of employment is always changing, this field is too dynamic to store on a database.

The layout of the subview file is shown in TABLE 41.

TABLE 41

```
                                         DT EMPLOYEE_SUB
       COMMAND==>     TABLE DEFINITION
       TABLE:EMPLOYEE_SUB      TYPE:SUB       UNIT:EDUC
       SOURCE:EMPLOYEE
       SELECT:DEPTNO = 10
```

TABLE 41-continued

| PARAMETER NAME | TYPE | SYN | LEN | DEC | SOURCE PARM | ORDER FIELD | SEQ |
|---|---|---|---|---|---|---|---|
| USERID | I | C | 100 | 0 | | | |

| FIELD NAME | TYPE | SYN | LEN | DEC | KEY | REQ | DEFAULT | SRC | SOURCE NAME |
|---|---|---|---|---|---|---|---|---|---|
| EMPLOYEENO | I | P | 3 | 0 | P | | | S | EMPNO |
| LNAME | S | C | 22 | 0 | | | | | |
| HIREDATE | S | C | 9 | 0 | | | | | |
| MANAGERNO | I | P | 3 | 0 | | | | S | MGR# |
| DEPTNO | I | B | 2 | 0 | | | | | |
| LGTH_EMPLOY | I | B | 4 | 0 | | | | D | LGHT_EMPLOY |
| EMP_SAVINGS | I | B | 4 | 0 | | | | D | EMP_SAVINGS |

PFKEYS:3=SAVE 12=CANCEL 13:PRINT 15:SAVEON 21=EDIT 22=DELETE 6=RETRIEVE 2=DOC

An example of the rule LGTH_EMPLOY to calculate the length of employment would appear as shown in TABLE 42.

TABLE 42

RULE EDITOR ==>

LGTH_EMPLOY;

```
    RETURN(DATE_DIFFERENCE(HIREDATE, 'D-M-Y',
—   CURRENT_DATE('D-M-Y'), 'D-M-Y'));
```

The difference between the two dates—HIREDATE and today's date would be obtained using the function DATE_DIFFERENCE. This value is then returned anytime the data is access through this subview.

An example of the rule EMP_SAVINGS would appear as shown in TABLE 43.

TABLE 43

RULE EDITOR ==>

EMP_SAVINGS;

```
    LGTH_EMPLOY > 365;                      | Y N

RETURN(EMPLOYEE.SALARY * 52 * 0.06);    | x

RETURN (0);                             | x
```

A decision has to be made based on the length of employment:
  Employment a year or more then the employee is eligible to use the plan.
  Calculation—6 Percent of the annual salary (52 weeks)
  Less than that—no eligibility amount is zero.

Changing a Table Definition

Changing a table definition is allowed if the table is not populated. If the table is populated, then some restrictions apply, which will be caught by the Table Definer.

Any new fields must be added to the end of the previous ones

Field lengths can be made longer, but should not be shortened

Some syntaxes do not allow modification

Semantic constraints can be changed

Table Definition Command Summary

1. LINE COMMANDS

The leftmost column of the screen is reserved for entering line commands. A line command is entered by placing the first letter of the command in the command space on the line. All line commands are processed when a function key or the ENTER key is pressed.

I—INSERT AFTER THIS LINE
D—DELETE THIS LINE
R—REPLICATE THIS LINE

C—COPY THIS LINE
M—MOVE THIS LINE
A—DESTINATION OF MOVE/COPY AFTER THIS LINE
B—DESTINATION OF MOVE/COPY BEFORE THIS LINE

The destination of a MOVE or COPY command is determined from either an explicit destination "A" for after or "B" for before, or an implicit destination (the line after the current cursor position).

2. PRIMARY COMMANDS AND FUNCTION KEYS

The primary commands are entered in the area provided on the first line of the screen. Most primary commands have corresponding function keys for user convenience. Following is a list of PF keys and their functions and associated primary commands:

| PF Key | Command | Summary |
|---|---|---|
| PF1 | | -HELP. |
| PF2 | DOC | -DOCUMENTATION FOR THIS TABLE |
| PF3 | SAVE | -SAVE THE DEFINITION AND LEAVE THE DEFINE TABLE. |
| PF6 | RETRIEVE | -COMMENCES A NEW SESSION BY RETRIEVING THE DEFINITION OF THE NAMED TABLE |
| PF7 | | -SCROLL UP IN THE RULE |
| PF8 | | -SCROLL DOWN IN THE RULE |
| PF9 | | -REDISPLAY PREVIOUS PRIMARY COMMAND |
| PF12 | CANCEL | -LEAVE THE TABLE DEFINE WITHOUT SAVING CHANGES |
| PF13 | PRINT | -PRINT THE DEFINITION |
| PF15 | SAVEON | -SAVE AND CONTINUE |
| PF22 | DELETE | -DELETE THE DEFINITION AND EXIT |
| | COPY | -APPEND THE DEFINITION OF A NAMED TABLE |
| PF21 | EDIT | -SAVE THE DEFINITION & BEGIN AN STE SESSION |

The Screen Definer consists of two separate functions,
(1) The screen definition—which screen tables should be used,
(2) Painting the screen tables and defining the fields within the screen table, Screen tables have no stored representation in the data store and are temporary tables within the user's environment, Screen tables are manipulated using the same data access commands in the rules language specifications as all other tables, Screen Definition Screen definition is invoked by a PS <screen name> command. This results in a layout screen as shown in TABLE 44.

The screen name is unique to the system.

The screen definition provides for default keys and will automatically perform scrolling for the user.

A screen can be viewed by pressing PF21, any validation rules or require fields can be entered at this time to test validation—without the user having written a DISPLAY command in the rules language.

PF12—the default validation exit will provide an exit if the validation rules cannot be met.

If the user provides a fieldname from a screen table within the SCROLL AMOUNT ENTRY area then HURON will allow scrolling values such as M—maximum, P—page, etc . . . , to be invoked without any further coding.

The user can control the initial cursor position.

Default PFkeys can be modified to meet the user's standards.

TABLE 44

| PF KEYS | HURON BUILD SCREEN: employee_expense UNIT: acc | |
|---|---|---|
| | SCROLL AMOUNT ENTRY | DEFAULT CURSOR POSITION |
| UP:7 DOWN:8 | TABLE: _____ | TABLE: expense_data |
| LEFT:10 RIGHT:11 | FIELD: _____ | FIELD: employee# |
| VALIDATION EXIT:12 | | |
| HELP:1 REFRESH:24 | | |

SCREEN TABLES FOR EMPLOYEE_EXPENSE

| NAME | ORIGIN ROW: | COL: | MAX OCCUR: | SCROLL: | VALIDATION RULE: | TITLE: | FOOTING | FIX COL |
|---|---|---|---|---|---|---|---|---|
| acct_title | 1 | 1 | 1 | n | | | | |
| expense_data | 5 | 5 | 5 | y | AUTHORIZE | 2 | | |

PFKEYS: 2=DOCT 6=PAINT 9=DEFHLP 13=PRINT 16=EXCLD 19=DUP 21=DISPLAY

SCREEN DEFINITION

Facilities of the Screen Definer

The HURON Screen Definer is invoked from the workbench,

A screen is made up of various screen tables,

Screen tables are unique to the system and are shareable between screens,

Screen Definitions Command Summary

Following is a list of PF keys and their functions:

| PF Key | Function | Summary |
|---|---|---|
| PF1 | Help | - HELP ON SCREEN DEFINITION. |
| PF2 | Document | - DOCUMENTATION FOR THIS SCREEN. |
| PF3 | Save | - SAVE THE DEFINITION AND |

|      |            | EXIT.                          |
|------|------------|--------------------------------|
| PF6  | Paint      | - SAVE AND CALL THE SCREEN PAINTER FOR THE TABLE AT CURSOR POSITION. |
| PF7  |            | - SCROLL UP.                   |
| PF8  |            | - SCROLL DOWN.                 |
| PF9  | Define HELP | - DEFINE HELP SCREEN TO BE ASSOCIATED WITH THIS SCREEN. |
| PF12 | Cancel     | - EXIT THE FACILITY WITHOUT SAVING CHANGES. |
| PF13 | Print      | - PRINT THE SCREEN.            |
| PF16 | Exclude    | - EXCLUDE THE TABLE THE CURSOR IS ON. |
| PF19 | Duplicate  | - DUPLICATE THE LINE THE CURSOR IS ON. |
| PF21 | Display    | - DISPLAY THE SCREEN.          |
| PF22 | Delete     | - DELETE THE DEFINITION AND EXIT. |

Painting Screen Tables

The screen table painter has two portions: the actual painting of the screen; and the definition of the fields and attributes. The layout screen is shown in TABLE 45.

Screen table names are unique to the system.

Screen tables are not directly associated with any data tables.

Painting the screen tables is very flexible, and free format.

The user is provided the ability to copy the fieldnames from an existing data table, if required.

Validation rules can be associated with each screen table, as opposed to just the screen. This provides sharing for validation rules as well.

The features of the screen table painter provide a great deal of flexibility, such as moving the positions of fields, deleting lines, easy online help screens etc.

TABLE 45
Screen Table Painter

CUSTOMER INFORMATION

```
CUSTOMER NAME   : -AAAAAAAAAAAAA        ACCOUNT#: -99999
STREET ADDRESS  : -AAAAAAAAAAAAAAAAAAAAA
CITY & PROVINCE : -AAAAAAAAAAAAAAAAAAAAA
```

| TABLE: | ORDER_CUST |  | FIELD |  |  | SCREEN ATTRIBUTES |  |  |  |  |  |  |
|--------|------------|--|-------|--|--|-------------------|--|--|--|--|--|--|
| ROW, COL | NAME | | TYP | SYN | JUST | FILL | LEN | DEC | PT | SHW | RQ | HI | SKP |
| 3  18 | name     | | s | c |   |   | 14 | 0 | n | y | y | y | y |
| 3  35 | account# | | i | c | r | 0 | 5  | 0 | n | y | y | n | n |
| 4  18 | address  | | s | c |   |   | 22 | 0 | n | y | n | n | y |
| 5  18 | city     | | s | c |   |   | 22 | 0 | n | y | y | n | y |

PFKEYS: 2=DOC 4=±LINE 5=CUT 6=+FLD 13=Print 16=−LINE 17=PASTE
        18=−FLD 19=LOAD

Screen Painter Command Summary

Following is a list of PF keys and their functions:

| PF Key | Function | Summary |
|--------|----------|---------|
| PF1 | Help | - HELP ON SCREEN DEFINITION. |
| PF2 | Document | - DOCUMENT FOR THE SCREEN TABLE. |
| PF3 | Save | - SAVE THE DEFINITION AND EXIT. |
| PF4 | Add line | - INSERT A LINE AFTER THE CURSOR. |
| PF5 | Cut field | - CUT & HOLD THE FIELD AT CURSOR. |
| PF6 | Add field | - ADD A FIELD AT THE CURSOR |
| PF7 |  | - SCROLL UP. |
| PF8 |  | - SCROLL DOWN. |
| PF12 | Cancel | - EXIT THE FACILITY WITHOUT SAVING CHANGES. |
| PF13 | Print | - PRINT THE SCREEN. |
| PF16 | Delete line | - DELETE THE LINE THE CURSOR IS ON. |
| PF17 | Paste field | - RELEASE A CUT FIELD & POSITION AT THE CURSOR POSITION. |
| PF18 | Del field | - DELETE THE FIELD THE CURSOR IS ON. |
| PF19 | Copy | - COPY THE NAMED TABLE DEFINITION. |
| PF22 | Delete | - DELETE THE DEFINITION AND EXIT. |

IV. Dictionary Data

All data within the HURON data processing machine is stored according to the table access machine, either directly in the table data store or virtually in other data storage systems. The actual location and the type of table in which a given occurrence is stored is defined by a plurality of dictionary tables within the table data store. These dictionary tables can be considered metadata in that they are prespecified tables having a structure known to the table data store and to the table access machine so that they can be automatically surveyed in order to build control tables used for accessing occurrences in generic tables.

The dictionary tables include the table named TABLE which has the structure shown in FIG. 3. This table includes the name and type of all tables available to a given session in the machine.

Also, the dictionary includes a table named FIELDS (table name) which is a table which includes the attributes of all data elements in the system and has the structure set out in FIG. 4. This table is parameterized on the table name. Therefore, the table access machine generates a view of the table called FIELDS that is limited to the fields of a given table.

The dictionary also includes a table called PARMS (table name) which is shown in FIG. 5.

This table identifies the parameter associated with each table, if there are any.

The dictionary also includes the table called SELECTION (table name) shown in FIG. 6, in which is stored a selection string or filter to be applied to accesses to the table.

Other dictionary tables include ORDERING (table name) as shown in FIG. 7 which defines a set of ordering operations to be implemented upon accesses to the table, EVENTRULES (table name) as shown in FIG. 8 which specifies rules to be executed upon access events to occurrences in the table, @RULESLIBRARY (library name) as shown in FIG. 9 which stores actual object code for executable rules for the session. The parameter library name is a basic method for dividing up the rules library by a variety of names.

The dictionary also includes dictionary tables required for accesses through the servers other than the table data store. For instance, FIGS. 10, 11, and 12 shown the tables IMSTABFIELDS (table name), IMSSEGFIELDS (db name, seg name), and the IMSACCESS (table name) tables which are used by the IMS server. The IMSTABFIELDS table maps the table access method filed name to an IMS field name. The IMSSEGFIELDS table provides the syntax and mapping parameters for an access based on parameters retrieved from the IMSTABFIELDS table. The IMSACCESS table is used by the server to generate actual access sequences for transmission to the IMS data base.

Also, the dictionary table includes the tables used by the screen servers as shown in FIGS. 13–15. FIG. 13 shows the table SCREENS which identifies all the screens that are accessible through the table access machine in a given session. FIG. 14 shows the table SCREENTABLES (screen) which provides a screen definition for a window in a position within a screen for the window.

The table SCREENFIELDS (screen table) shown in FIG. 15 further provides mapping directly onto the screen itself.

This dictionary data can be expanded to serve any number of servers, but its structure is hard coded ("meta meta data") in the preferred system.

Now that the basic application programmer's view of the system has been described and the representation of data and dictionary data in the system has been provided, an internal specification of the operation of the virtual machines can be understood.

V. Internal Representation of Rules

Rules are stored in an internal representation that is directly executable by the virtual stack machine. The process of saving a rule in the rule editor involves a translation from its textual source code to virtual machine object code. When the textual representation of a rule is required, a detranslation process converts from the virtual machine object code to text. The obvious advantage of storing only one representation of a rule is that a discrepancy between representation can never arise.

This section details the internal representation of a rule. It begins by describing the overall layout of the object code. A detailed description of the various data items, and virtual machine opcodes follows. Examples of the object code corresponding to various kinds of rule statements are included.

THE FORMAT OF A RULE

Rule object code is stored in the @RULESLIBRARY table. This table is parameterized by library name and has the rule name as its primary key.

Conceptually, the object code for a rule may be subdivided into four components: 52 bytes of header information; "n" bytes of code; "m" bytes of static (non-modifiable) data; and "p" bytes of modifiable data. Only the first three of these components are actually stored in the object code. The modifiable area is allocated when the rule is loaded for execution.

TABLE 46 shows the detailed layout of the rule object code. The header and code sections contain references to objects in the static data area. These references are two byte binary offsets which are relative to the start of the header. The Parameters, Local Variables, Exception Handler Names, Table.Field Names, Rule names and Constants Sections all belong to the static data area.

TABLE 46

| Layout of rule object code |
|---|
| Header (52 bytes) |
| Parameters (optional) |
| Local Variables (optional) |
| Code for Conditions |
| Code for Actions |
| Code for Exceptions (optional) |
| Exception Handler Names (optional) |
| Rule Names (optional) |
| Table.Field Names (optional) |
| Constants (optional) |

RULE HEADER

The header portion of the object code, which is shown in TABLE 47, contains the name of the rule along with various other values which describe the code, static data and modifiable data areas.

The length stored in the header is the number of bytes to the right of the length value. Thus the total length of the rule is the value in Length plus 28 (the number of bytes to the left of and including the Length value).

TABLE 47

Layout of rule object code header

| Value | Offset | Syntax | Purpose |
|---|---|---|---|
| Rulename | 00 | Char(16) | Name of the rule |
| Date | 16 | Char(6) | Date of translation |
| Time | 22 | Char(4) | Time of translation |
| Length | 26 | Bin(2) | Length of rest of rule |
| Num parms | 28 | Bin(2) | Number of formal parameters |
| Parm off | 30 | Bin(2) | Offset to local list |
| Num locs | 32 | Bin(2) | Number of local variables |
| Loc off | 34 | Bin(2) | Offset to local list |
| Cond off | 36 | Bin(2) | Offset to conditions |
| Act off | 38 | Bin(2) | Offset to actions |
| Excp off | 40 | Bin(2) | Offset to exception names |
| Function | 42 | Char(1) | Rule is a function (Y/N) |
| TabFld off | 43 | Bin(2) | Offset to t.f names |
| Const off | 45 | Bin(2) | Offset to constants |
| Rule off | 47 | Bin(2) | Offset to rule names |
| Version | 49 | Bin(1) | Object code version# |
| Mod data | 50 | Bin(2) | Size of modifiable data area |

RULE STATIC DATA

This section outlines the contents of the static data area. Certain object names in the static data section contain references to items in the modifiable data area. Each reference is a two byte offset which is relative to the start of the modifiable data area.

The values in the header which describe the static data area's layout are identified, when appropriate.

Parameters

The parameter section of the object code contains the list of names of the formal parameters declared for this rule.

TABLE 48

The internal representation of a parameter

| Parameter name |
|---|
| (16) |

As shown in Table 48, item in the list is a 16 byte name. "Num parms" contains the number of formal parameters declared for this rule, while the "Parm off" value is an offset to the stare of this list.

Local variables

The local variables section of the object code contains the list of names of local variables declared in this rule.

TABLE 49

The internal representation of a local variable

| Local variable name | offset |
|---|---|
| (16) | (2) |

As shown in Table 49, each item in the list contains a 16 byte name followed by a two byte offset to the modifiable data area. "Num locs" contains the number of local variables declared in this rule, while "Locs off" contains an offset to the start of this list.

Exception handler names

The exception name section contains the list of names of exceptions handled by this rule.

TABLE 50

The internal representation of an exception name

| Exception name | offset | offset |
|---|---|---|
| (16) | (2) | (2) |

As shown in Table 50, each item in the list consists of a 16 byte name followed by a pair of two byte offsets. The first two byte offset references the name of the table associated with this exception. The table name is stored in the static data area as a 16 byte name. If there is no associated table name, this offset is zero. The second offset references the code which handles the exception. "Excp off" contains an offset to the start of this list; the list is terminated with a two byte zero.

Fields of tables

The table.field section of the rule object code is a list of all direct table.field names in the rule.

TABLE 51

The internal representation of a direct table.field name

| Table name | Field name | offset |
|---|---|---|
| (16) | (16) | (2) |

As shown in Table 51, each item in the list consists of two 16 byte names (one for the table and one for the field) followed by a two byte offset to the modifiable data area. "TabFld off" references the start of the list; the list ends at the "Const off" offset.

Rule names

The rule name section is a list of all the direct rule (or local variables not declared in this rule) names called by this rule.

TABLE 52

The internal representation of a direct rule name

| Rule name | offset |
|---|---|
| (16) | (2) |

As shown in Table 52, each item in the list consists of a 16 byte name, followed by a two byte offset to the modifiable data area. "Rule off" references the start of the list; the list ends at the "TabFld off" offset.

Constants

The constants section is a list of all the constants in the rule (either literal constants or constants generated internally by the translator). A shown in Table 53, each item in the list has a six byte descriptor followed by data. The data itself is prefixed by a one or two byte length (one byte if the data is 0 . . . 127 bytes in length, two bytes for 128+). The high order bit of CLen is on if CLen is two bytes, otherwise CLen is one byte.

TABLE 53

The internal representation of a constant

| Type | Syntax | DLen | Dec | CLen | Data |
|---|---|---|---|---|---|
| (1) | (1) | (2) | (2) | (1/2) | (CLen) |

The type is a single byte which contains the semantic type of the constant. All constants have an unknown (blank) semantic type. The Syntax is a byte which indicates the representation of the data. Valid syntaxes are B(binary) P(packed decimal) F(floating point) C(fixed char) and V(variable char). The DLen is two bytes and contains the definition (or maximum) length of the Data. CLen contains the current length of the Data. Dec is also two bytes and contains the number of digits to the right of the decimal point. Dec is only meaningful for packed decimal constants. "Const off" references the start of the list of constants; the list terminates at the end of the object code which is given by "Length"+28.

RULE OPCODES

The virtual stack machine is based on a stack architecture. Most virtual machine instructions manipulate the items on the top of the stack. All stack items are four bytes in length. Many items are pointers to values which are either fields of a table, rule constants or temporary values built during execution. As shown in Table 54, all values are comprised of a six byte descriptor, followed by a four byte pointer to the actual data. The data itself is prefixed by a one or two byte length. The stack may contain other information, such as that necessary to implement rule call and return.

TABLE 54

| The virtual machine representation of a value |
|---|
| Type (1) | Syntax (1) | DLen (2) | Dec (2) | Pointer → (4) | CLen (1/2) | Data (CLen) |

For values that are built during execution, the virtual machine maintains a temporary area. When temporary values are popped from the stack, their storage in the temporary area is freed.

All virtual machine instructions contain a single byte opcode. Depending upon the opcode, it may require zero, one or two, two byte operands.

For the purpose of describing the semantics of each opcode, let item1 represent the top item on the stack and item2 represent the second item on the stack. Let operand1 and operand2 denote the first and second immediate operands, respectively.

| Name | Opcode | #Ops | Semantics |
|---|---|---|---|
| @ADD | 4 | 0 | Add two values together. Pop item1 and item2. Create and push a temporary value of item2 + item1. |
| @SUB | 8 | 0 | Subtract one value from another. Pop item1 and item2. Create and push a temporary value of item2 − item1. |
| @MULT | 12 | 0 | Multiply two values together. Pop item1 and item2. Create and push a temporary value of item2 * item1. |
| @DIV | 16 | 0 | Divide one value by another. Pop item1 and item2. Create and push a temporary value of item2 / item1. |
| @EXP | 20 | 0 | Raise one value to the power of another. Pop item1 and item2. Create and push a temporary value of item2 ** item1. |
| @UNM | 24 | 0 | Arithmetically negate a value Pop item1. Create and push a temporary value of −(item1). |
| @CAT | 28 | 0 | Concatenate two values together. Pop item1 and item2. Create and push a temporary value of item2 concatenated to item1. |
| @EQ | 32 | 0 | Compare two values for equality. Pop item1 and item2. Create and push a temporary value of item 2 = item 1 ('Y" or 'N'). |
| @NE | 36 | 0 | Compare two values for inequality. Pop item1 and item2. Create and push a temporary value of item2 −= item1 ('Y' or 'N'). |
| @LT | 40 | 0 | Compare to determine if one value is less than another. Pop item1 and item2. Create and push a temporary value of item2 < item1 ('Y' or 'N'). |
| @LE | 44 | 0 | Compare to determine if one value is less or equal to another. Pop item1 and item2. Create and push a temporary value of item <= 1 ('Y' or 'N'). |
| @GT | 48 | 0 | Compare to determine if one value is greater than another. Pop item1 and item2. Create and push a temporary value of item2 > item1 ('Y' or 'N'). |
| @GE | 52 | 0 | Compare to determine if one value is greater or equal to another. Pop item1 and item2. Create and push a temporary value of item2 >= item1 ('Y' or 'N'). |
| @CALL | 56 | 2 | Call a procedural rule or bulitin. Operand1 is the number of arguments to pass; they have already been pushed onto the stack. Operand2 is an offset to the name of the rule to call; a positive offset is a reference to a name in the static data area. A non-positive offset signifies an indirect rule name, in which case item1 contains the name of the rule to call. On an indirect call, item1 is popped. The caller's environment is saved and execution begins at the start of the called rule. |
| @FN | 60 | 2 | Call a functional rule or bulitin. Operand1 is the number of arguments to pass; they |

| Name | Opcode | #Ops | Semantics |
|---|---|---|---|
| | 64 | | have already been pushed onto the stack. Operand2 is an offset to the name of the rule to call. The caller's environment is saved and execution begins at the start of the called rule. UNUSED. |
| @RETURN | 68 | 0 | Return from a functional or procedural rule. Pop all arguments passed to the called rule and restore the caller's environment. If the called rule was a function, push the return value onto the stack. |
| @UNTIL | 72 | 2 | Initialize for the execution of an UNTIL loop. Operand1 is an offset to the opcode to be executed once the loop terminates. Operand2 indicates whether this is an UNTIL . . . DISPLAY loop (1) or just UNTIL loop (0). |
| @PARM | 76 | 1 | Push a formal rule parameter onto the stack. Operand1 is the number of the formal parameter. (For a rule with N parameters, the Ith one is numbered (N - I)). Push the parameter value onto the stack. |
| @CONST | 80 | 1 | Push a constant onto the stack. Operand1 is an offset to the value in the static data area. Copy the values' descriptor into the temporary area and append a four byte pointer to it. Set the pointer to reference the value's data in the static data area. Push the constant value onto the stack. |
| @TEMP | 84 | 0 | Create a temporary copy of a value. If item1 is not a temporary value, create a temporary copy, pop item1 and then push the temporary value. |
| @RFIELD | 88 | 1 | Push a field of a table onto the stack. Operand1 is an offset to the table field name; a positive offset references a name in the static data area. A non-positive offset signifies an indirect table.field, in which case item1 is the name of the table and item2 is the name of the field. On an indirect reference, item1 and item2 are popped. Push the field value onto the stack. As the field is being pushed, a check ensures that the field has a value; if not the exception UNASSIGNED is raised. |
| @WFIELD | 92 | 1 | Push a field of a table onto a stack. Operand1 is an offset to the table.field name; a positive offset references a name in the static data area. A non-positive offset signifies an indirect table.field, in which case item1 is the name of the table and item2 is the name of the field On an indirect reference, item1 and item2 are popped. Push the field value onto the stack. |
| @AEND | 96 | 0 | Mark the end of the current code section. Used to separate the conditions from the and the actions from the exceptions. @AEND is NEVER executed by the virtual machine. |
| @SET | 100 | 0 | Assign a field of a table a value. Item1 is a field of a table. Item2 is a value. Set data of item1 to data of item2 and pop both items. |
| @ABN | 104 | 0 | Assign commonly named fields in tables. Item1 is the name of the source table. Item2 is the name of the target table. Set the data of all commonly named fields in the target table to data of fields in the source table. Pop item1 and item2. |
| @SCHED | 108 | 2 | Schedule the asynchronous execution of a rule. Operand1 is the number of arguments to pass; they have already been pushed onto the stack. Operand2 is an offset to the name of the rule to schedule. ???? what is done with these args and queue name ??? Pop all arguments from the stack. Pop item1, which is the name of the queue for the asynchronous event and continue. |
| @DROP | 112 | 1 | Branch conditionally to an offset within a rule. Pop item1. If item1 is not 'Y', |

| Name | Opcode | #Ops | Semantics |
|---|---|---|---|
| @NEXT | 116 | 1 | branch to the offset given by operand1. Branch unconditionally to an offset within a rule. |
| @BRC | 120 | 1 | Branch to the offset given by operand1. Branch conditionally to an offset within a rule. Check the return code set as a result of the last @TAM opcode. If it is non-zero, branch to the offset given by operand1. |
| @FORI | 124 | 0 | Initialize for the execution of a FORALL loop. |
| @TAM | 128 | 1 | Call TAM to perform a table access request. Operand1 contains the number of arguments on the stack. Build a parameter list from these arguments, and call TAM. If the access was other than a FORALL or UNTIL . . DISPLAY, pop the arguments from the stack. If the access was a FORALL or UNTIL . . DISPLAY and the return code is zero (end of occs.), pop the arguments, otherwise leave the arguments on the stack. Save the return code from the TAM call. |
| @TAMP | 132 | 1 | Insert a reference into a TAM selection string or parameter list. Item1 is a value which is to be inserted into the selection string or parameter list. Item2 is the selection string or parameter list. Operand1 is an offset in item2 where the reference to item1 is to be inserted. If necessary, create temporary copies of both item1 and item2. Insert the reference to item1 in item2 and pop item1. (item2 will be popped during the course of executing the @TAM opcode). |
| @TAMN | 136 | 1 | Copy a table name into a TAM table name argument. Item1 is a table name which is to be passed to TAM. Item2 is a 16 byte blank character string. Operand1 is an offset in item2 where the table name is to be copied. If necessary, create temporary copies of item1 and item2. Copy item1 into item2 and pop item1. (item2 will be popped during the course of execution the @TAM opcode). |
| @SIGNAL | 140 | 0 | Raise an exception. Item1 is the name of the exception which is to be raised. Pop item1 and raise the exception. |
|  | 144 |  | UNUSED. |
| @ACALL | 148 | 1 | Call an action from the conditions. Push the offset to the next instruction (the "return address") and branch to the offset given by operand1. |
| @ARETURN | 152 | 0 | Return from an action (to the conditions). Item1 is the offset of the next opcode to be executed. Pop item1 and branch to that offset. |
| @EXEC | 156 | 2 | Execute a procedural rule. Operand1 is the number of arguments to pass; they have already been pushed onto the stack. Operand2 is an offset to the name of the rule to execute; a positive offset is a reference to a name in the static data area. A non-positive offset signifies an indirect rule name, in which case item1 contains the name of the rule to execute. On an indirect execution, item1 is popped. The enviornment of the current transaction is saved and a new transaction begins at the start of rule being executed. |
|  | 160 |  | UNUSED. |
| @SETL | 164 | 1 | Assign a local variable a value. Item1 is the value to be assigned. Operand1 is the local variable. Set data of operand1 to data of item1 and pop item1. |
| @WARG | 168 | 2 | Convert a list of arguments which are passed by name to a list of arguments passed by position. The stack consists of parameter name/parameter value pairs. Operand1 is the number of name/value pairs. Operand2 is an offset to the name of the rule being passed there args; a positive offset is a reference to a name in the static data area. |

| Name | Opcode | #Ops | Semantics |
|------|--------|------|-----------|
| | | | A non-positive offset signifies an indirect rule name, in which case item1 contains the name of the rule. On an indirect reference, item1 is popped. Pop all name/value pairs and push and values in positional order. |
| @NOT | 172 | 0 | Logically negate a value. Pop item1. Create and push a temporary value of -(item1). |
| | 176 | | UNUSED. |
| | 180 | | UNUSED. |
| @XCALL | 184 | 2 | Transfercall a procedural rule. Operand1 is the number of arguments to pass; they have already been pushed onto the stack. Operand2 is an offset to the name of the rule to transfercall; a positive offset is a reference to a name in the static data area. A non-positive offset signifies an indirect rule name, in which case item1 contains the name of the rule to transfercall. On an indirect transfercall, item1 is popped. The environment of the current transaction is discarded, and a new transaction begins at the start of the transfercalled rule. |

RULE MODIFIABLE DATA

The virtual machine performs run time binding of references to objects named in the static data area, specifically rules, local variables and fields of tables. Binding involves a search for the object and occurs when an object is first referenced. The binding is remembered by storing the object's address (or "thread") in the modifiable data area. (See, Tables 55–56). Subsequent references to a bound object may simply use the thread since the address of an object is constant for an entire transaction.

The size of the modifiable area is calculated when a rule is translated from source to object code. This size is stored as the "Mod data" value in the rule header. The first time a rule is called during the course of a transaction, its modifiable data area is allocated and set to contain zeros. As the rule is executed, references to fields of tables, local variables and rules are bound by saving their addresses at the designated offset in this rule's modifiable area. The modifiable data area of a rule is deallocated when the transaction terminates.

TABLE 55

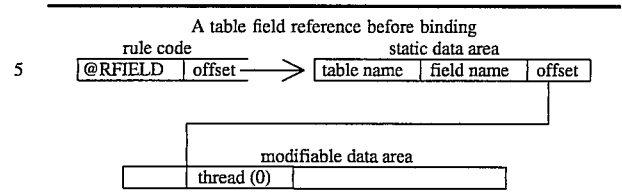

A table field reference before binding

The modifiable data area is also used to save the names of indirect rule and indirect table.field references. As described in the Rule opcodes section, an indirect reference is denoted by a non-positive offset as an operand to the @RFIELD, @WFIELD, @CALL, @EXEC, @XCALL or @WARG opcodes. The non-positive offset indicates that the name of the rule or table.field being referenced is on the virtual machine stack. This name is saved in the modifiable data area at the absolute value of the offset along with its thread. (See, Tables 57–58).

TABLE 56

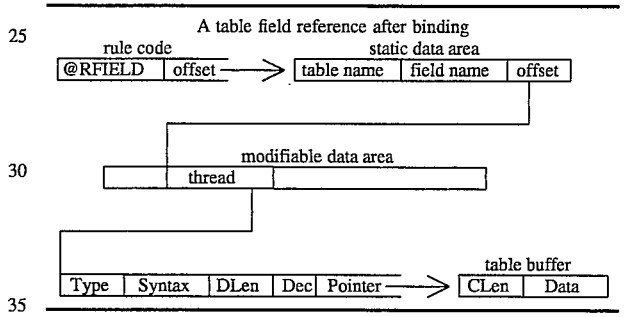

A table field reference after binding

TABLE 57

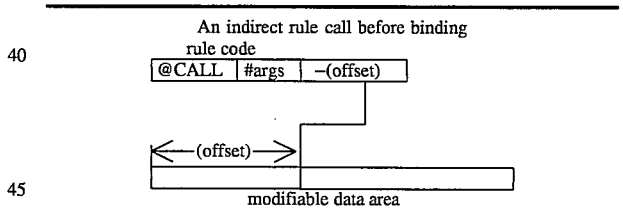

An indirect rule call before binding

TABLE 58

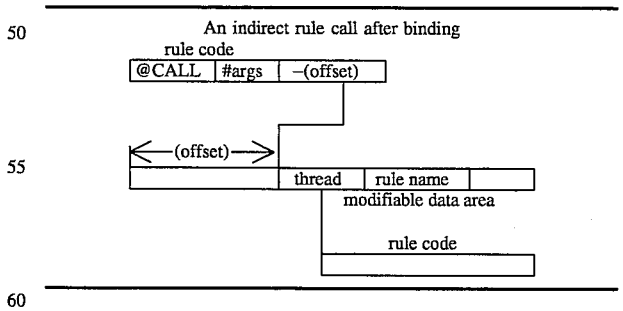

An indirect rule call after binding

RULE CODE SEQUENCES

Now that we have seen the various virtual machine instructions available, it is time to explore how they are put together to implement the various language features.

Conditions and Actions

The code generated for the condition section of a rule, amounts to sequences of "calls" (@ACALL) to the actions to be executed (the action list) when each condition is satisfied. These @ACALL opcodes may be "guarded" by code to evaluate a condition and an @DROP opcode which branches to the next condition if this one is not satisfied. An unguarded sequence of @ACALL opcodes may arise when there are no further conditions to evaluate.

The @ACALL opcode pushes the offset to the next instruction onto the stack and then branches to the action. The last opcode in an action is an @ARETURN which uses the saved offset to return to process the next action for the condition. An @RETURN opcode follows the last @ACALL in each sequence to return from the rule.

The main benefit of "calling" actions from the conditions is that the code for an action need only be generated once, even when the action is a member of more than one condition's action list.

An example is set out in Table 59.

TABLE 59

Source and object code for conditions and actions

Rule source code:
MAX (X, Y);
X < Y;                                            Y   N
RETURN(Y);                                        1
RETURN(X);                                            1

Rule object code:
| Offset | Opcode   | Operands | Comment |
|--------|----------|----------|---------|
| CONDITIONS | | | |
| 54 : | @PARM    | 1  | Push value of X |
| 57 : | @PARM    | 0  | Push value of Y |
| 5A : | @LT      |    | Pop X,Y and push X < Y |
| 5B : | @DROP    | 62 | IF X < Y THEN |
| 5E : | @ACALL   | 67 | "Call" action at offset 67 |
| 61 : | @RETURN  |    | ELSE |
| 62 : | @ACALL   | 6C | "Call" action at offset 6C |
| 65 : | @RETURN  |    | ENDIF |
| 66 : | @AEND    |    | End of conditions |
| ACTIONS | | | |
| 67 : | @PARM    | 0  | Push value of Y |
| 6A : | @RETURN  |    | Return from the rule |
| 6B : | @ARETURN |    | End of an action |
| 6C : | @PARM    | 1  | Push value of X |
| 6F : | @RETURN  |    | Return from the rule |
| 70 : | @ARETURN |    | End of an action |
| 71 : | @AEND    |    | End of actions |

Assignments

The code generated for an assignment statement consists of the postfix representation of an expression followed by either an @SETL (assigning to a local variable) or an @SET (assigning to a field of a table). TABLE 60, shows a reference to an identifier G. At the time the rule ASSIGN is translated, it is not known whether G is a local variable defined in one of ASSIGN's ancestors, or a function which takes no arguments. The translator generates code assuming that G is a function and when the @FN opcode is executed, a check is made to determine if G is actually a local variable.

Rule Calls

Arguments to a rule may be passed by position or by name (using a WHERE clause). The code generated for rule calls when parameters are passed by position is very straightforward. First each argument is evaluated and made a temporary on the stack. This is followed by the @CALL (or @FN for a functional rule) opcode which takes the number of arguments and the name of the rule as its operands. When the @RETURN opcode in the rule being called is executed, all the arguments passed to the called rule are popped. If the called rule is a function, the return value is left on the top of the stack.

When arguments are passed by name, the code generated is slightly more complicated. Each argument is evaluated and made a temporary, just as it is when parameters are passed by position. However, the name of the formal parameter which each argument corresponds to, is also pushed, immediately after the argument. This results in parameter name followed by parameter value on the stack for each argument. Immediately preceding the @CALL opcode is the @WARG opcode. @WARG massages the name/value pairs on the stack into the same form as when arguments are passed by position. This allows the @CALL opcode to be executed unaware that the arguments were actually passed by name.

An example of code generated by a rule call is shown in Table 61.

Table Accesses

The Table Access Method, or TAM, is used to implement various language statements which access the database. The interface to TAM is quite simple: an @TAM opcode and N (between one and five) arguments on the run time stack. The code generated for table access statements first pushes the necessary arguments on the stack, and then calls TAM. After returning from TAM, the @TAM opcode pops its arguments (unless we are in the midst of performing an UNTIL . . . DISPLAY or a FORALL) and saves the code returned from TAM.

The first argument pushed onto the stack is always the TAM operation code. It tells TAM what kind of table access is being performed. The TAM operation code is the only required argument. Each of the others are optional and are only passed as needed.

TABLE 60

Source and object code for assignments

Rule source code:
ASSIGN;
LOCAL L;
L =(G + 1) * 4;                                   1
T.F = L;                                          2

Rule object code:
| Offset | Opcode   | Operands | Comment |
|--------|----------|----------|---------|
| CONDITIONS | | | |
| 46 : | @ACALL   | 4E  | Call action 1 |
| 49 : | @ACALL   | 5F  | Call action 2 |
| 4C : | @RETURN  |     | Return from the rule |
| 4D : | @AEND    |     | |
| ACTIONS | | | |
| 4E : | @FN      | 0   | Push value of G |
| 53 : | @CONST   | 1   | Push |
| 56 : | @ADD     |     | Compute G + 1 |
| 57 : | @CONST   | 4   | Push 4 |
| 5A : | @MULT    |     | Compute (G + 1) * 4 |
| 5B : | @SETL    | L   | Assign value to L |
| 5E : | @ARETURN |     | Return from action 1 |
| 5F : | @FN      | 0  L | Push value of L |
| 64 : | @WFIELD  | T.F | Push value of T.F |
| 67 : | @SET     |     | Assign L to T.F |

TABLE 60-continued

| | | |
|---|---|---|
| 68 | : @ARETURN | Return from action 2 |
| 69 | : @AEND | |

The second argument is the name of the table or screen being accessed. This name is always padded out to be 16 characters in length. The third argument contains the list of parameter values for the table. Each element in this list is a four byte pointer to a value. Elements in the parameter list are inserted by the @TAMP opcode.

TABLE 61 code generated for rule calls.

Rule source code:
CALLS;

| | | |
|---|---|---|
| CALL PARSE('SELECTION', 'SELECT F = 5'); | | 1 |
| CALL PARSE WHERE GRAMMAR ='SELECTION' & INPUT = SELECT F = 5'; | | 2 |

Rule object code:

| Offset | Opcode | Operands | Comment |
|---|---|---|---|
| CONDITIONS | | | |
| 34 : | @ACALL | 3C | Call action 1 |
| 37 : | @ACALL | 4A | Call action 2 |
| 3A : | @RETURN | | Return from the rule |
| 3B : | @AEND | | |
| ACTIONS | | | |
| 3C : | @CONST | "SELECTION" | Push "SELECTION" |
| 3F : | @TEMP | | Make it a temp |
| 40 : | @CONST | "SELECT F=5" | Push "SELECT F = 5" |
| 43 : | @TEMP | | Make it a temp |
| 44 : | @CALL | 2  PARSE | Call PARSE with 2 args |
| 49 : | @ARETURN | | Return from action 1 |
| 4A : | @CONST | "SELECTION" | Push "SELECTION" |
| 4D : | @TEMP | | Make it a temp |
| 4E : | @CONST | "GRAMMAR" | Push name of formal |
| 51 : | @CONST | "SELECT F=5" | Push "SELECT F = 5" |
| 54 : | @TEMP | | Make it a temp |
| 55 : | @CONST | "INPUT" | Push name of formal |
| 58 : | @WARG | 2  PARSE | Convert to positional list |
| 5D : | @CALL | 2  PARSE | Call PARSE with 2 args |
| 62 : | @ARETURN | | Return from action 2 |
| 63 : | @AEND | | |

The fourth argument, which contains the selection that is to be applied to the table, is the most complicated to describe. Essentially it contains a postfix representation of the WHERE clause. It is comprised of one or more terms which are joined by logical operators. Each term begins with a field reference, is followed by an expression (made up of field references, values and arithmetic operators) and ends with a relational operator. Each field reference is 17 bytes long: a one byte binary code indicating that this is a field reference followed by the name of the field. Each value is a one byte binary code for value, followed by a four byte pointer to the value. Every operator is a single byte binary code, representing the particular operator. As with elements in the parameter list, the @TAMP opcode is used to insert references to values in the selection string.

The fifth argument contains any ordering that is to be applied to occurrences retrieved. Each term in the ordering string contains a 16 byte field name followed by either "A" or "D" to indicate whether that field should be ordered in Ascending or Descending fashion.

An example of the table access code is shown in Table 62.

Indirect references

Indirect references may be used to specify:

↓ a rule name (in the CALL, TRANSFERCALL or EXECUTE statements)

↓ a table or screen name in the various table access statements

↓ table and field names on the left hand side of an assignment, or in an expression.

The code generated for indirect references, first evaluates the reference by pushing it onto the stack. The opcode which uses the indirect references has a non-positive offset as one of its operands. The non-positive offset indicates that the name is on the run time stack (rather than in the static data area as is the case for direct references). An example of indirect reference code is set out in Table 63.

Indirect table and screen names for table access statements behave somewhat differently than described above. After the value of the table or screen name is pushed onto the stack, a special opcode (@TAMN) is generated. It pops this value and copies it into a temporary value on the top of the stack.

TABLE 62

Code generated for table accesses.

Rule source code:
TABLEIO(T);

| | |
|---|---|
| GET TABLES; | 1 |
| GET TABLES WHERE NAME = T; | 2 |
| FORALL @RULESDOCUMENT(LIBID) ORDERED ASCENDING CREATED: END; | 3 |

Rule object code:

| Offset | | Opcode | Operands | | Comment |
|---|---|---|---|---|---|
| CONDITIONS | | | | | |
| 44 | : | @ACALL | 4F | | Call action 1 |
| 47 | : | @ACALL | 59 | | Call action 2 |
| 4A | : | @ACALL | 6F | | Call action 3 |
| 4D | : | @RETURN | | | Return from rule |
| 4E | : | @AEND | | | |
| ACTIONS | | | | | |
| 4F | : | @CONST | "G" | " " | Push TAM opcode |
| 52 | : | @CONST | "TABLES" | " " | Push table name |
| 55 | : | @TAM | 2 | | Call TAM (2 args) |
| 58 | : | @ARETURN | | | Return from act1 |
| 59 | : | @CONST | "G" | | Push TAM opcode |
| 5C | : | @CONST | "TABLES" | " " | Push table name |
| 5F | : | @CONST | " " | | Push dummy parms |
| 62 | : | @CONST | ".NAME . ." | | Push select str. |
| 65 | : | @PARM | 0 | | Push value of T |
| 68 | : | @TAMP | 14 | | Insert reference |
| 6B | : | @TAM | 4 | | Call TAM (4 args) |
| 6E | : | @ARETURN | | | Return from act2 |
| 6F | : | @FORI | | | Init for FORALL |
| 70 | : | @CONST | "A" | | Push TAM opcode |
| 73 | : | @CONST | "@RULESDOCUMENT" | " " | Push table name |
| 76 | : | @CONST | " " | " " | Push table parm |
| 79 | : | @FN | 0  LIBID | | Call LIBID |
| 7E | : | @TAMP | 2 | | Insert reference |
| 81 | : | @CONST | " " | | Push dummy selstr |
| 84 | : | @CONST | "CREATED  A" | | Push order str. |
| 87 | : | @TAM 5 | | | Call TAM (5 args) |
| 8A | : | @BRC | 90 | | Cond. branch |
| 8D | : | @NEXT | 87 | | Uncond. branch |
| 90 | : | @ARETURN | | | Return from act3 |
| 91 | : | @AEND | | | |

TABLE 63

Code generated for indirect references

Rule source code:
UNDREFS(R,T);

| | |
|---|---|
| CALL R; | 1 |
| (T).F = 7; | 2 |
| DELETE T; | 3 |

Rule object code:

| Offset | | Opcode | Operands | | Comment |
|---|---|---|---|---|---|
| CONDITIONS | | | | | |
| 44 | : | @ACALL | 4F | | Call action 1 |
| 47 | : | @ACALL | 58 | | Call action 2 |
| 4A | : | @ACALL | 66 | | Call action 3 |
| 4D | : | @RETURN | | | Return from the rule |
| 4E | : | @AEND | | | |
| ACTIONS | | | | | |
| 4F | : | @PARM | 1 | | Push value of R |
| 52 | : | @CALL | 0 | −4 | Indirect call |
| 57 | : | @ARETURN | | | Return from action 1 |
| 58 | : | @CONST | 7 | | Push 7 |
| 5B | : | @CONST | "F" | | Push "F" (field name) |
| 5E | : | @PARM | 0 | | Push value of T (table) |
| 61 | : | @WFIELD | −18 | | Push val of indirect t.f |
| 64 | : | @SET | | | Assign 7 to field |
| 65 | : | @ARETURN | | | Return from action 2 |
| 66 | : | @CONST | "D" | | Push TAM opcode |
| 69 | : | @CONST | " " | " " | Push dummy table name |
| 6C | : | @PARM | 0 | | Push value of T |
| 6F | : | @TAMN | 0 | | Put tab name into dummy |
| 72 | : | @TAM | 2 | | Call TAM (2 args) |
| 75 | : | @ARETURN | | | Return from action 3 |
| 76 | : | @AEND | | | |

VI. Transaction Processor

Figure 16:
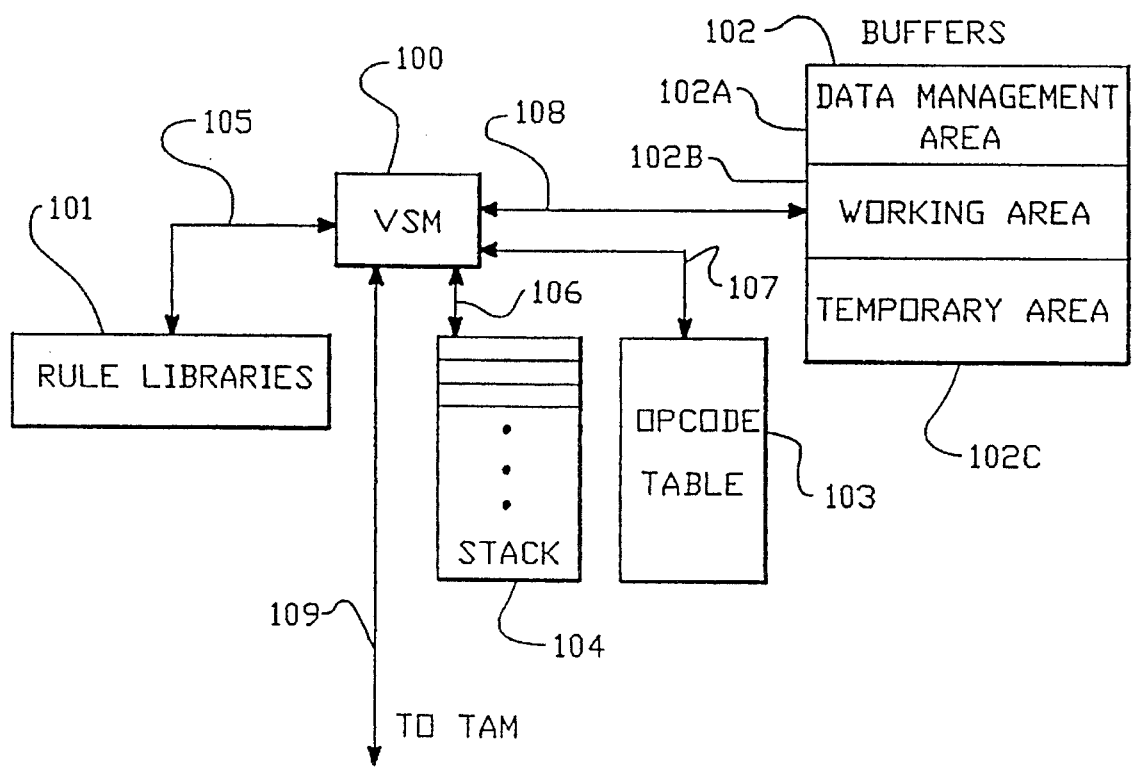
FIG. 16 is a conceptual diagram of the transaction processor according to the present invention.

FIG. 16 is a block diagram of the transaction processor which implements the virtual stack machine for execution of the object code level rules, as described in the preceding section.

The virtual stack machine is a software module 100 which manages execution of the rules. When a session begins, the virtual stack machine 100 retrieves a plurality of rule libraries 101 and establishes a set of buffers 102. In addition, an opcode table 103 is established and a stack 104 is set up. The buffers include a data management area 102A, a working area 102B, and a temporary area 102C.

In execution, the virtual stack machine generates an instruction pointer across line 105 to the rule libraries 101.

A stack pointer is generated and supplied across line 106 to the stack. The virtual stack machine 100 communicates with the opcode table 103 across line 107, and the buffers 102 across line 108. Data access instructions are passed to the table access machine across line 109. The virtual stack machine executes the algorithm as follows:

1. Fetch opcode pointed to by the instruction pointer in the rule;
2. Lookup opcode in opcode table 103 to retrieve the host system routine identified by the opcode;
3. Dispatch the host system routine;
4. Advance the instruction pointer;
5. Return to the fetch opcode step.

FIG. 17 provides an example of execution by the virtual stack machine for calling a rule named "CHECKTRAIL". In this example, the CHECKTRAIL rule includes two parameters, including 'TORONTO' and PERSON. The rule object code is stored in the rule library at the location 120. The instruction pointer will be advanced from the top code @CONST 'TORONTO' to the last object @CALL 2, offset, where the offset is indicated by the line 121. The offset identifies the position within the static data area of the rule where the rule name CHECKTRAIL with offset 122 is stored. The offset 122 stores a location in the modifiable area of the rule at which the value for the CHECKTRAIL object code is stored. The value points across line 123 to the location in the rule library 124 at which CHECKTRAIL can be found. The stack 125 is impacted as follows:

First, in response to the @CONST opcode, the value of the variable TORONTO is placed in the working area of the vertical stack machine. In response to the @TEMP opcode, a temporary copy of the TORONTO parameter is stored. The stack is loaded with an offset 126 to the value 127 for the temporary copy 128. Next, the parameter 'PERSON' is moved into the working area of the virtual stack machine and a temporary copy is made. The stack is loaded with a pointer 129 to the value 130 of the temporary copy of the constant PERSON 131. Next, the @CALL 2, offset rule is executed. If the offset in the @CALL opcode points to the name and offset in the static data area of the rule to be called, the value which identifies the location in the rule store of the rule to be called is stored in the modifiable data area at the location 132 identified by the offset 122. The instruction pointer in the virtual stack machine is then moved to the location in the rule store 124 at which CHECKTRAIL is found, and CHECKTRAIL is executed.

The rule libraries 101 shown in Fig. T consist of a plurality of rule libraries. When a @CALL opcode is executed, a search for the appropriate rule is carried out by rule name. The rule can be found as rule object code in one of the libraries, as a built in function or sub-routine (e.g., the ENTER key sub-routine which responds to user input), a customer defined external routine which is written perhaps in a different source language like Cobal or PL1, or it could be a local variable reference, rather than a call to an actual rule. Thus, the rule name search proceeds first through the list of local variables in the rule from which the statement was executed, second, through the local rules library which is set up by the user for a given session, next, through an installation rules library which is a standard set of routines established by a customer for a given execution and programming environment, fourth, through a built in routines library which includes all the standard functions of the operating system, fifth, through a system rules library which stores the Huron system rules which are utilized in the data management and other built in operations, and sixth and finally, through a library of external routines.

When a rule is called, from a prior rule, such as a session manager, the stack of the prior rule is saved in a context save area in the stack before execution of the subsequent rule is begun. The stack pointer returns to the prior rule upon execution of a return statement.

Figure 18:
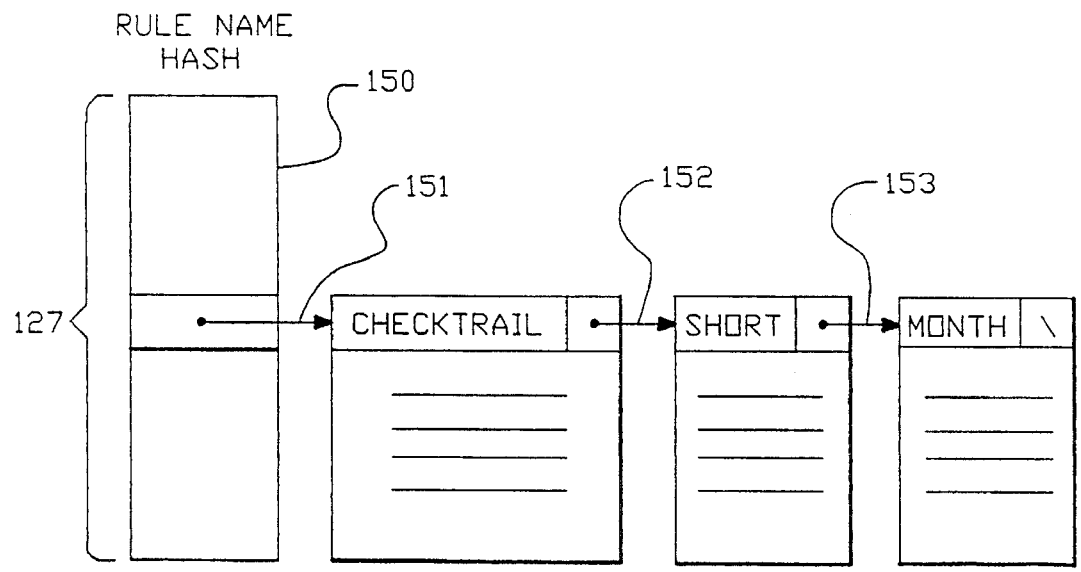
FIG. 18 is a diagram of the rule name hashing method.

The data management area 102A in the virtual stack machine contains the tables through which rule name searches are carried out. These tables are shown in FIG. 18. For the rule names, a rule name hash table 150 is generated, which is 127 entries long. Each entry in the rule name hash includes a pointer to a first rule which hashes into that entry. For instance, a pointer 151 to the CHECKTRAIL rule may be the first entry. The CHECKTRAIL rule will store a pointer 152 to a second rule which corresponds to that entry in the hash table (e.g., the SHORT rule shown in the Figure). The SHORT rule then includes a pointer 153 to a subsequent entry down to the end of the list which hashes into a given location in the rule name hash table.

If a called rule is not located in the hash table, then it must be retrieved through the table access machine and inserted into the rule library for the session.

Figure 19:
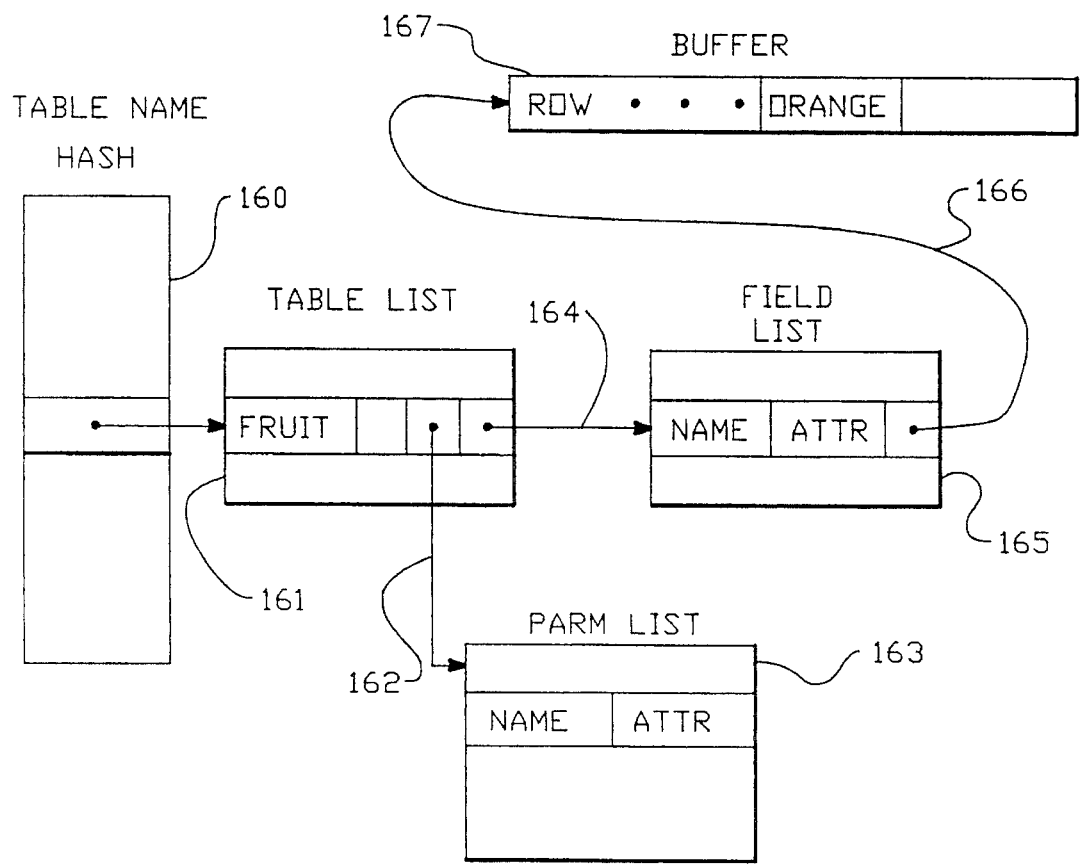
FIG. 19 is a schematic diagram of the table name hashing method.

FIG. 19 shows the table definition built in the data management area in the virtual stack machine. The table name is first hashed into a table name hash table 160. Then entry in the hash table 160 points to a table list 161 which is searched to find the name of the table "FRUIT" of interest. This entry includes a first pointer 162 to a parameter list 163 and a second pointer 164 to a field list 165 for the table. This field list includes a pointer 166 to the row buffer 167 for the occurrence of the table which has the field of interest.

The virtual stack machine maintains buffer for all data accesses and local variables. So, whenever a rule program says GET CARS WHERE LIC_PLATE='878BBC';
the VSM has to acquire the dictionary information for the table CARS and establish a buffer for it.

Likewise, when a rule program says

CUSTOMER.NAME=INPUT.NAME;
without having issued a data access command, the virtual stack machine must acquire the dictionary information for the table CUSTOMER and establish a buffer for it.

As soon as a buffer for a particular table has been established, it is henceforth available for all rules in the current transaction. The virtual stack machine keeps track of which fields and which tables have been assigned a value, either through a GET or FORALL command or through an assignment statement.

The virtual stack machine acquires the dictionary to populate its data management area exactly as any application program would, by issuing a set of access commands:

GET TABLES WHERE NAME=TABLE NAME;
FORALL FIELDS (TABLE NAME);
FORALL PARMS (TABLE NAME).

The uniform view of dictionary data and other data are strictly preserved above the table access machine. No component of the system above the table access machine sees unnormalized dictionary data.

VII. The Table Access Machine

Figure 20:
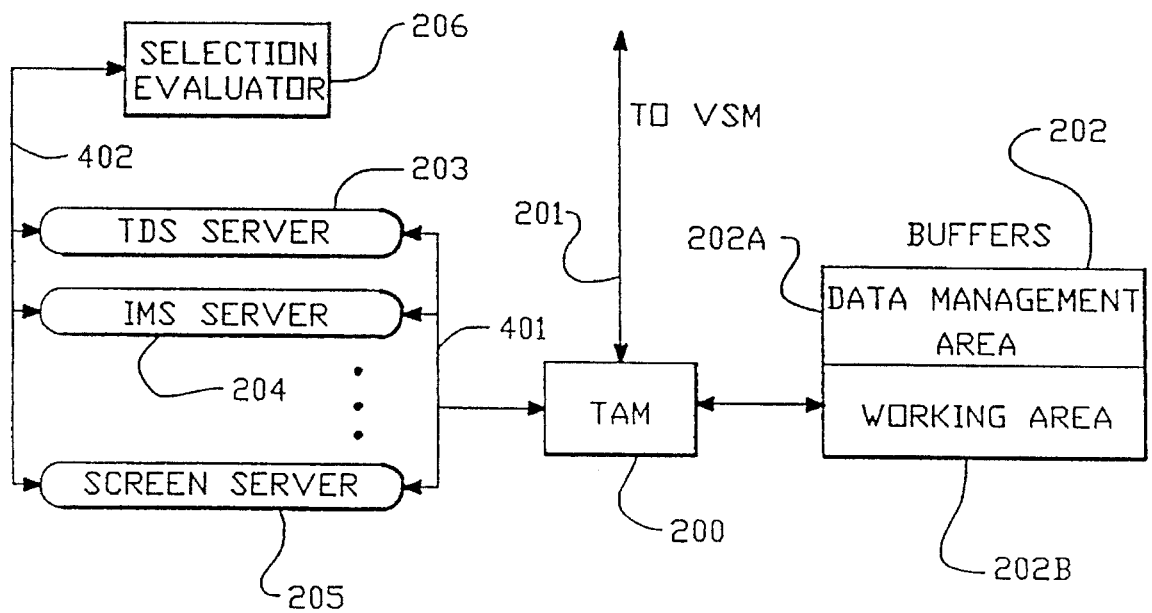
FIG. 20 is a conceptual diagram of the table access machine with a plurality of servers and buffers according to the present invention.

The table access machine is illustrated in block diagram form in FIG. 20.

This machine or method consists of a host assembler software module 200 which communicates with the virtual stack machine across line 201. This module 200 establishes buffers 202 including a data management area buffer 202A and a working area 202B. In addition, the table access method module 200 provides an interface 401 for a plurality of servers including a TDS server 203 for the native table data store, an IMS server 204 for data stored within an IMS data base associated with the host machine, a screen server 205 which provides an interface to display systems coupled to the host machine, import/export server (not shown), and other servers which are required for retrieval of data through the table access method 200 to the virtual stack machine. Coupled with the servers across interface 402 is a selection evaluator module 206 which interprets selection strings at the server level.

The Table Access Method (TAM) is the component of the system, which manages all data access in the system, and effectively is the owner of the dictionary tables and repository of all other tables used by a session.

A call to TAM has the following information:
1. Operation
2. address of data and return areas
3. Table name
4. Parameters
5. Selection string
6. Ordering string The operations are:
A: First request of a FORALL
B: Subsequent request of a FORALL
I: Insert
G: Get with key
N: Get without key
R: Replace
D: Delete
S: Display screen
C: Commit
O: Rollback
T: Transaction end On the first request for a particular table, TAM will acquire a CTABLE from the Table Data store. The CTABLE is a control block consisting of the dictionary data in unnormalized form. The CTABLE is used for processing by both TAM and all the data servers, of which TDS is one. The CTABLE contains the equivalent data as in TABLES, FIELDS, PARMS, SELECTION, ORDERING and EVEN-TRULES.

Note that TAM acquires the CTABLE for a table as soon as it is given a call like:

GET TABLES WHERE NAME=tablename;

Normally, this means that a component above TAM wants to build a buffer for <tablename> and therefore immediately after the GET request will issue a FORALL FIELDS(tablename); and a FORALL PARMS(tablename);

These requests are serviced by TAM out of the CTABLE.

Besides the CTABLE, TAM sets up data structures for data rows, where the last row accessed are maintained, as well as an Intentlist of pending updates to the data servers.

POSITIONING

TAM manages positioning within the data bases. The data servers like TDS process requests from TAM one by one, without keeping any information from request to request. Only the LOCK MANAGER (within TDS) keeps information for the duration of a transaction.

In the case of a parameterized table, TAM maintains a buffer and a position for each table accessed within the table set.

INTENT LIST

When a REPLACE, INSERT or DELETE request is received by TAM, it will ascertain that the request is possible by asking the server, if the occurrence is there (DELETE and REPLACE) or is not there (INSERT), and will acquire the necessary exclusive lock on the occurrence. Thereafter TAM will place the REPLACE, INSERT or DELETE occurrence in the Intentlist (work to do list), until it receives a COMMIT, ROLLBACK or TRANSACTION_END request.

SUBVIEWS

TAM performs the conversions between subviews and logical views, consisting of:
Data conversions between different representations
Projections (subview contains fewer fields than logical view)
Selection (subview contains fewer rows than logical view)
Ordering (different from logical view)
Derived or calculated fields A subview is effectively a window into a logical view, which never materializes in storage, only appears in buffers during the execution. To the user and VSM, however, there is no apparent difference between a subview and a logical view table.

DERIVED FIELDS, VALIDATION AND TRIGGERS

Derived fields are fields of a subview, which are calculated during the GET or FORALL processing. Validation and trigger rules are executed on the basis of EVEN-TRULES information.

In all 3 cases, TAM issues a (recursive) call to the virtual stack machine to execute a rule. The table buffer, on which the validation or trigger is scheduled is shared by the recursion levels, as is the intent list.

TEMPORARY TABLES

TAM implements the concept of temporary tables, which exist only during a transaction (in the TAM data areas), but does not materialize in any data server like TDS.

ORDERING

TAM performs all the necessary sorting for both subviews and for FORALL requests with ordering which is different from the ordering maintained by the data server.

DIRECTING

Data access requests are directed to the appropriate server on basis of the information in the TABLES table for the particular table.

Figure 21:
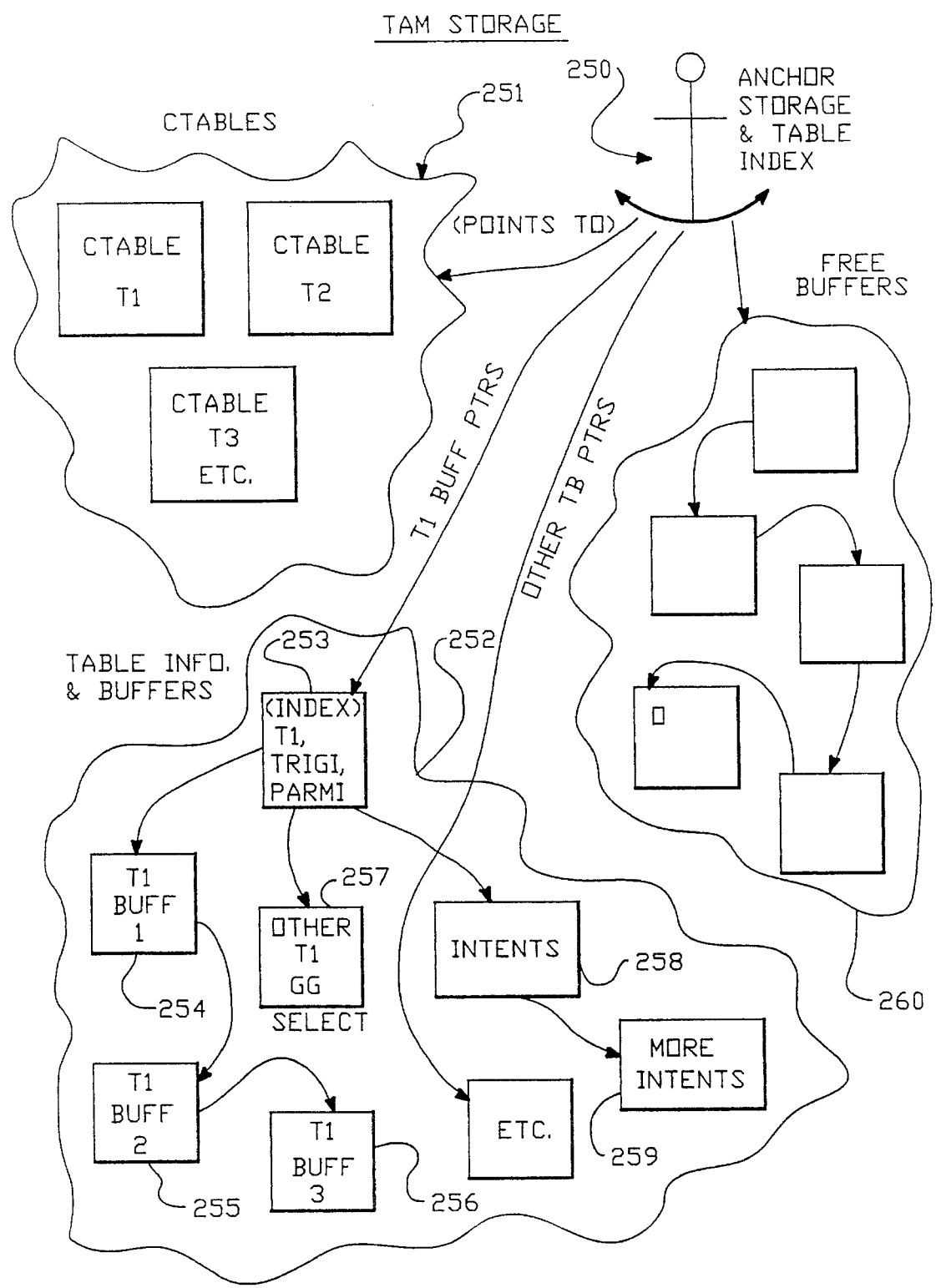
FIG. 21 is a conceptual diagram of the stroage in the table access machine.

FIG. 21 is a conceptual diagram of the TAM buffer storage area. The TAM buffer storage area includes an anchor storage area 250 which includes the table index. This table index points to a set of CTABLES 251 which buffers the CTABLE for each of the tables T1–T3 and so on.

In addition, the buffer pointer for a given table T1 points to a set 252 of buffers for the table T1. This set 252 includes an index 253 for triggers and parameters for table 1. This index points to the actual data occurrence buffers 254, 255, 256, and so on, as required. In addition, the index page 253 points to other T1 information, such as selection strings and the like, in page 257. In addition, the intent list for table T1 is maintained in pages 258 and 259, as required.

The anchor storage 250, in addition, points to free buffers in a set 260, which includes a plurality of single linked empty buffers.

The buffering is sequential and forward. The table anchors are cleared at a transaction end in response to the "T" opcode.

FIG. 22 is a chart showing the table types versus the table opcodes which are executable over those table types. The Fig. is basically self-explanatory, except that the table type SUB, which is a sub-view of either a TDS table type 1 or an IMS table type 2. In addition, the IMP type tables and the EXP type tables have a parameter PARM1 which is equal to the PDS member.

Figure 23:
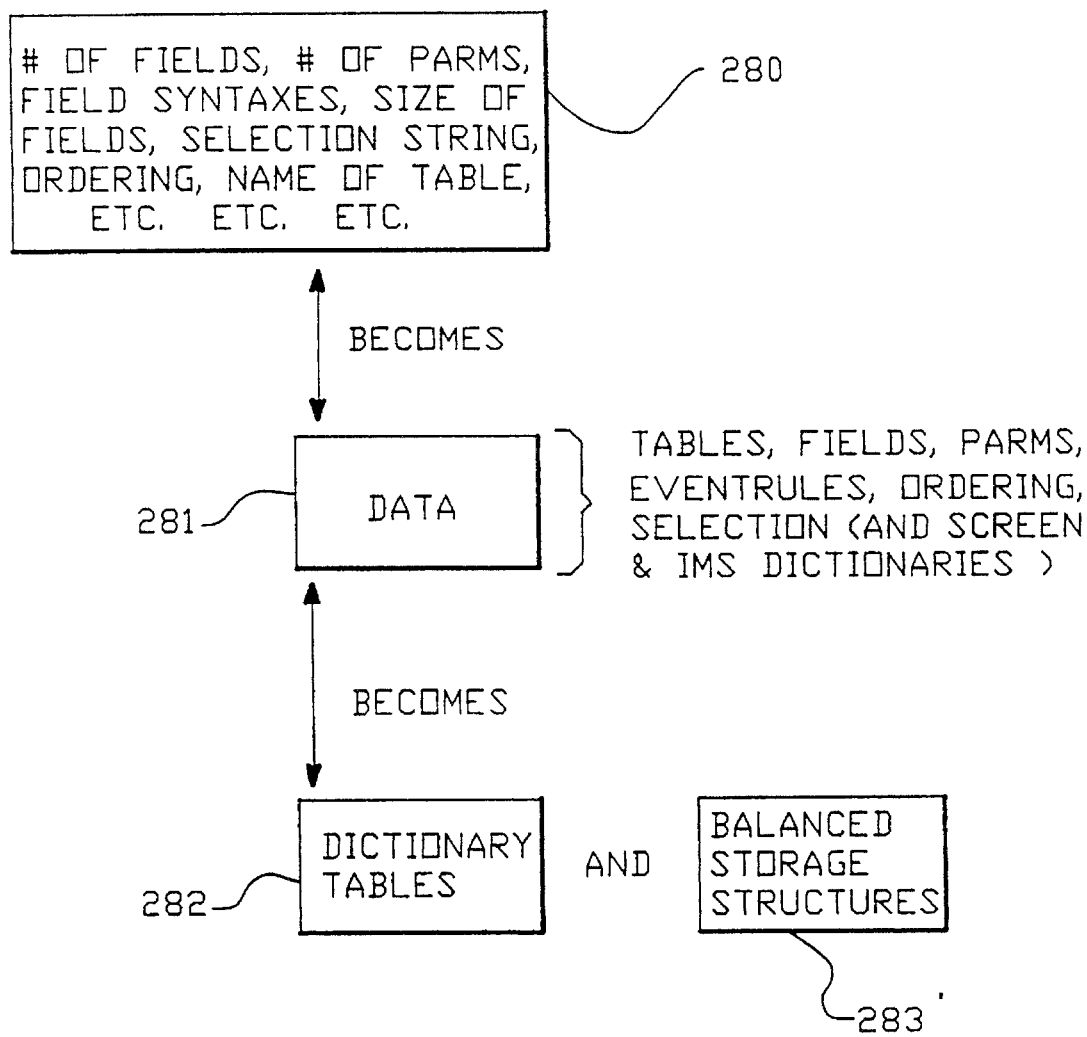
FIG. 23 is a conceptual diagram of the CTABLE.

FIG. 23 schematically illustrates the CTABLE formation in the table access machine. The CTABLE is a table of characteristics of a corresponding table stored in a buffer 280. This buffer is generated from raw data 281 which is retrieved from the dictionary tables 282 in the table data store. These dictionary tables are in turn maintained in the balanced storage structures 283 of the table data store just as all other data in the system. Thus, the metadata in a CTABLE is stored in the relational, object-oriented data base upon which the transaction is executing.

However, "meta-meta-data" is hard coded. That is, the dictionary structure is established for the user and cannot be changed. Thus, there must be the minimum set of dictionary tables for a given transaction to successfully complete.

A given CTABLE is bound for the duration of a transaction. Thus, after it has been retrieved, upon the first call to a portion of a table, all subsequent calls to that table are served by the CTABLE in the transaction storage area of the table access machine.

Figures 24, 25:
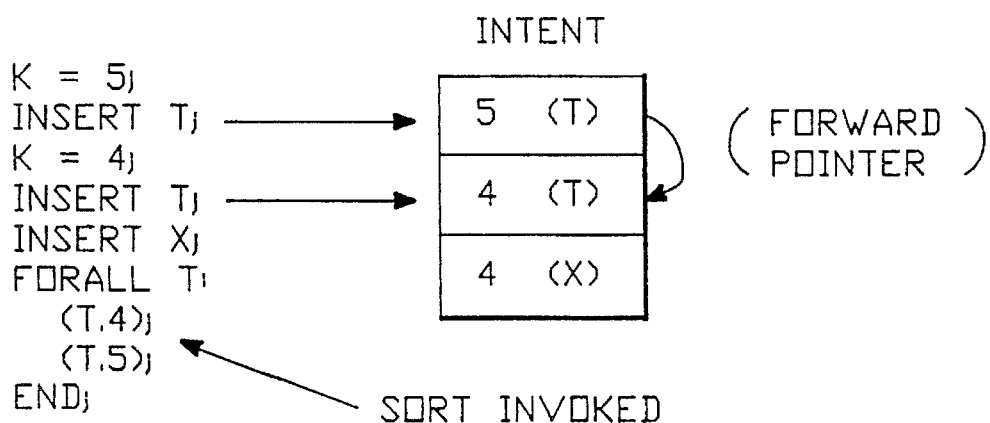
FIG. 24 is a conceptual diagram of a source table and a subview table.
FIG. 25 illustrates the operation of the intent list.

FIG. 24 is a representation of a source table (T) and a sub-view table (S). A sub-view is a map of some rectangle within the source table. Thus, as can be seen in FIG. 24, the sub-view includes the first and third columns of rows 2, 3 and 5 of the source table T. This sub-view is implemented by the table access machine with one set of data buffers, but two CTABLES. A sub-view is built for each occurrence at interface time. Derived fields, however, are generated only from the source table. Thus, in response to a request in the rule that needs access to the sub-view table S, the table access machine will build a control table for both the source table T and the sub-view table S.

The access will occur in the table data store to the source table T. Thus, a source table page will be returned to the table access machine. The table access machine then buffers the page, converts it to the logical subview, and returns the first occurrence in the sub-view to the executor.

Triggers can be executed from sub-views as event rules and otherwise in response to entries in the CTABLE for a given table. When a rule is called, the calling rule execution environment is saved, TAM sends the triggered rule to the executor for interpretation. The triggered rule can also issue table operations which will cause the executor to recurse to the table access machine. Upon completion of the triggered rule, control is returned back to the calling rule.

Parameterized tables are implemented in the access model, but not at the occurrence level. Thus, they are executed in a manner similar to sub-views. These parameterized tables allow concatenated keys, improved concurrency, save storage space in the virtual machines, and simplify archiving. They are executed by building a parameter table in the table access machine out of the dictionary in the table data store. This control table is built in response to the "P" call to the table data store from TAM. The table access machine then transfers the parameter occurrences to the executor for entry in the table lookup indexes.

TAM will retrieve data from the table data store from the source table. It builds a buffer for the source table and then will perform the parameter selections prior to sending occurrences to the executor.

Also, sub-view selection can specify a source parameter name on RHS of the operator.

Temporary tables and intent lists are created by the table access machine with the same code. The difference is that temporary tables also allow selection. These tables are searched in a linear manner. However, access can be random, unlike other table buffers.

FIG. 25 shows the code and insertions in an intent list for a given operation. See the intent list stores the intent to store the value k=5 and the value k=4. The FORALL statement executed at the end invokes the sort to establish the insertion. Other operators like replace, delete, and get use the intent list in a similar manner.

Figure 26:
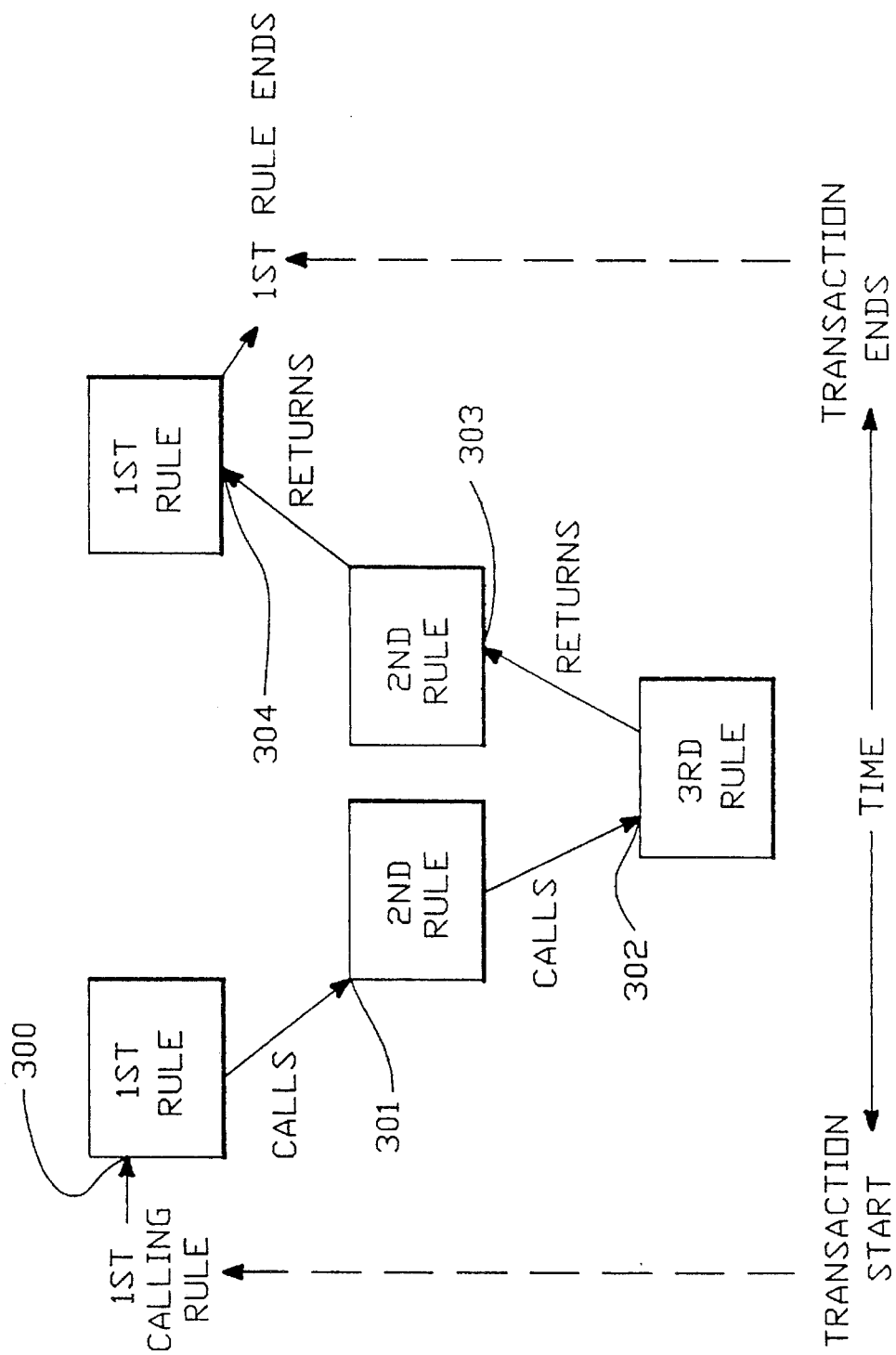
FIG. 26 is a conceptual diagram of a transaction in the virtual machine of the present invention.

FIG. 26 is a conceptual diagram of transactions. This object-oriented operating system, according to the present invention, is transaction oriented. Thus, the executor determines a transaction, and the table access machine operates with recognition of the transaction. This allows operations to be broken down into small pieces for concurrency and integrity. Also, it can be user transparent or implicit, except for transfer call and execute functions. At transaction start, as shown in FIG. 26, a first rule is CALL at point 300. This rule is executed until a second rule is called at point 301. This second rule is implemented by the executor with recursive calls to the table access machine. The second rule may call a third rule at point 302. This third rule executes until it completes operation and issues a return to the second rule at point 303. The second rule then completes execution and issues a return to the first rule at point 304. The first rule then completes execution and ends. Conceptually, the first rule could be considered a session manager in which it presents menu screens to an operator. The operator then invokes a second rule to perform a given application. This second rule may include any number of transaction levels as required by the given application.

The table access machine also executes a two-phase lock protocol for objects in the data base. All locks are cleared at transaction end and cannot be made "weaker" during a transaction. The locks are requested by the table access machine and granted, or not, by the native access method server, such as the table data store or the server of other types of data sources.

The table access machine also builds selection strings for transfer to a selection evaluator which is associated with the table data store server or other native data store server. Selection evaluator is called by a server. The server supplies a row from a table, along with a selection string. There are no data definitons passed to the selection evaluator. The selection evaluator carries out the selection operation. Results of the selection are returned to the table access machine by the appropriate server.

To access the various tables, screens, and other subsystems in the subject data processing system, object code routines in the VSM build @TAM arguments, which are forwarded to TAM on the VSM <---> TAM interface. TAM communicates various requests to the Servers which perform the actual accessing of the tables, screens, etc. The Servers may in turn forward requests to the Selection Evaluator, which performs evaluations and returns responses to the Servers. The Servers then return data or answers to TAM, which forwards them to the VSM object code routines.

TAM <---> Server Interface

TAM communicates with the various entities of the computing environment via Servers. There are Servers for screens, IMS, import/export, native table data store, and other entities. TAM sends a request to a Server, followed by one or more data strings. A data string begins with a 1-byte length indicator if the string is less than 128 bytes in length (bit 0 clear), or a 2-byte length indicator (bit 0 set) if the string is greater than 127 bytes in length. Table 64 lists the valid Server requests which TAM may make:

TABLE 64

(Valid TAM —> Server Requests)

| Code | Name |
|---|---|
| C | Ctable request |
| R | Release locks |
| G | Get |
| N | Next |
| P | Next Parameter |

Tables 65–69 give detailed information about the data contents of the request and return communications for each of the request codes:

TABLE 65 (C)

TAM —> Server C request:

| Byte Offset | Length | Contents |
|---|---|---|
| 0 | 2 | Message length |
| 2 | 4 | Transaction ID |
| 6 | 1 | Request code |
| 7 | 3 | Type of data |
| 10 | variable | Tablename, UserID, and GroupID data strings |

Server —> TAM C return:

| Byte Offset | Length | Contents |
|---|---|---|
| 0 | 2 | Message length |
| 2 | 2 | Return code |
| 4 | 4 | Transaction ID |
| 8 | variable | CTable data string |

TABLE 66 (R)

TAM —> Server R request:

| Byte Offset | Length | Contents |
|---|---|---|
| 0 | 2 | Message length |
| 2 | 4 | Transaction ID |
| 6 | 1 | Request code |

Server —> TAM R return:

| Byte Offset | Length | Contents |
|---|---|---|
| 0 | 2 | Message length |
| 2 | 2 | Return code |
| 4 | 4 | Transaction ID |

TABLE 67 (G)

TAM —> Server G request:

| Byte Offset | Length | Contents |
|---|---|---|
| 0 | 2 | Message length |
| 2 | 4 | Transaction ID |
| 6 | 1 | Request code |
| 7 | 1 | Lock |
| 8 | variable | Tablename, Parameters, and Key Value data strings |

Server —> TAM G return:

| Byte Offset | Length | Contents |
|---|---|---|
| 0 | 2 | Message length |
| 2 | 2 | Return code |
| 4 | 4 | Transaction ID |
| 8 | variable | Table Row data string |

TABLE 68 (N)

TAM —> Server N request:

| Byte Offset | Length | Contents |
|---|---|---|
| 0 | 2 | Message length |
| 2 | 4 | Transaction ID |
| 6 | 1 | Request code |
| 7 | 1 | Lock |
| 8 | variable | Tablename, Parameters, Last Row, Selection, Keyname Ordering, and Keyname !op! Value data strings |

Server —> TAM N return:

| Byte Offset | Length | Contents |
|---|---|---|
| 0 | 2 | Message length |
| 2 | 2 | Return code |
| 4 | 4 | Transaction ID |
| 8 | variable | Table Rows data string |

TABLE 69 (P)

TAM —> Server P request:

| Byte Offset | Length | Contents |
|---|---|---|
| 0 | 2 | Message length |
| 2 | 4 | Transaction ID |
| 6 | 1 | Request code |
| 7 | 1 | Lock |
| 8 | variable | Tablename, Last Parameter Set, and Selection data strings |

Server —> TAM P return:

| Byte Offset | Length | Contents |
|---|---|---|
| 0 | 2 | Message length |
| 2 | 2 | Return code |
| 4 | 4 | Transaction ID |
| 8 | variable | Parameter Sets data string |

Additionally, an Update (synchronization) message may be sent by TAM. Table 70 gives detailed information about the data content of that message and its return answer:

TABLE 70

(Update)

TAM ⟶ Server update message:

| Byte Offset | Length | Contents |
|---|---|---|
| 0 | 2 | Message length |
| 2 | 2 | Number of transactions |
| 4 | 1 | Lock request |
| 5 | variable | One of more transactions udpate records, each including: |
| 4 | | Transaction ID |
| 2 | | Number of updates, each update consisting of: |
| 2 | | Length |
| 1 | | Update request (I, R, D) |
| variable | | Tablename, Parameters, and Table Row data strings |

Server ⟶ TAM update return:

| Byte Offset | Length | Contents |
|---|---|---|
| 0 | 2 | Message length |
| 2 | 2 | Return code |
| 4 | 4 | Transaction ID |

Server --> Selection Evaluator Interface

TAM may send to the Servers various messages which include information which must be forwarded to the Selection Evaluator for processing. The Selection Evaluator expects the following registers to contain the indicated data:

| Register | Contents |
|---|---|
| 15 | address of entry point into Selection Evaluator |
| 13 | address of standard save area |
| 01 | address of parameter list |

The parameter list contains, at the given byte offsets, the following information:

| Byte Offset | Contents |
|---|---|
| 0 | address of selection string |
| 4 | address of table row to be compared |
| 8 | address of 4080-byte work area |

A selection string consists of a 2-byte length field followed by one or more selection terms in postfix notation. Each selection term begins with a 1-byte opcode, and can be grouped into the categories listed in Table 71:

TABLE 71

(Selection Terms)

| Term Type | Function |
|---|---|
| Operator | 1 - byte arithmetic, relational, or logical opcode |
| Field reference | 1-byte opcode ('44') followed |

TABLE 71-continued

| | by a 6-byte field descriptor and a 2-byte field number |
|---|---|
| Offset reference | 1-byte opcode ('4C') followed by a 6-byte field descriptor and a 2-byte offset of the field in the row. Used for Temporary, Import, Screen, and IMS tables. |
| Value | 1-byte opcode ('48') followed by a 6-byte value descriptor and a value. Values begin with a 1-byte (length < 128, bit 0 clear) or 2-byte (length > 127, bit 0 set) length prefix. |

Detailed information about the contents of the field and value descriptors, and selection string term opcodes are given in Tables 72 and 73, respectively:

TABLE 72

(6-byte Field and Value Descriptors)

| Byte Offset | Length | Contents |
|---|---|---|
| 0 | 1 | semantic type |
| 1 | 1 | data syntax |
| 2 | 2 | maximum data length |
| 4 | 2 | number of decimal places |

TABLE 73

(Hexadecimal Opcodes)

| Opcode | | Function |
|---|---|---|
| (Arithmetic) | | |
| '04' | + | (addition) |
| '08' | − | (subtraction) |
| '0C' | * | (multiplication) |
| '10' | / | (division) |
| '14' | ** | (exponential) |
| '18' | − | (unary minus) |
| '1C' | ¦¦ | (concatenation) |
| (Relational) | | |
| '20' | = | (equal) |
| '24' | ≠ | (not equal) |
| '28' | < | (less than) |
| '2C' | <= | (less than or equal) |
| '30' | > | (greater than) |
| '34' | >= | (greater than or equal) |
| (Logical) | | |
| '38' | & | (and) |
| '3C' | ¦ | (or) |
| '40' | | (not) |
| (Other) | | |
| '44' | R | (reference to i'th field in row) |
| '48' | V | (value) |
| '4C' | O | (reference to field at offset in row) |
| '54' | @ | (parameter replaced in selection and always evaluates to true) |
| 'BC' | LIKE | (relation) |

The LIKE relational operator has two operands: a field name and a pattern. The result of the relation is true if the value of the field in the row matches the pattern. The pattern may include the wildcards: '*' (any string of zero or more characters) and '?' (any one character).

The table row passed by address to the Selection Evaluator may be in either of two formats: Expanded Variable Length Row format (used with Temporary, Import, Screen, and IMS tables), or Variable Length Row format (used elsewhere).

Variable Length Row format begins with a 2-byte row length designator, which gives the length of the entire row including the designator itself. Appended to the row length designator are one or more fields, the first field being a "key" field. Each such field begins with a 1-byte field length indicator if the field length is less than 128 bytes excluding the length indicator (bit 0 clear), or 2-byte field length indicator if the length is greater than 127 bytes (bit 0 set). The value of the field is represented in the given number of bytes. Blanks are removed from the right end of all fields containing syntax characters. If a requested field is not present in the row, the field is assumed to have a null value.

Expanded Variable Length Row format differs slightly, in that no row length designator is used. Also, fixed numbers of bytes are reserved for each field's value, with the length indicator for each field merely indicating how many of those bytes are actually used. The final difference is that if a requested field is not present in the row, the row is not selected unless the field is being compared with a null string.

Selection Evaluator --> Server Interface

Upon return, the Selection Evaluator will pass, to the Servers, the following return codes in register 15:

| Return Code | Reason |
| --- | --- |
| 0 | row matches selection criteria |
| 4 | row does not match selection criteria |
| 8 | error detected |

If an error is detected, the Selection Evaluator will return, in the work area, the data shown in Table 74.

TABLE 74

(Selection Evaluator Return)

| Byte Offset | Length | Meaning |
| --- | --- | --- |
| 0 | 2 | error code where: Code Meaning |
| | | 1 overflow |
| | | 2 underflow |
| | | 3 conversion |
| | | 4 division by zero |
| | | 5 result of exponential operation is imaginary |
| 2 | 2 | error message length indicator |
| 4 | variable | error message text |

The error message text may contain strings of the form "%Fnnnn", where "nnnn" is a four-digit field number for Variable Length Row format or a four-digit field offset for a fixed length format row. For example, an error message may read 'TYPE ERROR, FIELD "%F0010" COMPARED WITH TYPE IDENTIFIER' and the calling entity may then substitute the appropriate field name into the string in lieu of "%F0010".

Thus, a table access can be summarized as beginning with a table access statement in the object code of the executor. The object code thus includes the code which builds the @TAM arguments, and constants to be used by such arguments. This code can be rebuilt individual form at the source level by the rule editor. The table access statement in object code is then translated into a @TAM opcode format. This includes the opcode, table names, parameters, selection strings, ordering information onto the stack. The values are stored in descriptor format, and based on data management data structures. The accesses are made using field names. Next, the TABLE ACCESS MACHINE INTERFACE is executed, which the opcode, table name, parameters, selection strings, and ordering are set out in machine code format.

The server then performs a necessary communication with the native data store to return the identified occurrences. The selection evaluator is invoked by the server when appropriate.

VIII. Dynamic Binding

The dynamic binding carried out in the virtual stack machine can be summarized as implementation with three major steps. First, the rule object code is implemented with a modifiable data area. Second, the executor builds hash tables for rules and tables by which objects to be bound can be quickly found. Third, at a log on of a session, the virtual stack machine buffers fixed data, including rules from system and installation libraries, and the fixed table definitions for the dictionaries and the like.

Objects in a rule which are not bound include rules or data stored in tables. When a rule calls another rule by a name, the rule will include an offset to a position in the modifiable data area of the rule at which the value of the rule to be called can be stored. The executor then searches for the rule by name through the hash tables and its buffers. If it is not found in the hash tables, then a call to the table access machine is executed to insert the buffer and the proper values in the hash tables. When the buffer for the rule to be called is found by the executor, then the value of the buffer is inserted into the modifiable portion of the rule. Similarly, when an object is called by a table and field name by a rule, that table is found by the virtual stack machine through hash tables or libraries. The value for the occurrence of the table in which the called field is found is then stored in the modifiable portion of the rule at the specified offset.

All objects in the data base can be bound at execution time using these formats. In fact, the rule binding is the same as the table.field binding, except that the table in which a rule is found is determined by searching a predetermined set of libraries as described above.

At log on of a session, a good number of the data tables from the table data store and other storage systems associated with the host can be retrieved into the virtual stack machines buffers to minimize the calls through the table access machine and the native data stores during execution of a rule.

IX. Table Data Store

Figure 27:
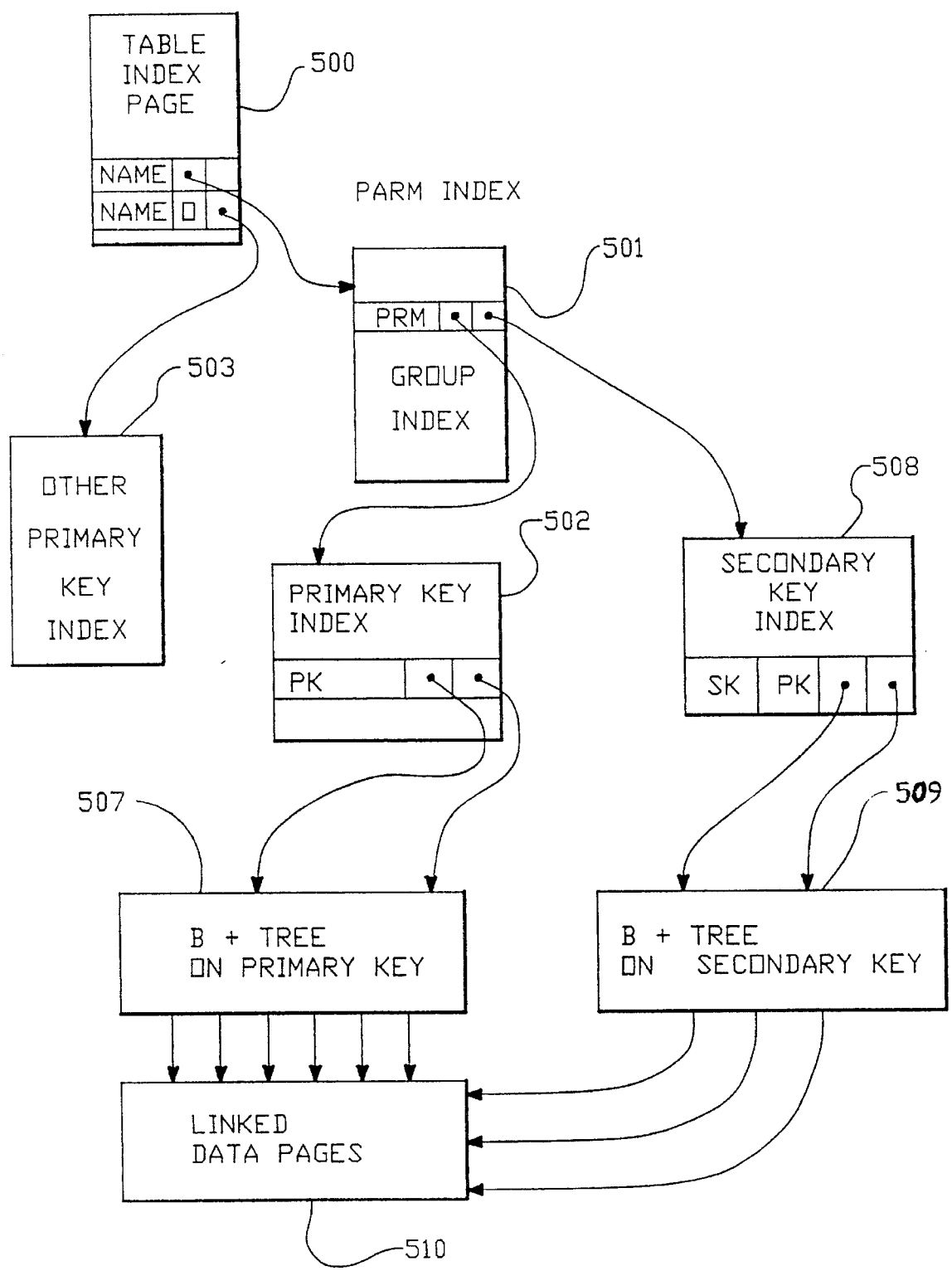
FIG. 27 is a schematic diagram of the table data store access method.

The table data store is the native access method for the object-oriented operating system according to the present invention. Data in this system is stored in a balanced structure where each table is ordered on the primary key within the table. The basic structure of the access method implemented by the table data store is shown in FIG. 27. The table data store consists of a table index page 500. The table index page includes a list of table names with pointers to a parameter index page 501 where appropriate. Other entries in the table index page point directly to a primary key index 503. Entries in the parameter index page 501 point to a primary key index 502. The primary key index is a balanced binary tree 507 based on the B+ tree organization ordered on the primary key (where index 502 is the top of the tree). The bottom of the B+ tree points to the actual link to data pages which store occurrences for the table.

The parameter index 501 or the table index page 500 can point also to a secondary key index 508. Secondary key index 508 points to lower sets 509 of indexes on a secondary key based on the B+ key structure. These indexes point to the same linked data pages 510 as the B+ tree on the primary key 507.

Figure 28:
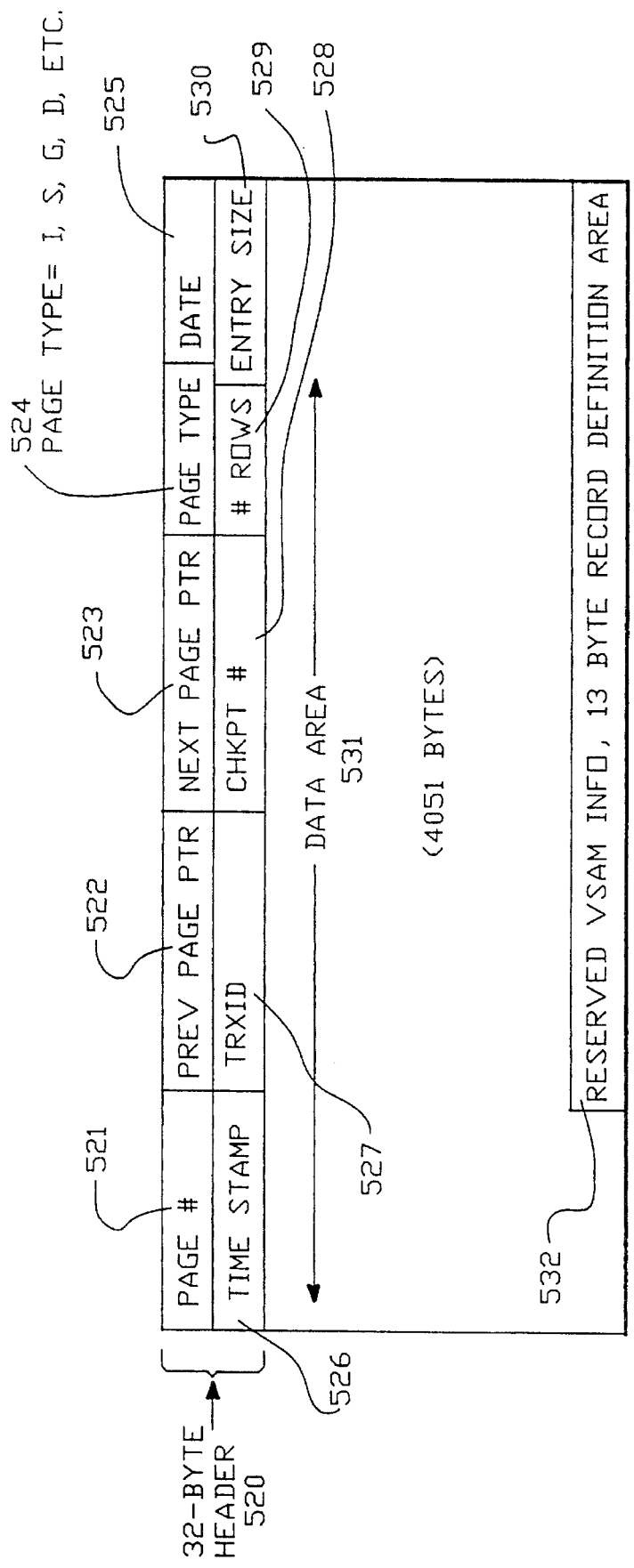
FIG. 28 illustrates the layout of a page of data in the table data store.

The page layout for all page types is shown in FIG. 28. The page includes a 32 byte header 520. The header consists of the page number 521, a previous page pointer 522, a next page pointer 523, a page type indicator 524, and a date value 525. A time stamp 526 is included, as well as a transaction I.D. 527, a check point number 528, the number of rows in the page 529, and the size of each row in the page 530. A data area 531 consists of 4,051 bytes of raw data. At the end of the page, a 13 byte record definition area is reserved for VSAM INFORMATION 532 used by the host system.

A record within the page stores a row of the table in the format as follows:

LL/l/value/l/value/l/value ... l/value/l/value,
where LL is equal to a 2 byte length of the row, 1 is equal to a 1 or 2 byte length for the value, and the value is the actual data entry or a null value.

A primary index record is of the following format:
value/pointer.
A secondary index record is of the format:
secondary key value/primary key value/pointer.
A group index entry is of the format:
parm/parm/ . . . /pointer.

The B+ tree automatically balances the data structure. Whenever more than two entries in a given level of the tree are created, the B+ tree automatically implements an independent level of the tree according to well know techniques.

Accordingly, searches for occurrences in a table by the primary key are carried out very quickly. For searches on non-ordered fields, an entire table must be retrieved to the server for selection or the table access machine for creating a sub-view or the like.

X. Translator/Detranslator

The creation and modification of rules is accomplished through the interaction of three components: an editor, a translator and a detranslator. The rule editor is an interactive tool which allows a user to make testual changes to a rule's contents. The translator converts a rule's textual image into "virtual machine code", which may be executed by Huron's virtual machine. The detranslator performs the inverse transformation: it produces a textual representation of a rule from its virtual machine image.

When a rule is edited, the detranslator transforms its virtual machine code into a tokenized representation of the source. The composer then takes the tokenized form and builds the line by line textual representation of the rule. This is what is displayed to the user by the editor. As chanhges are made by the user, the scanner performs lexical analysis of the lines that are updated. Lexical analysis converts the lines into their tokenized form, ready for input to the translator. When the user saves a rule, the translator parses it and, if valid, generates the virtual machine code for the rule. Once the rule is saved in its executable form, the rule's text is discarded.

Figure 29:
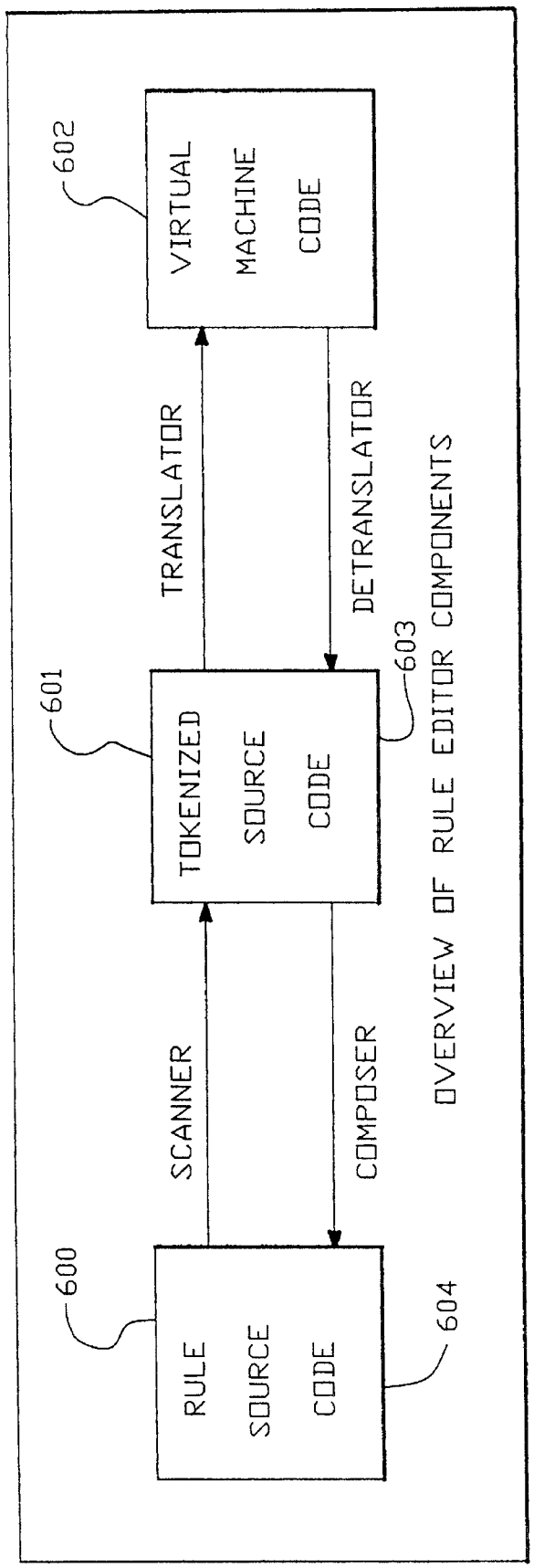
FIG. 29 is an overview of the rule editor components according to the present invention.

FIG. 29 provides an overview of the translator/detranslator system. It operates by scanning the rule source code 600 which translates it into a tokenized source code 601. The translator then generates the virtual machine code 602. Virtual machine code is detranslated to a tokenized source code 603 when required by a user for editing. It is supplied back to the user by a composer as rule source code.

The tokenized source code consists of data stored in a TOKENS table built by the detranslator and parameterized by logical line. A lexical analyzer is used to modify the TOKENS table. This table consists of the following fields:

INDEX—the primary key;
STRING—the text of the token;
TYPE—the type of token;
LEN—the character length of the token;
DEC—the number of digits to the right of the decimal points of the token;
TABREF.MARK—indicates whether this token is part of a table.field reference.

Tokens which are too long for the TOKENS table are stored in the LONG_STRINGS table. This includes tokens greater than 16 characters in length, quoted strings, and large numbers. This table is comprised of the following fields:

INDEX—primary key;
STRING—test of token;
TYPE—type of token;
LEN—character length of the token;
DEC—the number of digits to the right of the decimal point.

This LONG_STRING table is identified in the TOKENS table by inserting in the TYPE field "long string", and by inserting an index to the LONG_STRINGS table in the LEN field.

A typical TOKENS table and LONG_STRINGS table are shown in FIG. 30. The logical line is shown at 1000, and the tokenized representation of the line is shown in the tables 1001, 1002.

The translator converts tokenized representation of the rule into virtual machine code. It performs context free syntax checking and some context sensitive syntax checking. Further, it generates the threaded object code suitable for run time binding.

The algorithm structure is written in rules of the object-oriented operating system. It performs a top down recursire descent translation algorithm in which the language syntax is hard coded in conditions. The translator converts the infix form of the rules language to the postfix form of the object language suitable for execution on the stack machine. Finally, it saves information about rule data. The translator generates the rule object code in the format described above. The modifiable data area is actually allocated only at run time.

A rule may contain a variety of data types including constants that are literally in the program or generated by the translator, exception handler names, global (unbound) names, such as a rule or local variable, and table.field names. The translator maintains a table for each kind of data item called CONSTANTS, EXCEPTIONS, SYMTAB, and TABLE_REFS, respectively. It also maintains a table known as KELOCATION which allows dummy references to data items to be resolved by the translator.

The CONSTANT table contains the following fields:

INDEX_PRIMARY KEY;

STRING_TEXT OF CONSTANT;

TYPE—semantic type (always "S");

SYNTAX—internal representation;

LEN—number of bytes;

DEC—number of digits to the right of the decimal point;

REAL_ADDRESS—offset to the constant.

Thus, the object code format of a constant can be generated from the CONSTANTS table.

The SYMTAB table contains information about rules, such as local variable, parameters, and global unbound names directly or indirectly called in the rule. The field of the SYMTAB table include:

IDENT—primary key (identifier name);

KIND—parameter, local or global;

REF—the offset to the data item (negative if an indirect name);

INDEX—unique within the kind (key).

Again, the parameters and locals and globals in the object code format can be generated from the SYMTAB table. The TABLE_REFS table contains information about the table.field references. The fields include the following:

INDEX—primary key;

TABLE_NAME—name of the table (quote if indirect);

FIELD_NAME—name of the field (quote if indirect);

REAL_ADDRESS—the offset to the data item (negative if either name is indirect).

Again, it can be seen that the table.field references within the object code can be generated from this table.

The RELOCATION table contains information about "dummy" references to data objects. It is used to resolve these references once data objects have been allocated. The RELOCATION table includes the following fields:

OCCUR_ADDR—the offset to the dummy reference;

TYPE—the kind of dummy reference (constant, global, . . . );

TABLE_INDEX—the index to the corresponding table;

OFFSET—this contains the offset to the object.

Once all data objects have been allocated, the translator traverses the RELOCATION table and resolves all references to these objects.

The EXCEPTION table contains the following fields:

EX_NUM—the primary key;

IDENT—the exception name;

FORALLY—the loop number if within an until clause, otherwise zero;

OFFSET—the offset decode for the handler;

TABLE NAME—the associated table name if any;

TABLE OFFSET—the offset to the name of the table in object code.

The exception handler names are generated from the EXCEPTIONS table. If the handler has an associated table name, it can also be generated from this table.

The detranslator converts the virtual machine code to tokenized representation of the rule language. The algorithm structure is written in the rules within the object-oriented operating system. It converts the post-fix form of the object level representation to the in-fix form of the rule language. The detranslator is table driven. Most of the object code structure is encoded in tables which are referred to by the detranslator.

The detranslator uses several stacks for the conversion from post-fix to in-fix.

The detranslator is essentially a stack machine. Rather than executing post-fix code, it transforms it into its tokenized representation. Each opcode causes the manipulation of the detranslator internal stacks. Once the opcode for the left hand side of a statement is reached, contents of the stack or stacks are moved to the tokens table. The detranslator maintains three stacks which operate in harmony and are identified in corresponding tables. The first is the DET_STACK table. Objects are pushed onto this stack as each opcode is visited. It is a marked stack, as stack elements between the markers are moved as one element. The DET_STACK table includes the following fields:

INDEX—primary key;

TYPE—the detranslation type (parameter, constant, table.field reference,

OFFSET—the offset to the data item in the static data area;

ITEM—symbol text;

SUBTYPE—this is the translator type (operator, reserved word, . . . ).

The next table is known as the DET_PRED_ST table. This table contains the precedence of an item of the DET_STACK. The fields include the following:

INDEX—primary key;

PRECEDENCE—the item's precedence.

The final stack is identified in the DET_WORKAREA table. Items are placed in this table from the DET_STACK table. It helps during conversion of post-fix to in-fix. Items are transferred from the DET_WORKAREA back to the DET_STACK. It contains the same fields as the DET_STACK table.

An example of detranslation is shown in Figs. T/D1-T/D4C. The source for the detranslation is L=1+2; the object is as follows:

1:@CONST 1

2:@CONST 2

3:@ADD

4:@SETL L.

Figure 31:
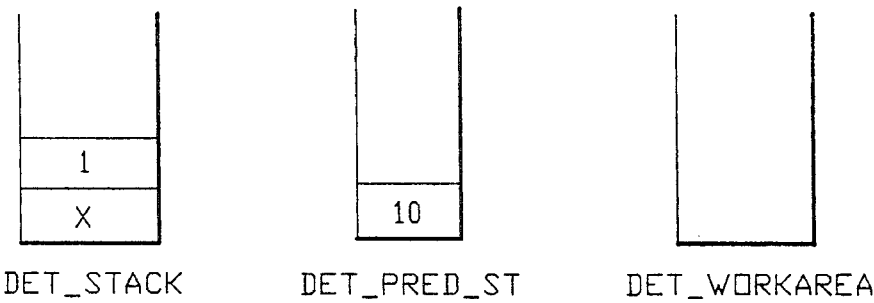

The first step is shown in FIG. 31. The value "1" is inserted into the DET_STACK with the marker X indicating a boundary element. The DET_PRED_ST is filled with the precedence 10 of the first data element. The DET_WORKAREA is empty.

Figure 32:
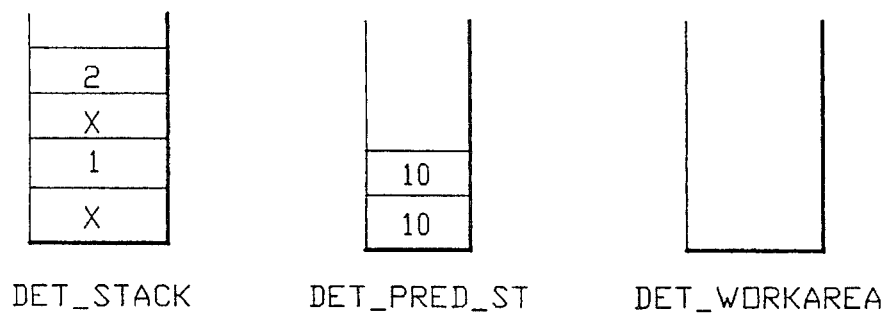
Figure 33A:
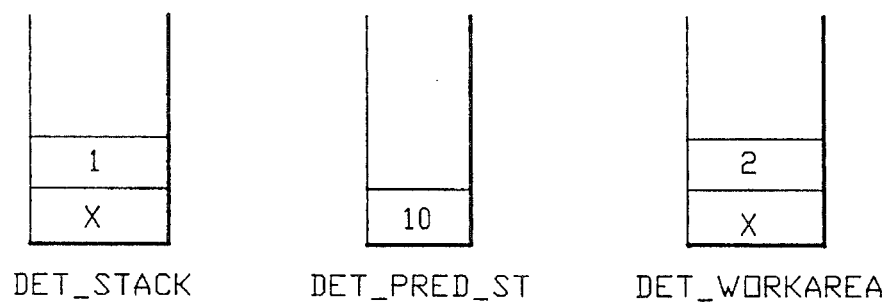
Figure 33B:
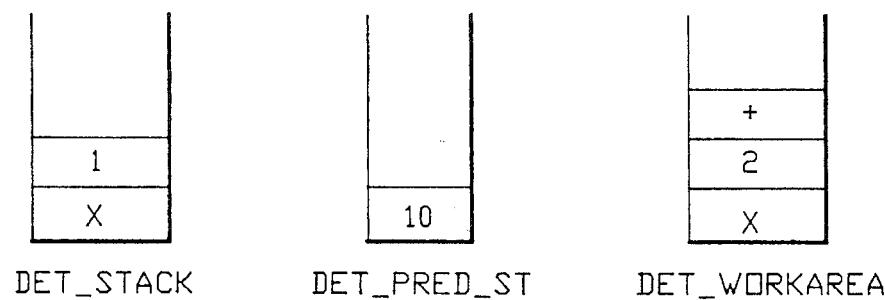

The next step is shown in FIG. 32. In this step, the value constant 2 is entered as an element of the DET_STACK and its precedence is set on the DET_PRED_ST as a value 10. The work area remains empty. In the next step, the @ADD operator is encountered. In this step, the constant 2 is moved to the work area and its precedence removed from the stack. Next, the "+" operator is added to the work area stack as part of the element including the constant 2. Finally, the constant 1 is moved from the stack to the work area as part of the same element as the constant 2 and the "+". These steps are sequentially shown in FIGS. 33A, 33B, and 33C.

In FIG. 34A, the contents of the work area are transferred back to the main stack. In FIGS. 34B, 34C, 34D and 34E, the TOKENS table is filled. This happens in response to the @SETL opcode which inserts the first and second tokens as shown in FIG. 34B. Thus, the fields of the tokens table for the first token is filled with the value L, an identifier I. It is a one character string with zero positions to the right of the decimal point. It is not a part of the table.field reference. The next entry 2 is the equal sign. It is an operator with one character length with no points to the right of the decimal point and not part of a table.field reference. The contents of the stack are then reordered into the work area to the in-fix form as it appears in the rule language as shown in FIG. 34C. Finally, the balance of the TOKENS table is build from the work area entries as shown in FIG. 34D. The 1 is taken from the top of the work area and inserted as the third entry in the TOKENS table. The "+" operator is inserted as the fourth entry. The constant 2 is inserted as the fifth entry, and the ";", which is the end of the line, is inserted as the last entry. After this occurs, the stack, the precedence table and work area are cleared as illustrated in FIGS. 34E.

This translator/detranslator pair provides the means of maintaining only one single version or representation of any given program on the computer. Only the object code version of a program is stored on the secondary storage medium. The source code version is only generated on demand by the detranslation from the object code. The object code version includes all information necessary to assist the detranslation process. This provides significant maintenance cost reductions because no effort is spent to secure synchronization of source and object code versions of programs. The need for secondary storage is reduced as only the object code version need be stored. Further, several translator/detranslator pairs could be implemented so that the same program can be represented differently for different programs. Use of this technique would allow implementation of the rule language in a variety of different spoken languages like French, German or English, different graphical or diagrammatic representation of program structures, or in different communication media, for instance, visual or sound.

CONCLUSION

The object-oriented operating system of the present invention offers a new generation of application system environment which could substantially enhance programmer efficiency. Some of the key technologies implemented in this invention include the central active on line repository of tables which maintains definitions of data and programs, and links all resources necessary at execution time without regard to where in the storage system the resources reside. It enables dynamic data driven structure in the environment of the system to operate without performance limitation of tradition interpretive systems. Further, the operating system of the present invention is not limited to any particular hardware or control program environment. Programming developed on one node may be moved easily to any other platform of the system, such as from a main frame to a work station. This makes it possible to support a broad user base with a single programming structure.

In this operating system, there is only one copy of any program module. All program modules are stored in the repository in object form. Traditional maintenance problems associated with coordinating source and object modules are completely eliminated.

The rule language of the operating systems enforces and supports structured programming techniques. It eliminates the inefficiencies of huge load modules and pregenerated transaction logic.

The rule language is a general purpose language which is comparable to specification languages for ease of use. The rule language integrates program and data access functions under a single view, and can be used for general purpose applications.

The operating system implements data driven programming. This makes it easy to store all program parameters in the data base. Further, clear separation between data and programs can be easily accomplished.

The data representation provided by the operating system provides extensions to the traditional relational model to offer the functionality of the relational conceptual model together with the performance associated with hierarchical internal models.

Semantic data types are supported. Thus, improper use of data can be restricted. Further, this facilitates data compatibility in instances where simple syntactical descriptors may be incompatible.

The operating system provides a superior implementation of event driven processing. Common data related functions can be managed with the data instead of contained within application programs. This reduces the amount of coding necessary by a programmer and provides an ability to control common procedures through a data base administrator.

The operating system presents an access to heterogeneous data stores. A customer can utilize the object-oriented operating system to access old data in a data base other than the native data store of the operating system. For instance, data in an IMS data base is presented to the user as if it were stored in the TDS.

This permits the extended relational conceptual view of data to be distributed across different physical data base systems, including the table data store, IMS, DB2, and other main frame data base management systems. Also, new programs may be developed using the relational views no matter where the data is located. User does not need to include the calls to specific data base management systems within his programs.

The virtual stack machine with dynamic binding, the on-line dictionary maintained by the table access machine within the native data store, and the extended relational view of data which treats all objects in the system with a common view combine to form an object-oriented operating system that provides a very high level interface for programming and data access, and a complete data processing system for development and production of programs.

The on-line transaction oriented system of the present invention provides full consistency and recovery using a two-phase commit protocol. The data base is an object-oriented system with semantic data types and strong support for events. The programming rules are practical in general purpose in the form of an extended case statement. The message based architecture of the virtual machines support access to distributed heterogeneous data bases. The system provides control of data and programs as a shared is as strategic resources. Application development fast as prototyping. The application systems are easy to change and expand. And the interface for data access and ad hoc processing is simple yet powerful.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A computer method for processing a GET instruction which recovers a data record from a relational database of data records stored within a computer system, a data record is comprised of a plurality of named fields where one of said fields includes a primary key for use in identifying the data record, the database is comprised of a plurality of named tables, each table having a plurality of rows where each said row is associated with a data record, each table has a row index in which the rows are ordered on the primary keys of the data records in the table where each entry in the row index points to a memory location of a data record, the computer system having a template register for each table in said database, the GET instruction is formatted to include the name of a table, selection criteria for specifying the values for one or more named field(s) associated with the data records in the named table and action criteria to be used in the execution of the data record retrieved from the database, said computer method comprising the steps of;

a) retrieving the named table specified in the GET instruction from the database;

b) retrieving the row index for the named table specified in the GET instruction from the database;

c) sequentially retrieving a data record in the named table in the sequence that the data records were ordered in the row index for the named table;

d) testing the data record as the data record is retrieved from the database for the presence of the selection criteria specified in the GET instruction;

e) going to step k when the data record tested in step d was the last data record in the sequence of data records and the data record tested in step d did not match the selection criteria specified in the GET instruction;

f) returning to step c to retrieve the data record next in sequence when the data record tested in step d did not match the selection criteria specified in the GET instruction;

g) selecting the data record that was tested in step d that matches the selection criteria specified in the GET instruction;

h) ending the retrieving of data records from the table once the data record has been selected in step g;

i) storing the selected data record in the template register for the table;

j) executing the action criteria specified in the GET instruction for the data record stored in the template register for the table; and k) generating a GET EXCEPTION signal if no data record in said table is found to meet the selection criteria specified in the GET instruction.

2. The computer method of claim 1 further comprising the step of:

i1) masking the template register such that only the specified field(s) of the selected data record stored in the template register for the named table in the GET instruction will be provided to the computer system for execution in accordance with the action criteria of the GET instruction.

* * * * *